(12) United States Patent
Wickersham

(10) Patent No.: US 10,552,854 B2
(45) Date of Patent: Feb. 4, 2020

(54) SYSTEMS AND METHODS FOR INTERACTIVE WEB-BASED PROCESSING OF REAL ESTATE TRANSACTIONS

(71) Applicant: FSB System, LLC, Anchorage, AK (US)

(72) Inventor: Kirk Wickersham, Anchorage, AK (US)

(73) Assignee: FSBO System, LLC, Anchorage, AK (US)

( * ) Notice: Subject to any disclaimer, the term of this patent is extended or adjusted under 35 U.S.C. 154(b) by 0 days.

(21) Appl. No.: 15/941,283

(22) Filed: Mar. 30, 2018

(65) Prior Publication Data

US 2019/0304039 A1 Oct. 3, 2019

Related U.S. Application Data

(60) Provisional application No. 62/766,599, filed on Jun. 20, 2017, provisional application No. 62/479,899, filed on Mar. 31, 2017.

(51) Int. Cl.
| | |
|---|---|
| *G06Q 30/02* | (2012.01) |
| *G06Q 50/16* | (2012.01) |
| *G06Q 10/10* | (2012.01) |
| *G06T 11/60* | (2006.01) |
| *G06F 3/0484* | (2013.01) |

(52) U.S. Cl.
CPC ..... *G06Q 30/0201* (2013.01); *G06Q 10/1095* (2013.01); *G06Q 30/0242* (2013.01); *G06Q 50/163* (2013.01); *G06T 11/60* (2013.01); *G06F 3/0484* (2013.01)

(58) Field of Classification Search
CPC ....................... G06Q 30/0201; G06Q 30/0242
See application file for complete search history.

*Primary Examiner* — Julie M Shanker
(74) *Attorney, Agent, or Firm* — Robert C. Kain, Jr.

(57) ABSTRACT

The present disclosure relates to computer systems and methods for interactive web-based processing of real estate transactions. In one embodiment the system includes a seller device, a server system, counselor device, and one or more home listing websites. In one embodiment, the server system provides an online interactive tutorial to the seller device having a corresponding dashboard on the counselor device that provides guidance for a real estate transaction.

10 Claims, 47 Drawing Sheets

FSBO SYSTEM

Savings $XX,XXX.XX
For SAVINGS USE

Brain Decision

Minimum Ratio
of Visitors to Flyer Loss

25% = Top Dollar
33% = Quick Sale
40% = Emergency Sale

Welcome User    LOGOUT

Quick Reference Links

Not Enough Visitors    Print — 1701

Reduce Price    Go — 1703

Introduction Buyer Process | Planning | Show Condition | Asking Price | Marketing Materials | Find a Buyer | Negotiate a Deal | Closing < Back    Next >

© 1995 - 2017 FSBO System, LLC All Rights Reserved.

MAINTAINED BY TALKING CIRCLE MEDIA

FIG. 17

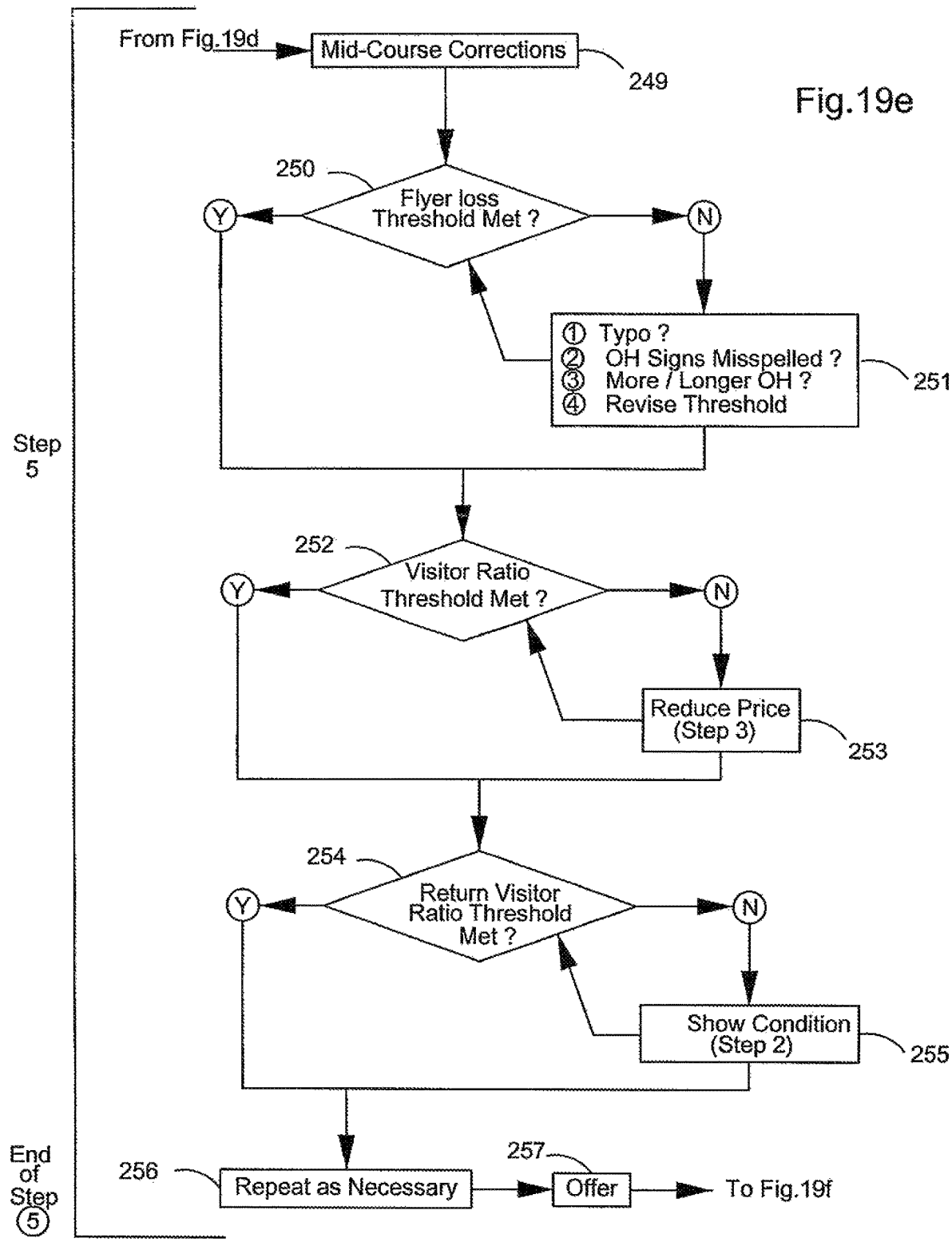

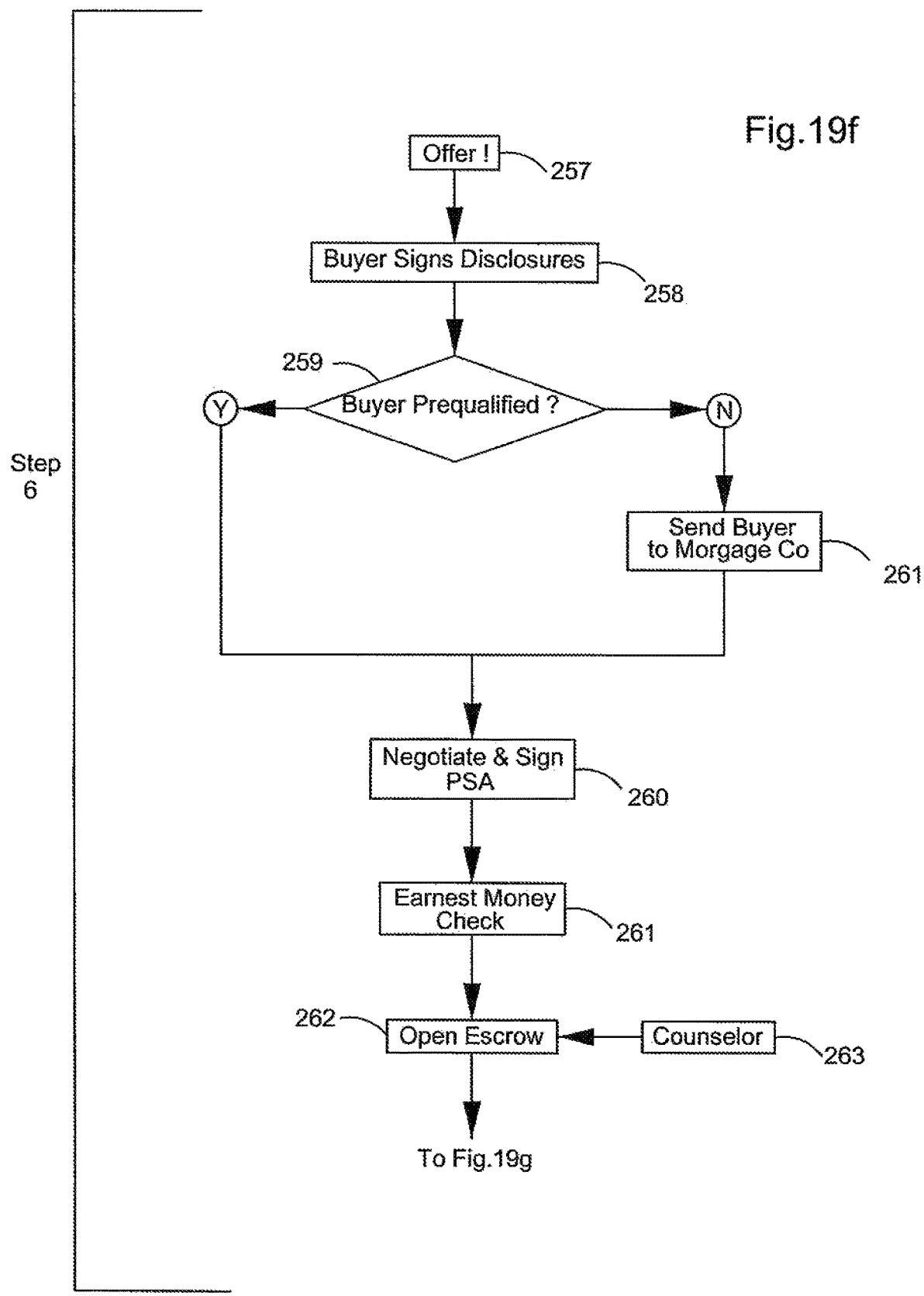

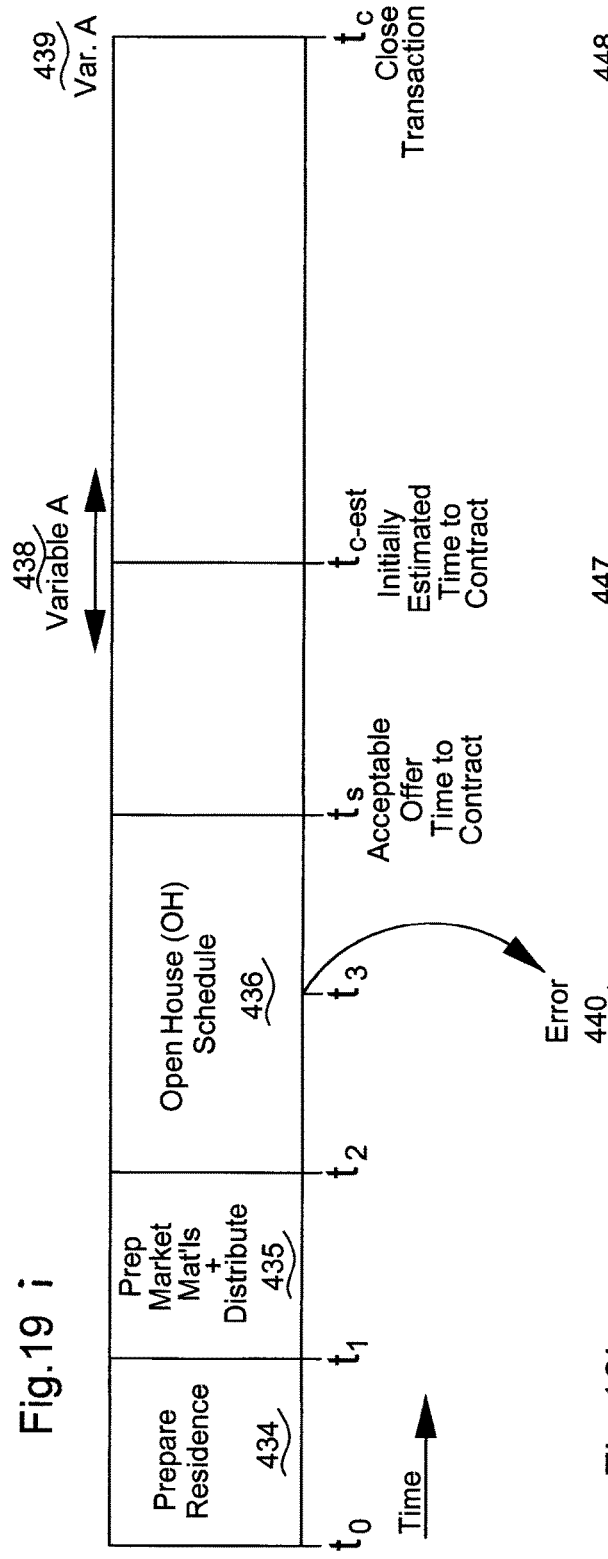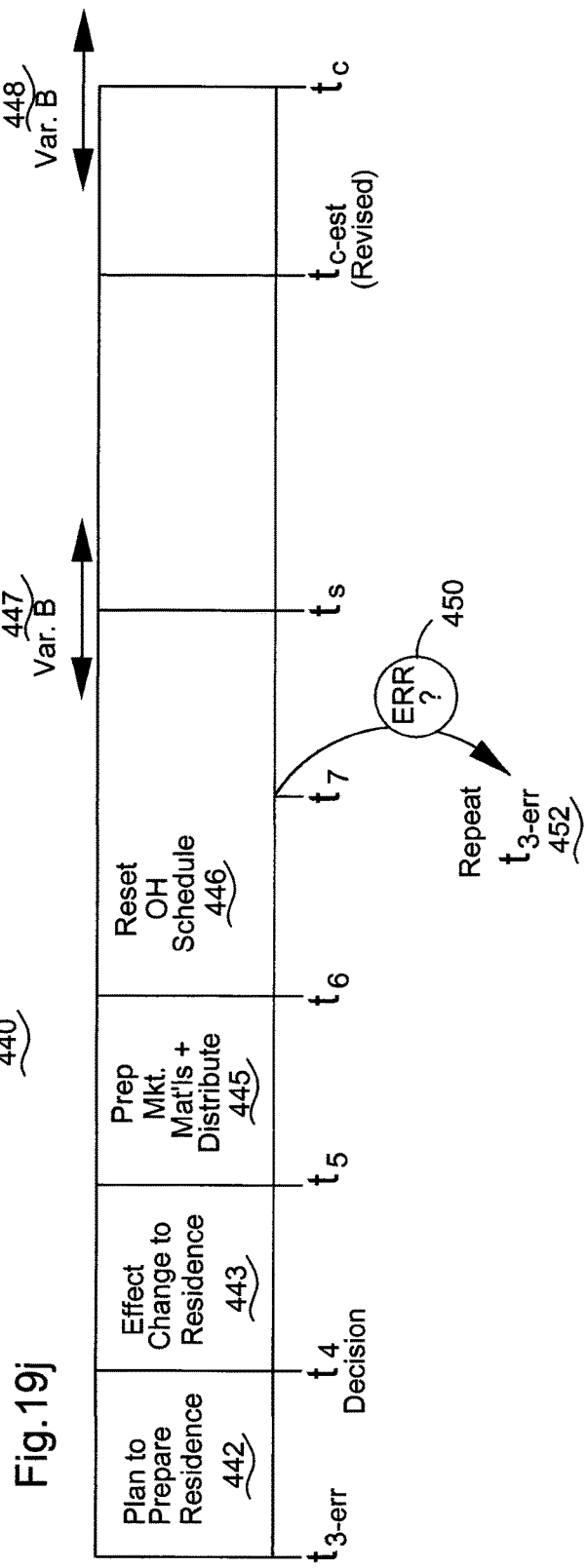

FIG. 23

FSBO System Customer Service Utility

System Information for: User Id

Save    Cancel

Counselor Notes:

| | |
|---|---|
| Ball Park Price: | $680,000 |
| Projected Savings: | $21,940 |
| Top Priority Item: | Pay off LOC |
| Top Priority Item Cost: | $20,000 |
| Sale Date: | 1/1/2017 |
| Sale Date Type: | Desired |
| Closing Date: | 2/15/2017 |
| Closing Data Type: | Desired |
| Goal: | Quick Sale |

Your Counselor:
- Name: FSBO
- Address: 280 W 34th Ave, Anchorage, Ak 99503
- Phone: 561-3726
- Email:

Show Condition Scores:
- Your Score: 8

FIG. 24A

| | |
|---|---|
| Show Condition Scores: | |
| - Your Score: | 8 |
| - Your Counselor's Score: | 8 |
| - Reconciled Score: | 8 |
| Tentative asking Price: | $680,000 |
| Goal Adjustment: | -2 |
| Subtract More Points (0 .. 9): | |
| General Market Condition (-3 .. +1): | 0 |
| Market Collapse (-5 / 0): | 0 |
| Time of Year (-1 .. 1): | 0 |
| Short Sale (-3 / 0): | 0 |
| Owner Financing Available (0 ..3): | 0 |
| Other Conditions (-1 ..1): | 0 |
| Special Features (0 ..3): | 1 |
| Vacant (+1 / 0): | 1 |
| Tenants (-1 / 0): | 0 |
| Additional Market Weakness (-3 .. 0): | 0 |
| Failed HO Assoc (-5 / 0): | 0 |
| Show Condition Difference: | 0 |
| Adjusted Price: | $680,000 |
| Major Repairs Completed: | $25,000 |
| Major Repairs Needed: | $2,500 |
| Asking Price: | $680,000 |
| Expected Sale Price: | $660,000 |
| New Projected Savings: | $22,661 |
| FLYER INFORMATION: | |
| - Asking Price: | $ 680,000 |
| - Street: | 11751 Woodbourne Drive |
| - Bedrooms: | 4 |

FIG. 24B

FLYER INFORMATION:

- Asking Price: $ 680,000
- Street: 11751 Woodbourne Drive
- Bedrooms: 4
- Baths: 3
- Garages: 2-car garage
- House Size: 4000
- Lot Size: 87134
- Built Year: 1982
- Remodel Year: 2013
- Grade School: OMalley Elementary
- Jr High: Goldenview Middle
- Sr High: South
- Contact: 907-441-6700
- Email: elaine@aktodds.com
- Best Feature: Fantastic views from every window
- Feature 1: New flooring and trim
- Feature 2: New boiler
- Feature 3: Plenty of counter & cabinets
- Feature 4: New stainless appliances
- Feature 5: New roof
- Feature 6: Mother in law apartment
- Feature 7: Open beamed
- Feature 8: 2 great Rms, 1 office
- Saturday: ☒

FIG. 24C

- Saturday:
- Sunday:
- Monday:
- Tuesday:
- Wednesday:
- Thursday:
- Friday:
- Start Time: 12
- End Time: 5

Primary Image:
Top Image:
Middle Image:
Bottom Image:
Map Image:
Front of your flyer (PRINT)
Back of your flyer (PRINT)

Actual Sale Price: $0
Agent Commission: $0
Other Costs: $0
Calculated Savings: $0

FSBO Foundation Contribution: $0
If "Other", Amount:
If "Other", Charity Name:
Days on Market:

Your Experience:
- Selling on Your Own:

FIG. 24D

Middle Image:
Bottom Image:
Map Image:
Front of your flyer (PRINT)
Back of your flyer (PRINT)

Actual Sale Price: $0
Agent Commission: $0
Other Costs: $0
Calculated Savings: $0

FSBO Foundation Contribution: $0
If "Other", Amount:
If "Other", Charity Name:
Days on Market:

Your Experience:
- Selling on Your Own:
- Working with FSBO System:
- Comments:

Your Professional:
- Rating:
- Recommend:
- Name:
- Phone:
- Email:

[Save] [Cancel]

FIG. 24E

Log Chalet Home

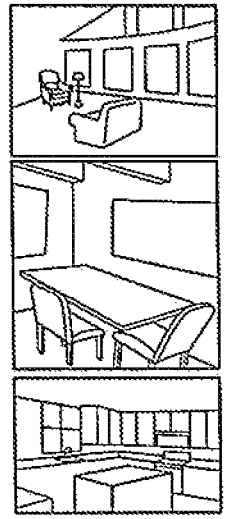

11751 Woodbourne Drive

$ 680,000

| | | |
|---|---|---|
| 4 Bedrooms | 3 Bathrooms | Oversized 2 Car Garage |
| 4,000 Sq. Ft. Home | 87,134 Sq. Ft. Lot | Built in 1982 |

Schools:   OMalley Elementary     Mid:* Goldenview Middle     HS:* South

* Mother in Law Apartment
* Open Beamed
* Tongue & Groove/Vaulted ceiling
* 2 Great Rms, 1 office
* Circle driveway/ plenty of parking
* New flooring
* New boiler
* Plenty of counter & cabinets
* New stainless appliances
* New roof Open House Saturday, Sunday 10am - 5pm Contact Dennis at 907-441-6700

FIG. 25B

FSBO System Customer Service Utility

Marketing Information for: User Id

| Week# | Flyer Loss | New Visitors | Return Visitors |
|---|---|---|---|
| 2 | 24 | 7 | 2 |
| 2 | 12 | 6 | 2 |
| 2 | 12 | 6 | 2 |
| 5 | 24 | 3 | 1 |
| 6 | 18 | 4 | 0 |

Back

FIG. 26

SYSTEMS AND METHODS FOR INTERACTIVE WEB-BASED PROCESSING OF REAL ESTATE TRANSACTIONS

This is a regular patent application based upon and claiming the benefit of provisional patent application Ser. No. 62/479,899, filed Mar. 31, 2017, and the provisional patent application No. 62/766,599, filed Jun. 20, 2017, which is converted from nonprovisional patent application Ser. No. 15/627,695, filed Jun. 20, 2017, the nonprovisional patent application now pending less than 12 months, not abandoned and not subject to an issue fee payment, the contents of which are incorporated herein by reference thereto.

The present disclosure relates to computer systems and methods for interactive web-based processing of real estate transactions.

BACKGROUND

Traditional real estate transactions often involve one or more agents (i.e., Real Estate Agents, Real Estate Broker, Real Estate Salesperson, Real Estate Associate Broker) tasked with representing the parties to the real estate transaction. For example, a seller may be represented by a seller agent, also known as a listing agent, and a buyer may be represented by a buyer agent.

In a traditional real estate transaction, the listing agent may list the property on a multiple listing service ("MLS"), advertise the listing, and the like. The responsibilities of the buyer agent include gaining access to the property the buyer wishes to view, relaying information regarding the property, and monitoring the state of the property as the buyer views it. Once a buyer indicates an interest in purchasing the property, the buyer and seller may enter into a negotiation that is intermediated by the listing agent and/or the buyer agent and results in a transfer of property from the seller to the buyer.

For their services, both the listing agent and the buyer's agent may each receive about 3% of the value of the property. Typically the fees paid to the buyer's agent and the seller's agent are both paid by the seller, and/or incorporated into the selling price.

Many problems are associated with a real estate transaction model that involves the use of seller and buyer agents. These problems include, for example, the financial burden placed on the seller, who typically pays about 6% of the value of the property (e.g., 3% to each of the buyer and seller agents) and typically does not receive as many services from the agent(s) as the buyer. Other problems faced by agents include conflict between contractual obligations and receiving financial compensation for their services. For example, a seller's agent may not have a contractual obligation for compliance, negotiation and closing services related to completion of the real estate transaction, as their primary obligation is to represent a seller's wishes. However, the primary loyalty of the seller's agent may remain with the real estate transaction, as they will only receive commission when the real estate transaction is completed.

Furthermore, the total time for the real estate transaction to be completed is also exacerbated by the delays caused by the use of multiple agents. For example, during a negotiation, a traditional real estate transaction precludes direct contract between the buyer and the seller. Instead, information is relayed via agents, in a manner that is inherently inefficient and may result in the miscommunication of information. Additionally, as viewing a real estate property may require establishing a time when the seller will not be present, and the listing and buyer agents and buyer will be present, it may require some time to schedule a viewing. In addition, agents typically accompany prospective buyers through a property, for example, to guard against pilfering and breakage. Prospective buyers, however, may obtain more consideration of a property without an agent's monitoring. Also, buyers may prefer to view a property without an agent. Thus, the agent may be counterproductive to the prospective buyer's property selection process. Additional delays are often due to real estate properties, in accordance with traditional techniques, being initially listed at inappropriate prices, which leads to greater delays in receiving offers, and more time spent in negotiating an appropriate price. This is due in part to a subjective pricing model commonly utilized in traditional real estate transactions. In particular, a seller's agent may first discover how much a seller expects a property to sell for, add a percentage (e.g., six percent), and then produce "comparable" sales that support that price, rather than objectively pricing the property based on similar properties available or recently sold in the market, as would be done in an objective comparative market analysis.

Furthermore, although it is estimated that about 90% of buyers initiate real estate transactions online by review real estate offerings using the internet prior to engaging a buyer agent, real estate transactions are typically processed and finalized using agents in the manner described above. Accordingly, there remains a need for electronic management of one or more of the steps described above in an effort to promote efficiency, reduce costs, and the like. Optionally, the electronic management may eliminate the need for one or more agents typically involved in the real estate transaction (e.g., seller agent, buyer agent). In such an embodiment, one or more parties to the real estate transaction may no longer be required to pay a commission.

There has been a long-felt but unsolved need to solve the problems and disadvantages of transacting real estate through an agent-driven process. The systems and methods of the present disclosure provide solutions to the problems and disadvantages discussed above.

SUMMARY

Aspects of the present disclosure relate to systems and methods for an interactive web-based processing of real estate transactions. In one embodiment, a system includes a first device having a first graphical user interface and a first web browser, a second device having a second graphical user interface and a second web browser, and at least one server communicatively coupled to the first device and the second device via a network. The at least one server may include a non-transitory memory storing computer-readable instructions and at least one processor. The execution of the instructions, by the at least one processor, may cause the at least one server to provide one or more web pages to the first graphical user interface of the first device via the first web browser corresponding to an interactive tutorial of the at least one server for guiding a real estate transaction process; receive, via the first web browser, input from the first device associated with the one or more web pages provided to the first graphical user interface; identify, via a utility application embedded in the interactive tutorial, at least a portion of information from the received input matching one or more predetermined conditions; and provide one or more further web pages including the identified portion of information to the second graphical user interface of the second device via the second web browser corresponding to a dashboard for monitoring a transaction process of the first device.

In another embodiment a system may include a first device including a first graphical user interface and a first web browser, and at least one server communicatively coupled to the first device via a network. The at least one server may include a non-transitory memory storing computer-readable instructions and at least one processor. The execution of the instructions, by the at least one processor, may cause the at least one server to provide one or more web pages to the first graphical user interface of the first device via the first web browser corresponding to an interactive tutorial of the at least one server for guiding a real estate transaction process; receive, via the first web browser, input from the first device associated with the one or more web pages provided to the first graphical user interface; identify, via a utility application embedded in the interactive tutorial, at least a portion of information from the received input matching one or more predetermined conditions and store the identified portion of information in at least one database communicatively coupled to the at least one server.

One embodiment of the invention is a computer-based method for effecting the sale of a residence having functional features, such as one or more bedrooms, living areas, and bathrooms, and aesthetic features such as vistas, living area vistas, and bathroom amenities. The method uses a computer system with user input modules for data, textual material and photos, and output modules for generating flyers and placards from pre-formatted forms, based on data input by the user-seller of the residence or property. herein, references to a "residence" include any type of real estate property, although the key performance indicators herein are generally discussed in connection with residential properties.

The computer system includes a plurality of processing modules. The method has the user, sometimes with the assistance of the computer, establishes an initial asking price for the residence as an as initial asking price input. The seller/user prepares the residence for a plurality of open house (OH) marketing events. The seller obtains photos of the functional features and the aesthetic features and inputs the same into the computer system as pic data. The seller also inputs text or textual documents into the computer for the residence functional features and aesthetic features and the computer notes these inputs as "d-text." The computer generates a plurality of first edition flyers using the flyer pre-formatted form. These first edition flyers have a subset of the photos and texts thereon from the pic data and d-text. The seller makes the first group of the plurality of first edition flyers available at an out-of-residence (OOR) location (like at the front door or in a box on the FOR SALE sign, or curb-side) and makes available a second group of first edition flyers at an in-residence location (like on the kitchen table). The OOR first edition flyer group is available outside of the residence; the second group of flyer is available to prospective buyers attending the plurality of OH marketing events.

The computer also generates a plurality of first edition self-guided tour (SGT) guide placards with the placard pre-formatted form. These SGT placards include one or more of (i) text for the functional or aesthetic features of the residence, made from d-text; (ii) corresponding photos of the functional or aesthetic features of the bedrooms, living areas, and bathrooms from pics, and (iii) photos of the aesthetic features of the bedrooms, living areas, and bathrooms from pics. The seller posts first edition placards about the residence prior to each the OH marketing event. The seller, using the computer input module, at each OH marketing event, logs prospective buyer data into the computer. This data includes buyer name and date of event and OOR first edition flyer loss over a first period of time which covers at least a 30 day period and a sub-plurality of OH marketing events. OH during a single weekend (Saturday and Sunday) is logged as a single OH event.

The computer processing modules includes a flyer loss determining processing module which determines whether the OOR first edition flyer loss over the first period of time meets or exceeds a predetermined, seasonally adjusted flyer loss threshold (SA-flyer-loss threshold). This SA-flyer-loss threshold seasonally altered by the computer system based upon the calendar dates of the sub-plurality of OH marketing events. If the first edition flyer loss over the first period of time does not meet or exceed the SA-flyer-loss threshold, the computer-assisted method notifies the seller and motivates the seller to change one or more attribute-based factors associated with the residence, thereby effectuating one or more corrective acts from of the group of corrective acts including the following. (A) Obtain additional photos of the residence functional or aesthetic features and input the same as add-pic data. The system then generates an OOR second edition plurality of flyers; the second edition flyers having a subset of the additional photos thereon from add-pic data. The seller replaces all OOR first edition flyers with the OOR second edition flyers at the OOR location. (B) Obtain additional photos of the residence functional or aesthetic features and input the photos as add-pic data. The system generates a second edition plurality of SGT placards with additional photos thereon from the add-pic data. The seller removes the first edition placards and posts the second edition placards about the residence. (C) The appropriate computer system processing module discounts the initial asking price to a first discounted (d-1) asking price and generates an OOR second edition plurality of flyers displaying the d-1 asking price thereon. The seller replaces all OOR first edition flyers with the OOR second edition flyers at the OOR location.

Over a second period of time after the first period, the seller and the computer repeats the steps of: at each OH marketing event, logging into the computer system via the input modules prospective buyer data and logging OOR second edition flyer loss over the second period of time. The second period is at least a 7 day period and includes a sub-plurality of OH marketing events. With the flyer loss processing module, the system determines whether the OOR second edition flyer loss over the second period meets or exceeds either the SA-flyer-loss threshold or the seasonally altered SA-flyer-loss threshold. Thereafter, the seller and the computer repeats the OH marketing events until an acceptable offer from a prospective buyer is obtained by the seller.

In a more sophisticated system, several key performance indicators (KPIs) are used. These KPIs include: (A) Flyer loss (FL) from the OOR brochure box (flyer-cnt per location; flyer-cnt-loc-a-wk-1, then wk-2 and for loc-b, etc.)(typically FL count only at on-residence site). (B) FL loss to Total Visitors-Prospective Buyers ("V") to all OH events ratio. Visitors or prospective buyers are not individually counted, because a husband-wife team is a single "buyer-visitor" and equates to "one visitor" or "one prospective buyer-visitor". This is the "buyer-visitor-cnt" value or "V". (C) Return Visitors ("RV") to Total Visitor V ratio ("buyer-visitor-ret-cnt" value or "RV"). The FL count and FL versus Total-Buyers ratio and RV to V ratios must exceed predetermined thresholds, otherwise corrective actions need to be taken.

The more sophisticated system and method includes the base items indicated above, such as computer input modules for data, textual material and photos, and output modules for generating flyers and placards with pre-formatted forms, obtaining the initial asking price, preparing the residence, obtaining photos of functional and aesthetic features, textually documenting the residence, generating first edition flyers, placing the flyers at the OOR location, generating SGT placards and posting the same.

The sophisticated computer system processing modules includes (I) a flyer loss determining processing module, (II) a buyer-visitor-to-flyer processing module, and (III) a return prospective buyer processing module. The flyer loss determining processing module has a FL loss thresholding module determining whether FL loss over the first OH time period meets or exceeds the predetermined SA-flyer-loss threshold. The buyer-visitor-to-flyer processing module determines (a) a prospective total buyer count (T-buyer count) from the prospective buyer data, and (b) an OOR flyer loss count and (c) determines the ratio between: the T-buyer count to the OOR flyer loss count and generates a buyer-visitor count to flyer loss ratio as a first V-FL ratio. A thresholding module determines whether the V-FL ratio exceeds a predetermined V-FL threshold. The return prospective buyer processing module determines (a) the number of return prospective buyers from the prospective buyer data and generates a return prospective buyer count (R-buyer count), and (b) the ratio of buyer R-buyer count to T-buyer count (T-buyer count) as a R-V ratio and includes a thresholding module determining whether the ratio of R-buyer count to T-buyer count exceeds a predetermined R-buyer-to-T-buyer-count threshold.

If: (I) the OOR first edition flyer loss over the first OH time period does not meet or exceed the SA-flyer-loss threshold, or (II) the V-FL ratio does not meet or exceed the predetermined V-FL threshold, or (III) the ratio of R-buyer count to T-buyer count does not meet or exceed a predetermined R-buyer-to-T-buyer-count threshold, the computer effects changes in association with the seller by changing one or more attribute-based factors associated with the residence prior to a second OH time period and before initiation of the second OH time period. These corrective acts are as follows.

(A) Obtain additional photos and generate an OOR replacement edition flyers with the additional photos. These new flyers replace all old OOR flyers. (B) obtain additional photos for SGT placards and replace or add new placards about the residence. (C) Clean the residence. (D) Repair and/or paint the residence. Obtain supplemental photos for OOR replacement flyers. Replace all old OOR flyers. Do the same with SGT materials. (E) Discount the initial asking price with a discounted (disc) asking price and generate new OOR replacement flyers and replace old OOR flyers. (F) Obtaining a renovation plan which includes reno texts and a reno cost. Obtain a reno discount associated with the initial asking price. Generating a reno plan placard with the reno text and the reno discount and post the same adjacent the corresponding residence reno plan for one or more bedrooms, living areas, and bathrooms.

Over the second OH time period, log prospective buyer V data and log OOR replacement flyer loss FL data, and the system and method notes the RV count by comparing return buyers with previously logged in buyers. The KPI thresholds are then re-determined by the respective thresholding modules. The system and the seller repeats the process and activates the corrective actions A, B, C, D, E, and F and the follow-on OH marketing events until an acceptable offer from a prospective buyer is obtained. Of course, the last corrective action is lowering the asking price. In this manner, the seller, with the computer assisted method, maximizes his or her net-to-seller money when the home or property is sold to a buyer.

BRIEF DESCRIPTION OF DRAWINGS

Many aspects of the present embodiments may be better understood with reference to the following drawings. The components in the drawings are not necessarily to scale, emphasis instead being placed upon illustrating example embodiments:

FIG. 10 illustrates an example online interactive tutorial screen in a sub-step of FIG. 6 according to another aspect of the present disclosure.

FIG. 15B illustrates an example online interactive tutorial screen in a sub-step of FIG. 14 according to another aspect of the present disclosure.

FIG. 17 illustrates an example online interactive tutorial screen in a sub-step of FIG. 16 according to an aspect of the present disclosure.

FIGS. 19b through 19g diagrammatically illustrate the overall process utilizing the present inventive system and method as a preferred embodiment.

FIGS. 19i and 19j diagrammatically illustrate timelines associated with a successful time to contract and an error routine when the key monitoring modules of flyer loss, buyer or visitor count, and return buyer-visitors to total buyer-visitor count is less than the threshold (the flyer loss should to be greater than the threshold).

FIG. 23 illustrates an example webpage available to a counselor in accordance with an interactive web based guide for processing of real estate transactions, according to an aspect of the present disclosure.

FIG. 24A illustrates a portion of a webpage available to a counselor for monitoring seller information input via the online interactive tutorial, according to an aspect of the present disclosure.

FIG. 24B illustrates another example portion of the webpage available to the counselor for monitoring seller information input via the online interactive tutorial, according to an aspect of the present disclosure.

FIG. 24C illustrates another example portion of the webpage available to the counselor for monitoring seller information input via the online interactive tutorial, according to an aspect of the present disclosure.

FIG. 24D illustrates another example portion of the webpage available to the counselor for monitoring seller information input via the online interactive tutorial, according to an aspect of the present disclosure.

FIG. 24E illustrates another example portion of the webpage available to the counselor for monitoring seller information input via the online interactive tutorial, according to an aspect of the present disclosure.

FIG. 25B illustrates an example flyer according to an aspect of the present disclosure.

FIG. 26 illustrates an example webpage available to a counselor for monitoring seller information input via the online interactive tutorial, according to an aspect of the present disclosure.

DETAILED DESCRIPTION

Figure 1:
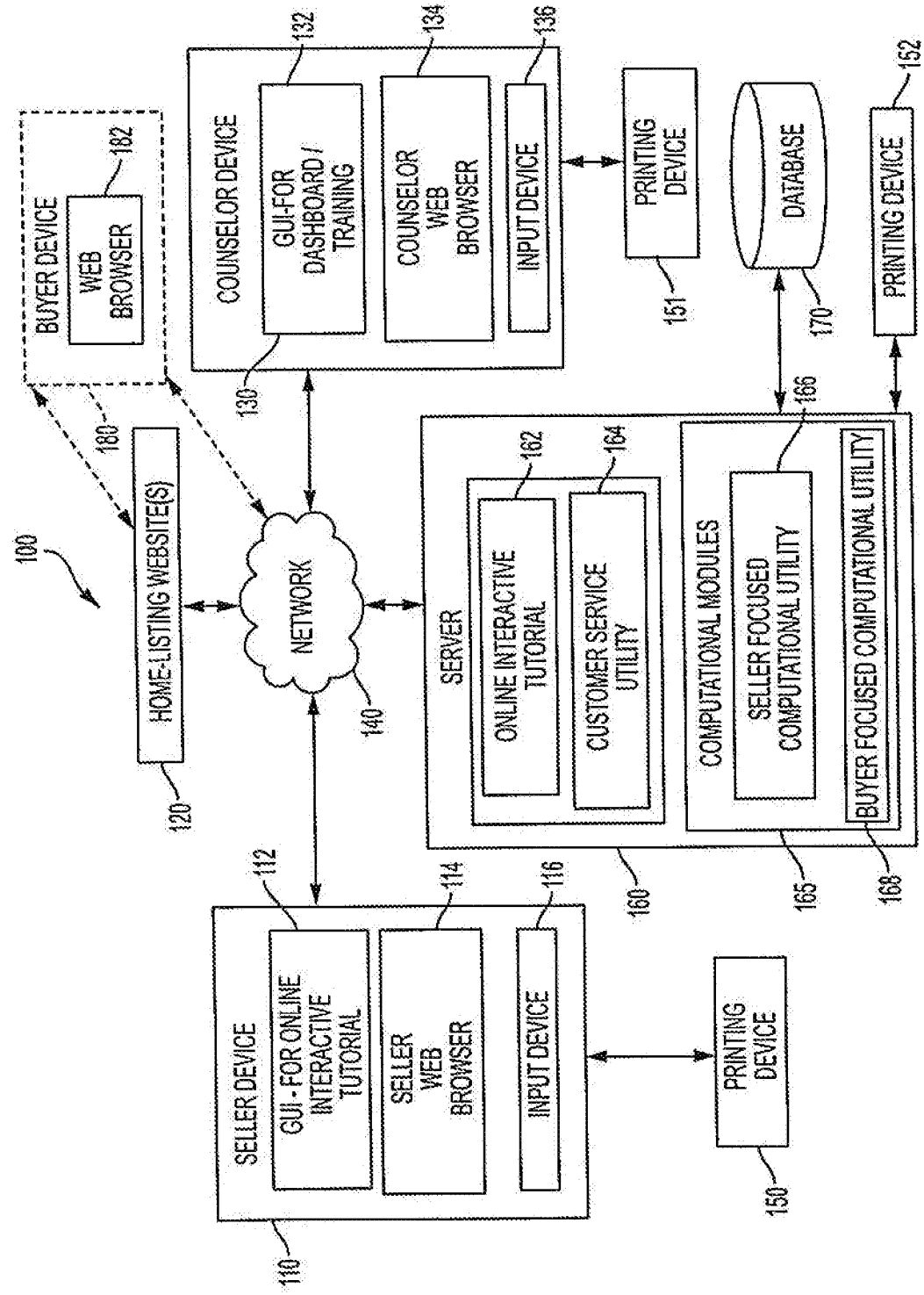
FIG. 1 is a functional block diagram illustrating an example system for an interactive web-based processing of real estate transactions.

The present disclosure relates to computer systems and methods for interactive web-based processing of real estate transactions. In one embodiment, the systems described herein allow a seller to find a buyer themselves, eliminating the need for a seller's agent and/or a buyer's agent. Thus, interactive web based systems and methods of the present disclosure may be considered an agentless and automated technique for processing real estate transactions, which at least eliminates the use of a seller's agent (and in most examples, also eliminates use of a buyer's agent) from the process.

The systems and methods described herein may be applicable to all suitable real estate transactions, including but not limited to, selling a home. It is understood that the systems and methods described herein may equally apply to various real estate properties including, but not limited to, single or multifamily homes, condos, small rental properties, lots and raw land. In some examples, the systems and methods of the present disclosure may apply to large rental properties, commercial buildings and/or industrial properties. Not only do the systems and methods provide interactive web-based guidance to a seller throughout a real estate transaction process, the systems and methods also monitor the seller's input into a server system during the transaction process, store the data and input received from the seller, and send appropriate information to a separate counselor device. A counselor, through the counselor device, can interact with the seller throughout the real estate transaction process and provide guidance to the seller. Guidance for a real estate transaction process, as described herein, may refer to instructions for planning, preparation, marketing negotiating, and completing a real estate transaction. The interactive guide is also referred to herein as an online interactive tutorial. In general, the system, through the interactive guide and a utility application, receives input from user (e.g., a seller), provides information to a user, tracks the user's information and progress, provides appropriate information to a counselor device so that a counselor can suitably interact with the user through the process (e.g., electronically and/or in person), and can direct the seller through the real estate transaction process. The interactive web-based tutorial works in conjunction with the counselor to provide guidance to the seller throughout the real estate transaction. The system may provide advantages over agent-driven processes, such as faster and more efficient completion of a transaction, elimination of commission fees, may increase the likelihood of completing the transaction and may also better adhere to any governmental regulations. The system has also demonstrated improved performance with respect to agent driven processes. For example, properties for sale by users of the system may be on the market for about 32 days as compared with about 49 days for sellers represented by seller's agents. Users of the system may also have about a 75% chance of success in selling the property (i.e., completing the transaction) as compared with about a 65% chance of success for sellers represented by seller's agents. The example is based on the real estate market around Anchorage, Ala.

Turning now to FIG. 1, a functional block diagram illustrating an example system 100 for an interactive web-based processing of real estate transactions (referred to herein as system 100) is shown. System 100 may include seller device 110, one or more home listing websites 120, counselor device 130, at least one network 140, server 160 and at least one database 170. In some embodiments, the system 100 may include one or more optional buyer devices 180 including web browser 182 (any suitable software and/or application interfaces (APis)). The optional buyer device(s) 180 may be communicatively coupled to the network 140. In one embodiment, the optional buyer device(s) 180 may be communicatively coupled to the seller device 110 via the network 140, but may be prohibited from communicating with the counselor device 130 or server 160. In some examples, system 100 may include one or more printing devices, such as one or more of printing devices 150-152. Although FIG. 1 illustrates one seller device 110 and one counselor device 130, in some examples, system 100 may include one or more seller devices 110 and one or more counselor devices 130.

Server 160 may include online interactive tutorial 162, customer service utility (CSU) 64, and various computational modules 165 including, for example, a seller-focused computational utility 166 and a buyer-focused computational utility 168. Server 160 may include one or more processors, or microprocessors coupled to one or more non-transitory memory devices and may be adapted to perform the functions described herein. Server 160 may be any special-purpose machine capable of storing and executing a set of computer-readable instructions (e.g., software) that specify actions to be taken to perform the functions described herein. The server 160 is one example of computer-readable storage medium. The term "computer-readable storage medium" should be taken to include a single medium or multiple media that store one or more sets of instructions. The term "computer-readable storage medium" shall also be taken to include any medium that is capable of storing or encoding a set of instructions for execution by the machine and that causes the machine to perform any one or more of the methodologies of the present disclosure.

Further, while only a single server 160 is illustrated, the term "server" shall also be taken to include any collection of machines that individually or jointly execute a set (or multiple sets) of instructions to perform any one or more of the methodologies discussed herein. For example, a first server may securely store online interactive tutorial 162, a second server may include CSU 164, and a third server may include the computational modules 165 including the seller-focused computational utility 166 and the buyer-focused computational utility 168. In some examples, at least one of two servers may be in different physical locations.

Online interactive tutorial 162 may interface with a seller, via seller device 110, to present queries to the seller, receive data and information related to a real estate property, process the received data and information, and present information to the seller to guide a real estate transaction for the real estate property based on the received data and information. For example, the online interactive tutorial 162 may receive, process, and present data and information related to establishing a selling goal, creating flyers, preparing MLS listing information, creating open house book materials, creating a self-guided tour and putting the real estate property in a selling condition. In one embodiment, the online interactive tutorial 162 may guide a seller thru clearly defined sequential steps that result in a completed real estate transaction. In another example, the online interactive tutorial 162 may allow a seller to conduct a portion of the real estate transaction, or select aspects of the sequential steps that the seller wishes to complete.

The online interactive tutorial 162 may be configured to receive seller input from seller device 110. Seller device 110 may include GUI 112, web browser 114, and input device 116. Seller device 110 may be configured to communicate with printing device 150, for printing material received from tutorial 162 via web browser 114. GUI 112 may be configured to display and interact with online interactive tutorial I 62. In some examples, seller device 110 may include a separate input device 116 for entering information into one or more web pages provided by tutorial 162 via GUI 112. Seller input device 116 may include a keyboard, touch screen, mouse, and the like. In some examples, input device 116 may be part of GUI 112. Web browser 114 may include any suitable web browser for interacting with tutorial 162 via network 140. The data and information received by the online interactive tutorial 162 may be routed to the customer service utility 164, computational modules 165, database 170 and/or other components of the server 160.

The online interactive tutorial 162 may also be configured to present information to seller device 110 (via web browser 114 and graphical user interface (GUI) 112), provide instructions and deliver electronic documentation to seller device 110. In one embodiment, the information presented to the seller device 110 (via the web browser 114 and GUI 112) is responsive to data and information received by the server 160 via the online interactive tutorial 162. As will be discussed in further detail below, in one embodiment the data and information displayed at the seller device 110 may include information obtained from one or more of home listing websites 120, seller devices 110, and/or counselor devices 130. In one embodiment, the online interactive tutorial 162 may provide one or more web pages relating to real estate transactions including the processing steps and graphical user interfaces illustrated in FIGS. 3A-20.

As discussed above, the data and information received by the online interactive tutorial 162 may be routed to the customer service utility (CSU) 164, computational modules 165, database 170 and/or other components of the server 160. The online interactive tutorial 162 may receive data and information from the seller device 110 and the like. In an optional embodiment, the CSU 164 may be configured to receive data and information from the home listing website 120. In one optional embodiment the CSU 164 may be configured to receive data and information related to the real estate property the seller wishes to transact in. The CSU 164 may process the received data and information and provide the processed data and information to one or more web pages (described herein as a dashboard) configured for display via GUI 132 of counselor device 130 (via web browser 134). The dashboard of a seller's marketing results and transactional progress, may be used by a counselor of counselor device 130 in assisting a seller of seller device 110 in completing a real estate transaction. A counselor, as used herein, refers to a specially-trained, real estate professional who assists the seller in selling their home. In one embodiment, counselors may be licensed by a state, and may be members of the Board of Realtors.

Counselor device 130 may include GUI 132, web browser 134, and input device 136. Counselor device 130 may be configured to communicate with printing device 151, for printing material received from CSU 164 via web browser 134. GUI 132 may be configured to display and interact with CSU 164. In some examples, counselor device 130 may include a separate input device 136 for entering information into one or more web pages provided by CSU 164 via GUI 132. In some examples, input device 136 may be part of GUI 132. Counselor input device 136 may include a keyboard, touch screen, mouse, and the like. Web browser 134 may include any suitable web browser for interacting with CSU 164 via network 140. Counselor device 130 may also be configured for retrieving and/or interacting with one or more tutorials for training, via server 160 over network 140. In some examples, a counselor, via counselor device 130, may create a seller's profile, and then the counselor and/or the seller may populate CSU 164 with data, marketing materials and/or other information based on the seller's profile. In some examples, a seller's use of their savings and/or a seller's goal may be transmitted to the CSU dashboard, so the counselor may refer to it while coaching or encouraging a seller throughout the real estate transaction. In some examples, the counselor may provide the seller with access/permissions to the online interactive tutorial 162 and create the seller's profile on CSU 164. Once the profile is created, the counselor may interact with CSU 164. In one embodiment, the counselor's graphical user interface 132 may be different from the seller's version of online interactive tutorial 162 displayed on graphical user interface 112 on the seller's device 110. In some examples, the counselor may, via counselor device 130, view and monitor the seller's progress on online interactive tutorial 162, including monitoring, for example, the creation of a flyer.

In some examples, CSU 164 may be embedded in online interactive tutorial 162. CSU 164 may be a monitoring program, configured as a communications link between the seller and a counselor to provide helpline functions, such as troubleshooting or online assistance, via email, telephone or video conference. In some examples, CSU 164 may be configured as a data retrieval and collection component that may provide information, calculations, analysis, or output to counselor device 130 via the dashboard. In some examples CSU 164 may be configured to receive seller input via tutorial 162, retrieve and collect additional real estate data and information from tutorial 162, process the information and data, and output information, data, calculations and analysis to at least one seller device 110 or at least one counselor device 130. In one embodiment, the data analysis and calculations may be done by the computational modules 165. In such an embodiment, the CSU 164 may be communicatively coupled to the computational module 165. In some optional examples, CSU 164 may use home-listing websites 120 to data mine for additional real estate data and information.

The computational modules 165 may include a seller focused computational utility 166 and a buyer-focused computational utility 168. The seller focused computational utility 166 may be configured to calculate and/or determine various seller statistics, and include for example, algorithms to calculate statistics such as Compensation, Seller's Savings, Target Closing Date, Target on Market Date, Show Condition and Adjusted CMA (all of which are discussed further below). In general, computational modules 165 (including utilities 166, 168) may be configured to execute a set of computer-readable instructions (e.g., software) that specify actions to be taken to perform the functions described herein.

The buyer-focused computational utility 168 may be configured to keep statistics of what prospective buyers actually do during a seller's marketing process. For example, the statistics may incorporate various measures of marketing effectiveness, pricing viability and show condition. These measures may include flyer loss from a brochure box (which measures marketing effectiveness), visitors to open houses (which measures the viability of the seller's asking price), and return visitors (which measures the show condition, the "likeability" of the house). These statistics are discussed further below.

While the buyer-focused computational utility 168 and seller-focused computational utility 166 are illustrated as separate computational utilities, in an alternative embodiment, the buyer-focused and seller-focused computational utilities may be incorporated into a single computational utility. Alternatively, each of the buyer-focused and seller-focused computational utilities may include one or more computational sub-utilities.

The server system 160 may also include at least one database 170. The database 170 may be a separate component or one that is integrated into the server system 160. The database 170 may include any device or combination of devices suitable for storing software for online interactive tutorial 162 (e.g., web pages), data for algorithms/midcourse correction(s), data for buyer-focused computational utility 168, as well as any information, documentation, videos, data, tutorials or instructions (e.g., software) for performing any one or more of the functions described herein. In one embodiment, the database 170 may store information related to a real estate transaction and/or property received from seller device 110, counselor device 130, and/or home listing website 120. In one embodiment, a record stored in the database 170 may be referred to as a seller profile. Data and information stored in the database 170 may be retrieved by one or more of computational modules 165 to perform buyer-focused and seller-focused statistics.

One or more home-listing websites 120 may be included in system 100. Seller device 110 and counselor device 130 may each communicate and interact with various home-listing websites 120 which may be connected to network 140. Examples of home-listing websites may include, without being limited to, local MLS, Realtor.com, Zillow and Trulia. In some examples, a counselor via counselor device 130 may retrieve information related to the real estate property of the real estate transaction from one or more home-listing websites 120, including for example, data and information related to the real estate property's history and that of comparative real estate properties. Optionally, a server 160 may also retrieve information from the one or more home-listing websites 120. The data and information collected from the one or more home listing websites 120 may be utilized and processed by one or more of the online interactive tutorial 162, customer service utility 164, and computational modules 165 to provide data and information to seller device 110 and/or counselor device 130.

In one embodiment, the system 100 may also include one or more optional buyer devices 180 that are communicatively coupled to the network 140. The buyer may access and initiate a real estate transaction by visiting the home-listing websites 120 via software, application interfaces, and webpages 182 communicatively coupled to the network 140. System 100 components may be communicatively coupled to one another via one or more networks 140. A network 140 may be any plurality of completely or partially interconnected computers or computer components wherein some or all of the computers or components are able to communicate with one another. Connections may be wired in some cases (e.g., via wired TCP connection or other wired connection) or may be wireless (e.g., via a WiFi network connection). Any connection through which at least two computers or components may exchange data can be the basis of a network 140. Furthermore, separate networks 140 may be able to be communicatively coupled such that one or more computers or components within one network may communicate with one or more computers in another network 140. In such a case, the plurality of separate networks 140 may optionally be considered to be a single network. Network 140 may include, for example, a private network (e.g., a local area network (LAN), a wide area network (WAN), intranet, etc.) and/or a public network (e.g., the Internet). In one embodiment, one or more seller devices 110, counselor devices 130, and servers 160 may be communicatively coupled via one or more networks 140.

One or more printing devices 150, 151, 152, may be included to print information, documentation or screen shots, etc. In some examples, information, documentation or screen shots may be displayed on seller device 110, counselor device 130 or preprinted and delivered to a seller or counselor.

Figure 2:
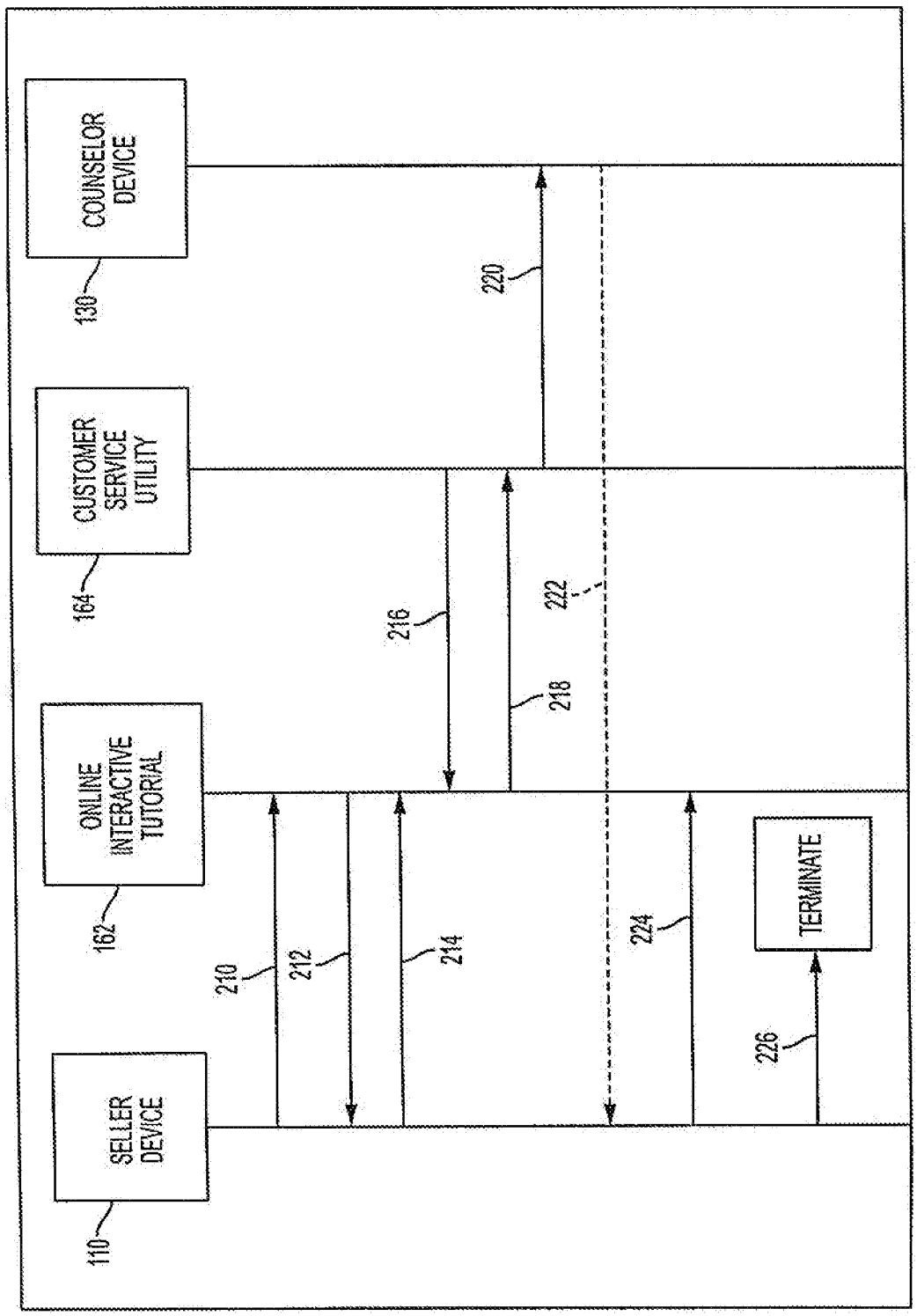
FIG. 2 is a signal flow diagram illustrating an example interactive web-based procedure for processing of real estate transactions, according to an aspect of the present disclosure.
Figure 3A:
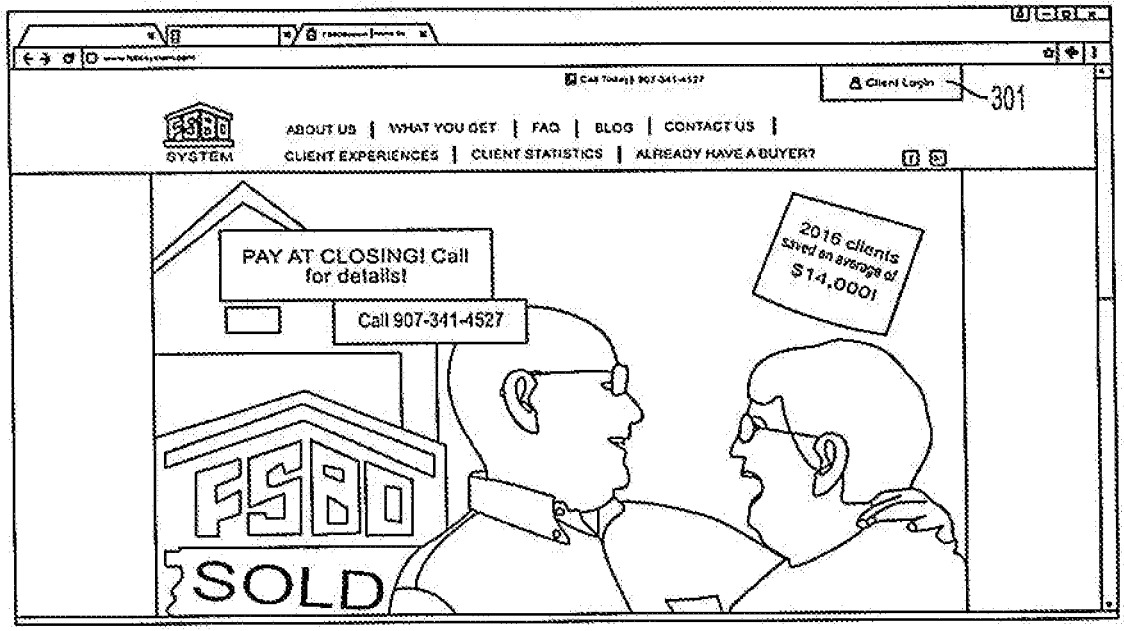
FIG. 3A illustrates an example login feature of a webpage in accordance with an interactive web based guide for processing of real estate transactions from the perspective of a seller, according to an aspect of the present disclosure.
Figure 3B:
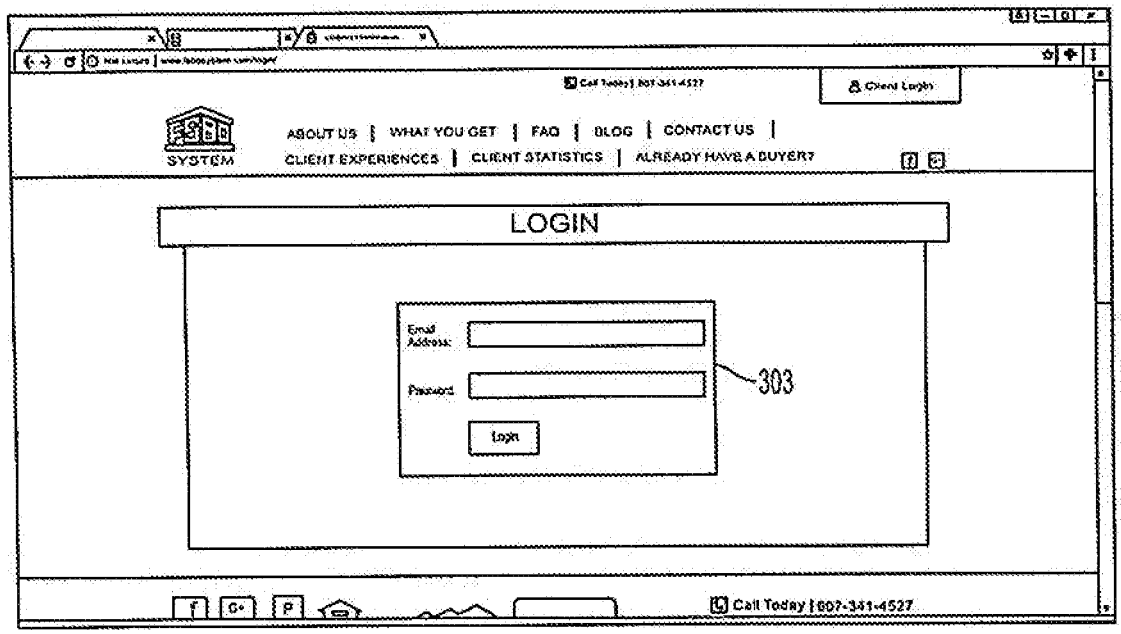
FIG. 3B illustrates an example login feature of a webpage in accordance with an interactive web based guide for processing of real estate transactions from the perspective of a seller, according to an aspect of the present disclosure.

Turning now to FIG. 2, a signal flow diagram is shown of an example interactive web-based procedure for processing of real estate transactions associated with system 100 (FIG. 1), according to an aspect of the present disclosure. In FIG. 2, it is understood that some of the steps may be performed by system I 00 concurrently with other steps or a combination of steps, or may be performed in a different sequence than shown. At Step 210, seller device 110 may initiate the process by sending a request to online interactive tutorial 162 via web browser 114 of seller device 110. At Step 212, online interactive tutorial 162 may initiate a presentation of one or more web pages on GUI 112 via seller web browser 114 of seller device 110. At Step 214, seller input may be sent from GUI 112 (and/or input device 116) to online interactive tutorial 162.

At Step 216, CSU 164 may collect seller input from online tutorial 162, and identify relevant information for counselor device 130. (Although not shown, CSU 164 may also identify and retrieve any information for storage in database 170 that may be useful by system 100). At step 218, CSU 164 may retrieve the identified information from interactive tutorial 162. At Step 220, CSU 164 may send information, any calculations (as performed by computational modules 165), analysis, or output to GUI 132 of counselor device 130 for presentation as a dashboard, via web browser 134. At Step 222, counselor device 130 may, optionally, communicate with seller device 110.

At Step 224, seller device 110 may send a request to logout of tutorial 162. At Step 226, tutorial 162 may terminate the process. The process may repeat any of Steps 212-222 in any sequence, and any number of times, before the process is terminated at Step 226. Communications and data may be sent from one component to any other component via network 140. One or more of steps 212-222 may be repeated according to a multistep online interactive tutorial for processing of the real estate transaction, described further below with respect to FIG. 5.

FIGS. 3A-20 illustrate an embodiment of the real estate transaction process utilizing interactive web-based processing of real estate transactions, from the perspective of a seller. Using seller device 110 and seller input device 116, the seller may navigate to a website via web browser 114 containing a link to GUI 112 displaying the online interactive tutorial 162. In one embodiment, as displayed in FIG. 3A, upon navigating to the website, a seller may initiate login via login selector 301 to the online tutorial via a security system requiring authentication of the seller's identity via identity input fields 303 (see FIG. 3B). To verify the seller's authenticity, the seller device 110 may be in communication with the server 160 to determine whether the information input by the seller identity input fields 303 matches that stored in the record database 170.

Figure 4:
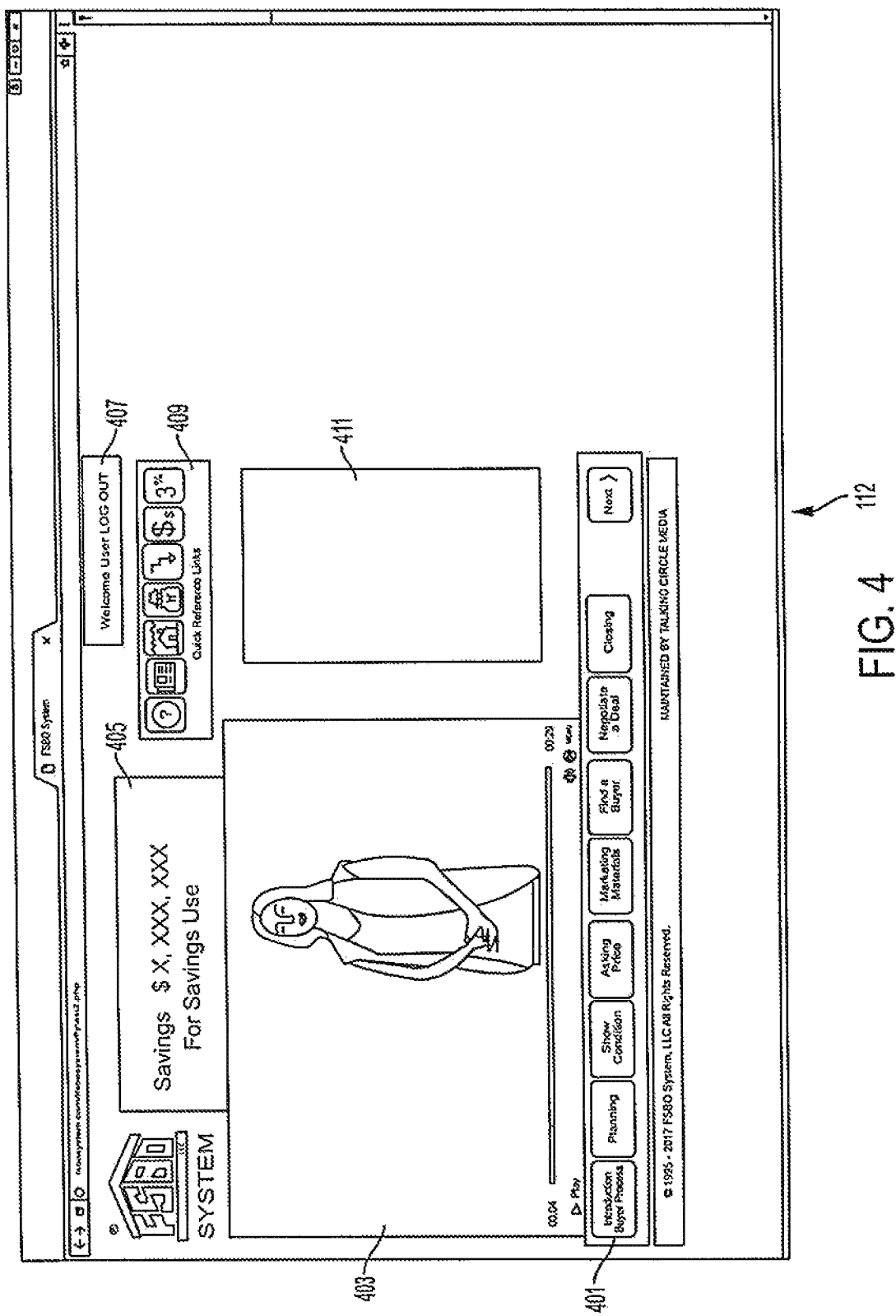
FIG. 4 illustrates an example online interactive tutorial screen of an interactive web based guide according to an aspect of the present disclosure.

As illustrated in FIG. 4, once the seller's information is verified by system 100, online interactive tutorial 162 may be displayed via GUI 112. The online interactive tutorial 162 may be displayed as a part of a graphical user interface having one or more distinct areas. Although buttons, click boxes, text boxes, drop down menus and the like are depicted herein, any suitable alternatives such as sliders, radio buttons, tabs, etc. may be used in connection with the depicted webpages. Additionally, the areas of the online interactive tutorial 162 may be rearranged in any suitable organization and one or more of the areas discussed below may be optional.

A menu bar area 401 of the online interactive tutorial 162 may display the various steps associated with the tutorial for the real estate transaction process. The steps associated with the tutorial may include an introduction buyer process step, a planning step, a show condition step, asking price step, marketing materials step, a find a buyer step, a negotiate a deal step, and a closing step. In one embodiment, a computer mouse that hovers above the icon associated with a step in the menu bar area 401 may display additional sub-steps associated with each step (discussed below). Selection of a step and/or sub-step by clicking or touching may cause one or more of the other areas of the online interactive tutorial 162 to update including the video area 403.

The video area 403 may be configured to display a video providing instructional information to the seller of the online interactive tutorial 162 regarding the real estate transaction process. The video area 403 may also display text and emit sound related to the real estate transaction process.

The online interactive tutorial 162 may also contain a goals area 405, configured to display the estimated savings and possible uses of the estimated savings from using the real estate transaction process associated with the online interactive tutorial 162. The goals area 405 may be updated based on information received from the interactive input area 411 (discussed below) of the online interactive tutorial 162. The online interactive tutorial 162 may also contain a sign-in/out area 407 that displays information regarding login, logout and the user name.

The online interactive tutorial 162 may also contain a quick reference area 409 that displays one or more icons.

Upon clicking or selecting one of the displayed icons, in one embodiment, the seller may be redirected to a different website, webpage and/or other portions of the online interactive tutorial 162 may be updated with different fields.

The interactive input area 411 may include textbooks, radio buttons, drop-down selection menus and the like that ask the seller to input information regarding the real estate transaction. The prompts and/or fields displayed in the interactive input area 411 may update with information received from the CSU 164. The interactive input area 411 may display different questions, prompts, or utilities based on the step of the real estate transaction process. The interactive input area 411 may include a print button or other selectable button that provides a link to a printable document. The printable document may provide more information about any questions and answers asked in the interactive input area 411. Examples of the interactive input area 411 in connection with various stages of the real estate transaction process are discussed below. Information input into the interactive input area 411 may be transmitted from by the online interactive tutorial 162 to the CSU 164.

Figure 5:
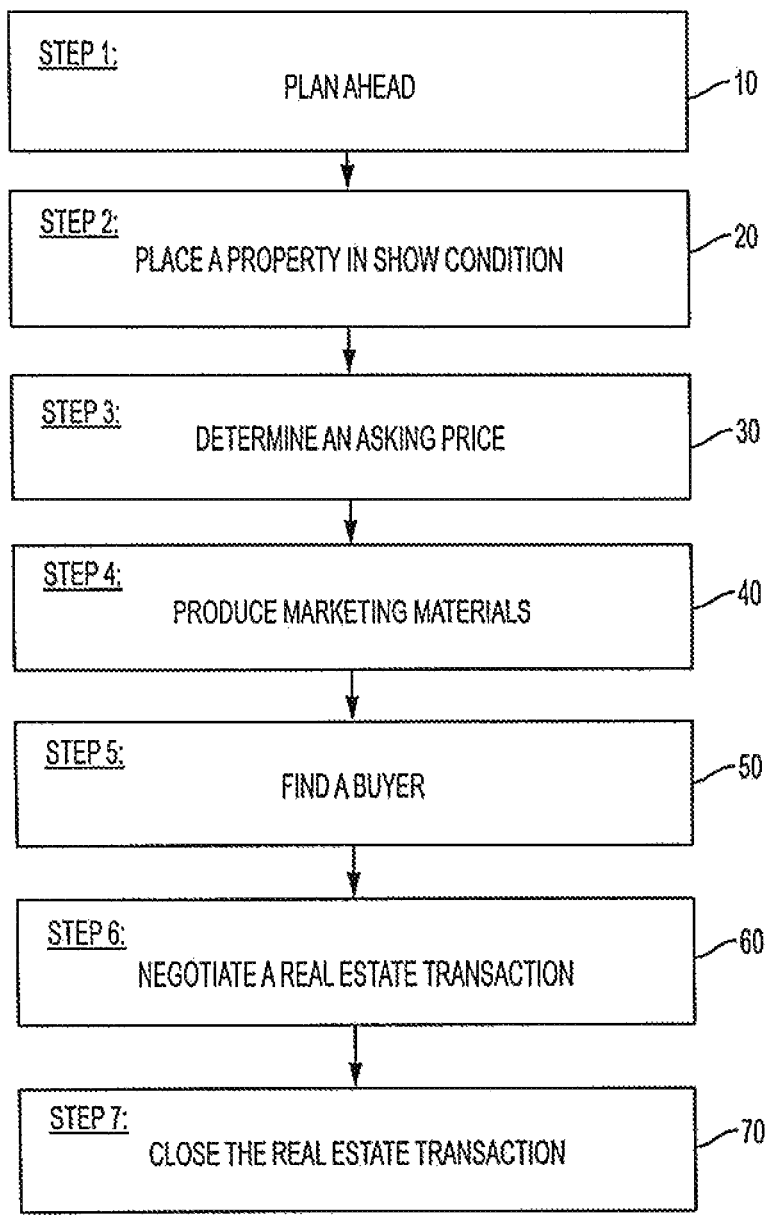
FIG. 5 is a flow chart illustrating an example method of processing real estate transactions in accordance with the online interactive tutorial shown in FIG. 4, according to an aspect of the present disclosure.

Turning now to FIG. 5, which illustrates a seven step process for a web-based real estate transaction processing procedure implemented by the online interactive tutorial 162 described herein. The steps presented in FIG. 5 may correspond to those displayed in the menu bar area 401 of the online interactive tutorial 162. The online interactive tutorial 162 may provide instructions to the seller to Step 1: Plan Ahead 10; Step 2: Place a Property in Show Condition 20; Step 3: Determine an Asking Price 30; Step 4: Produce Marketing Materials 40; Step 5: Find a Buyer 50; Step 6: Negotiate a Real Estate Transaction 60; and Step 7: Close the Real Estate Transaction 70.

As a part of Step 1: Plan Ahead 10, the server system 160 may receive seller input from seller device 110 and may support the seller's motivation to complete the real estate transaction by calculating various estimated savings, determining what a seller will do with the savings, producing manuals, and the like. In one embodiment Step 1: Plan Ahead 10, may involve displaying and receiving data and information via interactions between the server 160, and seller devices 110. For example, in one embodiment the estimated savings may be computed by computational module 165.

As a part of Step 2: Place a Property in Show Condition 20, the online interactive tutorial 162 may provide guidance for placing the property in show condition. In one embodiment, at least a part of the guidance displayed on the seller device 110 as a part of the online interactive tutorial 162 may be based on the data and information provided to the server system 160 by the seller as a part of Step 1: Plan Ahead 10.

As a part of Step 3: Determine an Asking Price 30, the online interactive tutorial 162 may assist a seller in determining an asking price that reflects fair market value, and may implement a selling goal for the seller. Determining an asking price may involve tutorial 162 causing computational modules 165 to perform calculations, tutorial 162 causing data and information related to the calculations conducted by the computational modules 165 to be displayed via GUI 112. CSU 164 may parse tutorial 162 to extract data and information from the seller's input to the tutorial 162.

As a part of Step 4: Produce Marketing Materials 40, the online interactive tutorial 162 may provide a seller with marketing materials, obtained from database 170, the seller may then print.

As a part of Step 5: Find a Buyer 50, the online interactive tutorial 162 may assist the seller in finding a buyer for the real estate property. In some embodiments the Find a Buyer 50 step may involve conducting regular open houses and making mid-course corrections until a buyer is found. In some embodiments, online interactive tutorial 162 may present suggested mid-course corrections to GUI 112. In some embodiments, the mid-course corrections may be determined by buyer focused computational utility, and may be based on data analysis performed by the computational modules 165, as well as any input received from the counselor device 130.

As a part of Step 6: Negotiate a Real Estate Transaction 60, the online interactive tutorial 162 may include providing guidance to the seller for negotiating directly with a buyer to initiate a real estate transaction. In one embodiment, the guidance may be stored in the database 170. The negotiate step 60 may be conducted without the presence of a buyer's agent.

As a part of Step 7: Close the Real Estate Transaction 70, the online interactive tutorial 162 may guide a seller through opening escrow, due diligence, home inspection and appraisal. This may involve providing via the tutorial 162 one or more electronic documents stored in the database 170.

Each of the seven steps presented in the interactive online tutorial 162 and illustrated in FIG. 5 may include one or more sub-steps, as discussed below in relation to FIGS. 6-20.

Figure 6:
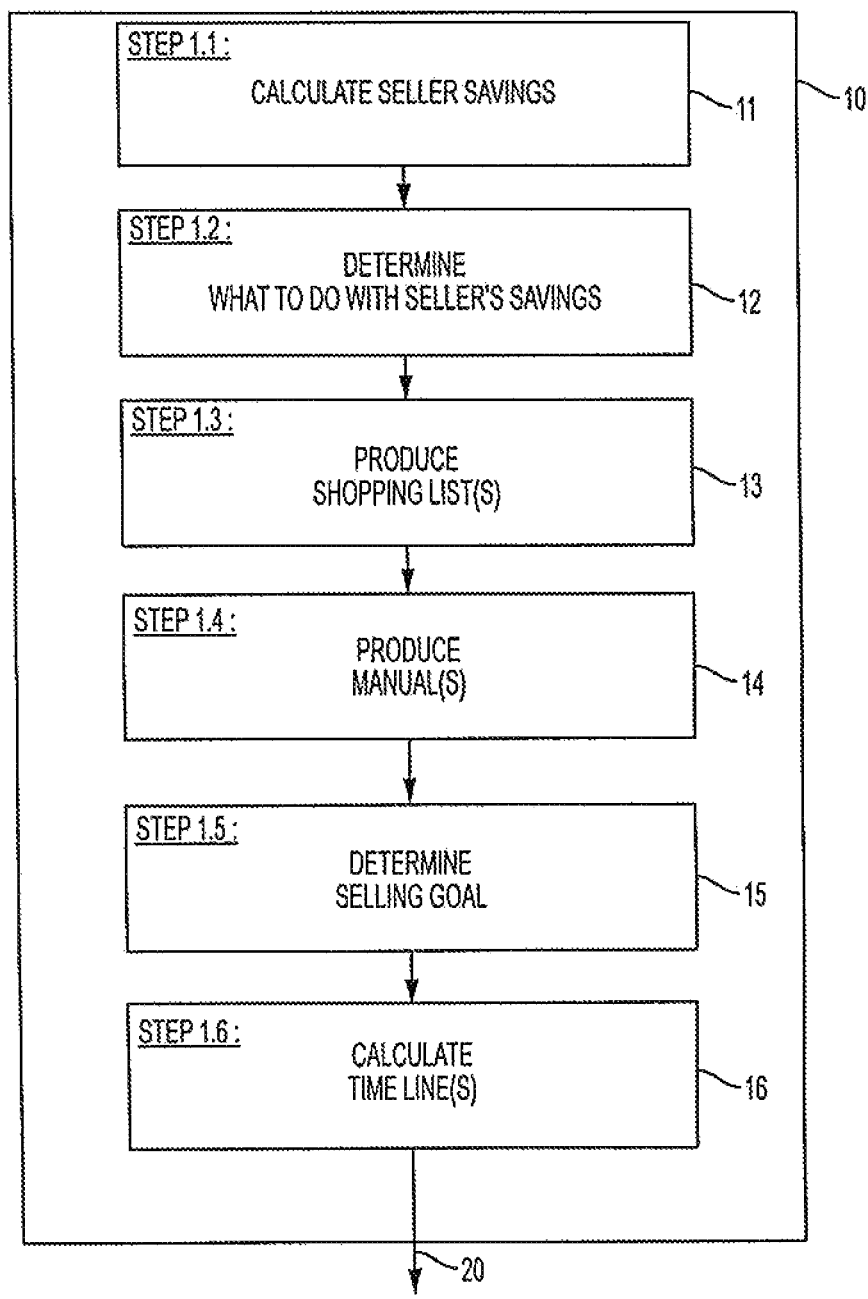
FIG. 6 illustrates one or more example sub-steps of the method shown in FIG. 5 according to an aspect of the present disclosure.

In particular, as is illustrated by FIG. 6, an example process for Step 1: Plan Ahead 10 may include various sub-steps including, for example, Step 1.1: Calculate the seller's savings 11, Step 1.2: Determine what to do with the seller's savings 12, Step 1.3: Produce shopping lists 13, Step 1.4: Produce manuals 14, Step 1.5: Determine a selling goal 15, and Step 1.6: Calculate a time line 16. The sub-steps may involve receiving data and information from the seller, transmitting the information to the server 160, and receiving updates to the online interactive tutorial 162 from the server 160. The updates may then guide the prompts presented to the seller as a part of the online interactive tutorial 162.

Figure 7:
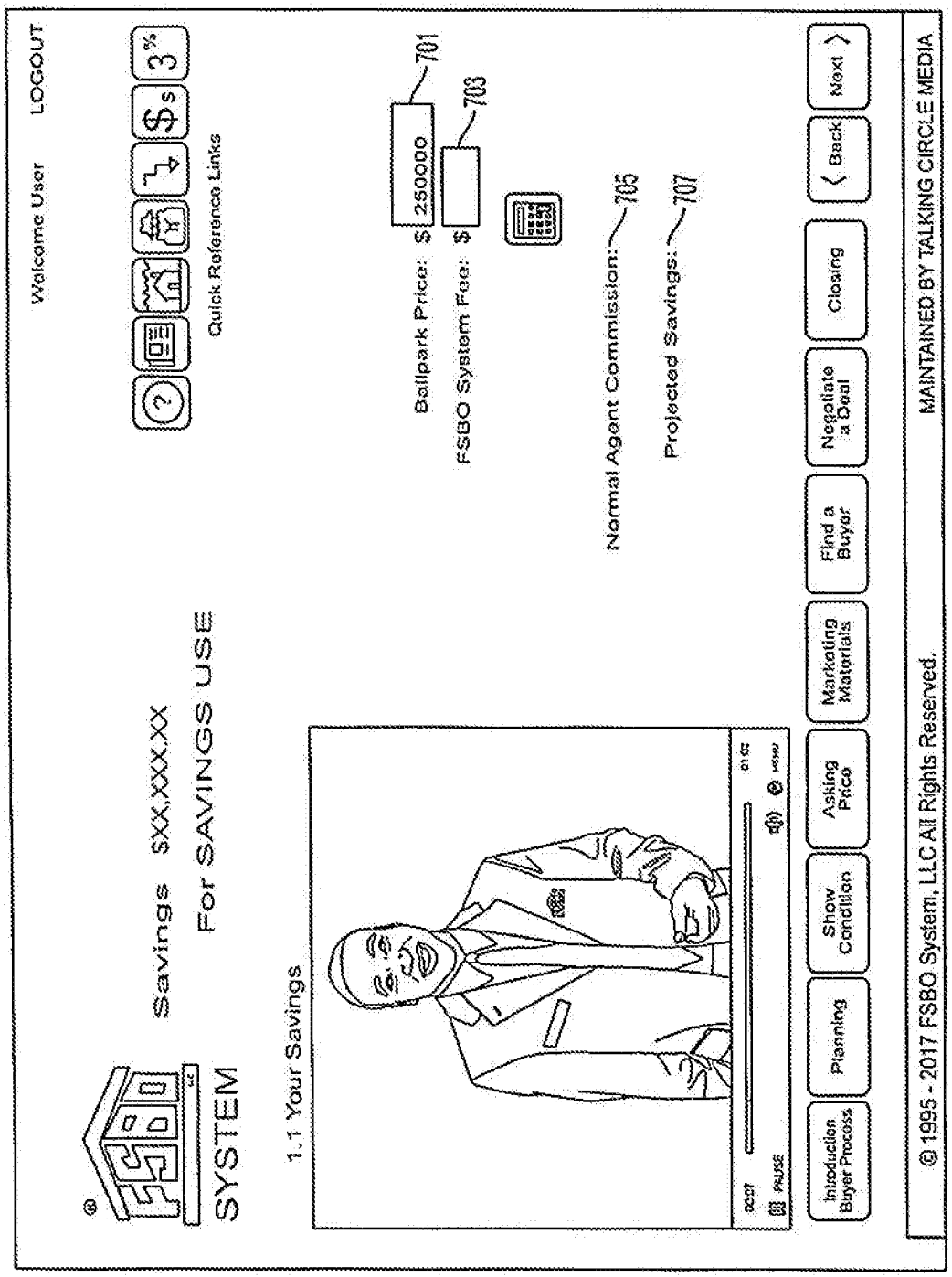
FIG. 7 illustrates an example online interactive tutorial screen in a sub-step of FIG. 6 according to an aspect of the present disclosure.

For example, as illustrated in FIG. 7, after selecting Step 1: Plan Ahead (see step 10 in FIG. 5) from the menu bar area 401 and more particularly Step 1.1: Calculate Seller's Savings (see 11 in FIG. 6), the interactive input area 411 may request that a seller input an estimate of the price the seller desires to list the house at field 701, and in response the system may automatically calculate and/or display the fees paid to the system in area 703, commissions received by an agent in a traditional real estate transaction in area 705, and the savings afforded by the presented real estate transaction process in area 707. Typically, the savings afforded by the presented real estate transaction process is equivalent to the difference between the commissions received by an agent in a traditional real estate transaction (e.g., 6% of the transaction value) and the fees paid to the system. In one embodiment, the savings may be calculated by the computational modules 165 of the server 160 in response to information input into the online interactive tutorial 162.

Figure 8:
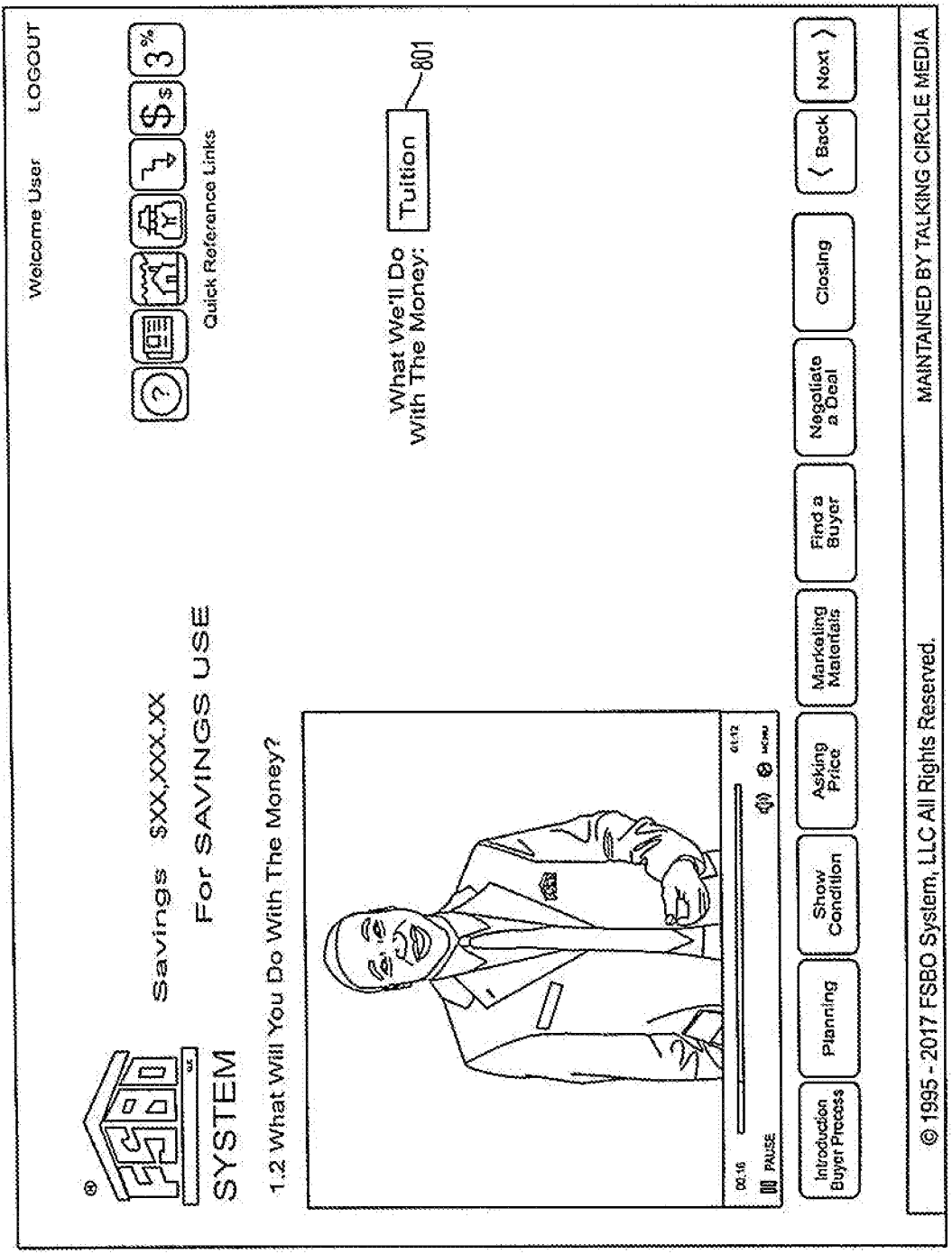
FIG. 8 illustrates an example online interactive tutorial screen in a sub-step of FIG. 6 according to another aspect of the present disclosure.

Additionally, as illustrated in FIG. 8, as a part of Step 1: Plan Ahead 10 and more particularly, Step 1.2: Determine what to do with Seller's Savings 12, a seller may be requested to input what they intend to do with the savings afforded by the presented real estate transaction process in a field 801. The savings value of step 1.1 and the intended use of step 1.2 may be used to update the goals area 405, thereby providing motivation for a seller to continue using the systems and methods described herein. Whereas some sellers may be motivated simply by money as an abstract concept, others may be motivated by what the money will buy. Online interactive tutorial 162 may provide examples of possible applications of the savings, such as college tuition, a trip to Europe, a new vehicle, a new boat etc. In some embodiments, the examples may be provided by previous sellers.

In some embodiments, the seller's inputted text information (related to Step 1.2) may be displayed in the goals area 405 throughout the use of the online interactive tutorial 162, and may also be transmitted to the CSU 164, counselor device 103, stored in database 170, and integrated into the materials produced in Step 1.4: Produce Manual(s) 14 (discussed below).

As a part of Step 1: Plan Ahead 10 and more particularly Step 1.3: Produce Shopping List(s) 13, the online interactive tutorial 162 may provide the seller with one or more shopping lists representative of one or more suggested goods the seller may need to purchase during the real estate transaction process. Online interactive tutorial 162 may display, via GUI 112, a description of the one or more shopping lists and their purpose. Shopping list(s) may be displayed on GUI 112 or seller web browser 114. GUI 112 may display a print button linked to print shopping list(s) via printing device 150. Step 1.3: Produce Shopping List(s) allows a seller to make one trip to buy everything they may need for the entire real estate transaction process. In one embodiment, printed copies of the Produced Shopping Lists may be kept in the Seller's Manual.

As a part of Step 1: Plan Ahead 10 and more particularly, Step 1.4: Produce Manual(s) 14, the online interactive tutorial 162 may produce one or more manuals for a seller to use as a reference and/or guide to the real estate transaction process by using printed documentation. In an example, two three-ring binders with clear plastic insert covers and divider tabs may be used for the Produced Manuals. One may be a Seller's Manual, and the other may be an Open House Book. The GUI 112 may display one or more print buttons integrated into the online interactive tutorial 162 and linked to print one or more electronic documents for either the Open House Book or the Seller's Manual, via printing device 150. Over the course of online interactive tutorial 162, a seller may use the binders to contain memos, documents, worksheets and similar information and tools. In one embodiment, the memos, documents, worksheets and similar information and tools may be created and stored electronically at the seller side on a local memory of the seller device 110.

Sellers who use a Seller's Manual as described by the process of the present disclosure may be better organized and remember more of the online interactive tutorial 162. The use of a seller's manual may enable a seller to show a property and negotiate a deal without the presence of any agent, thus eliminating the need for one or more of a listing agent and a buyer's agent. In one embodiment, a Seller's Manual may have a coversheet displaying a Seller's Savings (see Step 1.1) and What to do With the Money (see Step 1.2) and may contain Produced Shopping List(s) (see Step 1.3). One or more other documents may be added to the Seller's Manual over the course of online interactive tutorial 162.

The Open House Book may provide information a buyer may need to feel comfortable making an informed offer, and may replace the inherently inefficient conventional process of agents relaying information which can result in miscommunication. In one embodiment, Open House Book may contain property disclosures, title documents, deeds, covenants and homeowner's association materials as applicable, and similar detailed information that a prospective buyer might need to make an informed offer. It may also contain one or more copies of a "buyer's packet" that may include completed state and federally-required disclosures, and a streamlined Form Purchase and Sales Agreement (optionally referred to as an "EZ Form Purchase and Sales Agreement" or an "Easy Form Purchase and Sales Agreement") that a prospective buyer may use to make an offer. In another embodiment, a counselor may contact a title agency to obtain a copy of the deed, an as-built survey and the covenants and deed restrictions, if any, and may provide the documents to the seller for inclusion in the Open House Book. Accordingly, a counselor may utilize the counselor input device 136 to transmit information to the customer service utility 164. The customer service utility 164 may then update the online interactive tutorial 162 with information that is then provided to the seller via the GUI 112.

Figure 9:
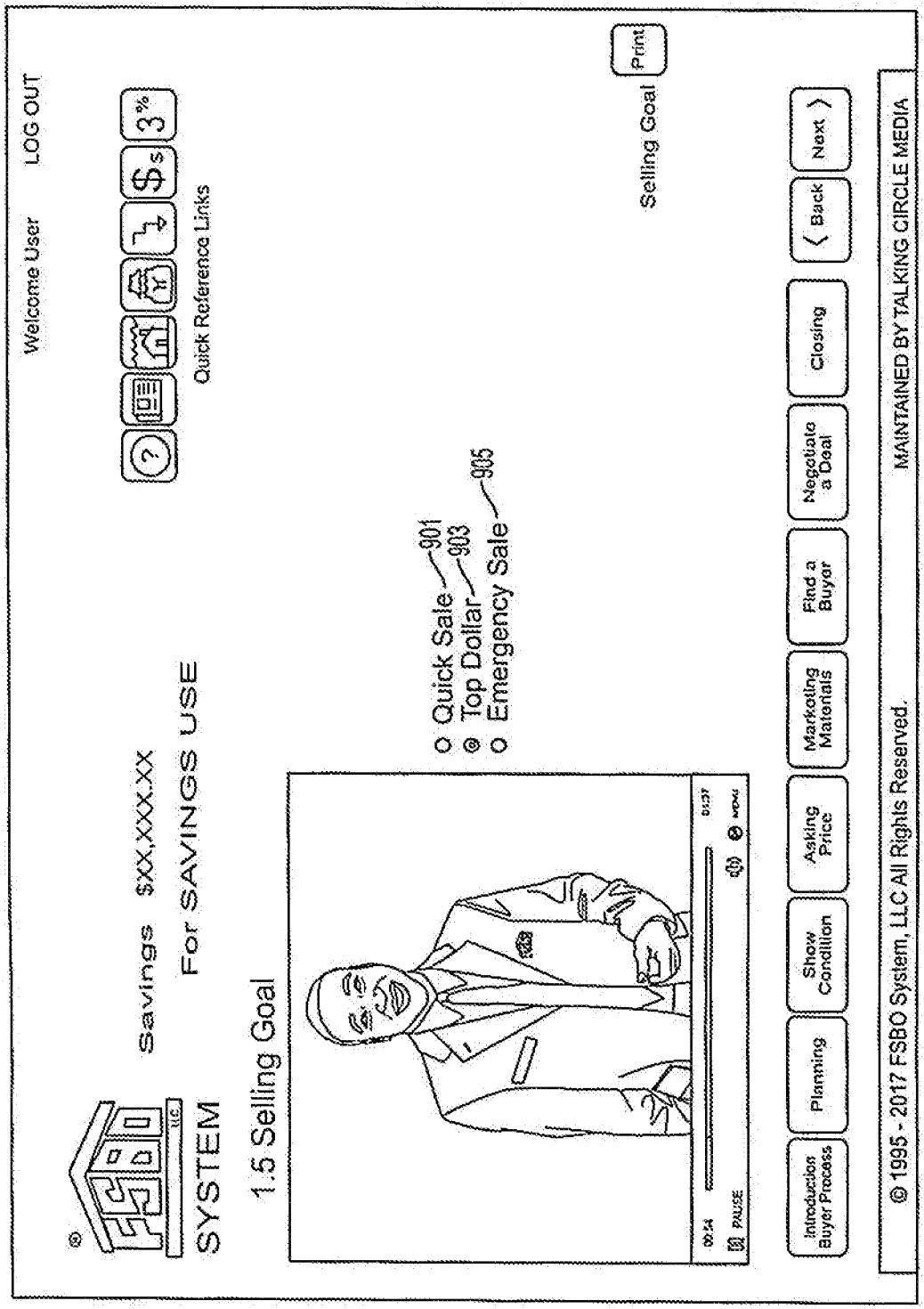
FIG. 9 illustrates an example online interactive tutorial screen in a sub-step of FIG. 6 according to another aspect of the present disclosure.

As illustrated in FIG. 9, as a part of Step 1: Plan Ahead 10 and more particularly, Step 1.5: Determining a Selling Goal 15, the online interactive tutorial 162 may establish the seller's primary goal for the real estate transaction. By setting a primary goal, multiple sellers (i.e., family members) are required to confront, and resolve, the tradeoff between price and marketing time, and may focus their attention on what has a higher priority, time or money. A seller's selling goal may inform and drive a seller's efforts and the counselor's advice during the marketing period, and any advice provided by a counselor. In the embodiment illustrated in FIG. 9, a seller may be requested to select their goal for the real estate transaction. For example, the seller may select from "Quick Sale" field 901 where the goal is to quickly divest the real estate property, "Top Dollar" field 903 where the goal is to make the most money from their real estate transaction, or "Emergency Sale" field 905 where the goal is to divesting the real estate property within 45 days. A goal of Top Dollar may include putting the home in top show condition, and a willingness to accept a 60 to 90 day marketing period, in an effort to receive a home price at the top range. For a Quick Sale goal, for example, the property may be placed in good show condition, and aim for a sale within 60 days. For an Emergency Sale goal, for example, the property may be advertised below the market price, placed in the top showing condition, require active marketing efforts. Additionally, a commission (e.g., 3%) may be offered to a buyer's agent. In examples, including a seller wanting a selling goal that is a blend of two or more goals, the seller may select an asking price in the middle of the range. A seller may change the Determined Selling Goal at any time. After a seller inputs the Determined Selling Goal, the information is transmitted from the seller device 110 to the server 160 and then may be transmitted to the counselor device 130, so that the selling goal is displayed in dashboard 134 and available for use by a counselor.

Figure 10:
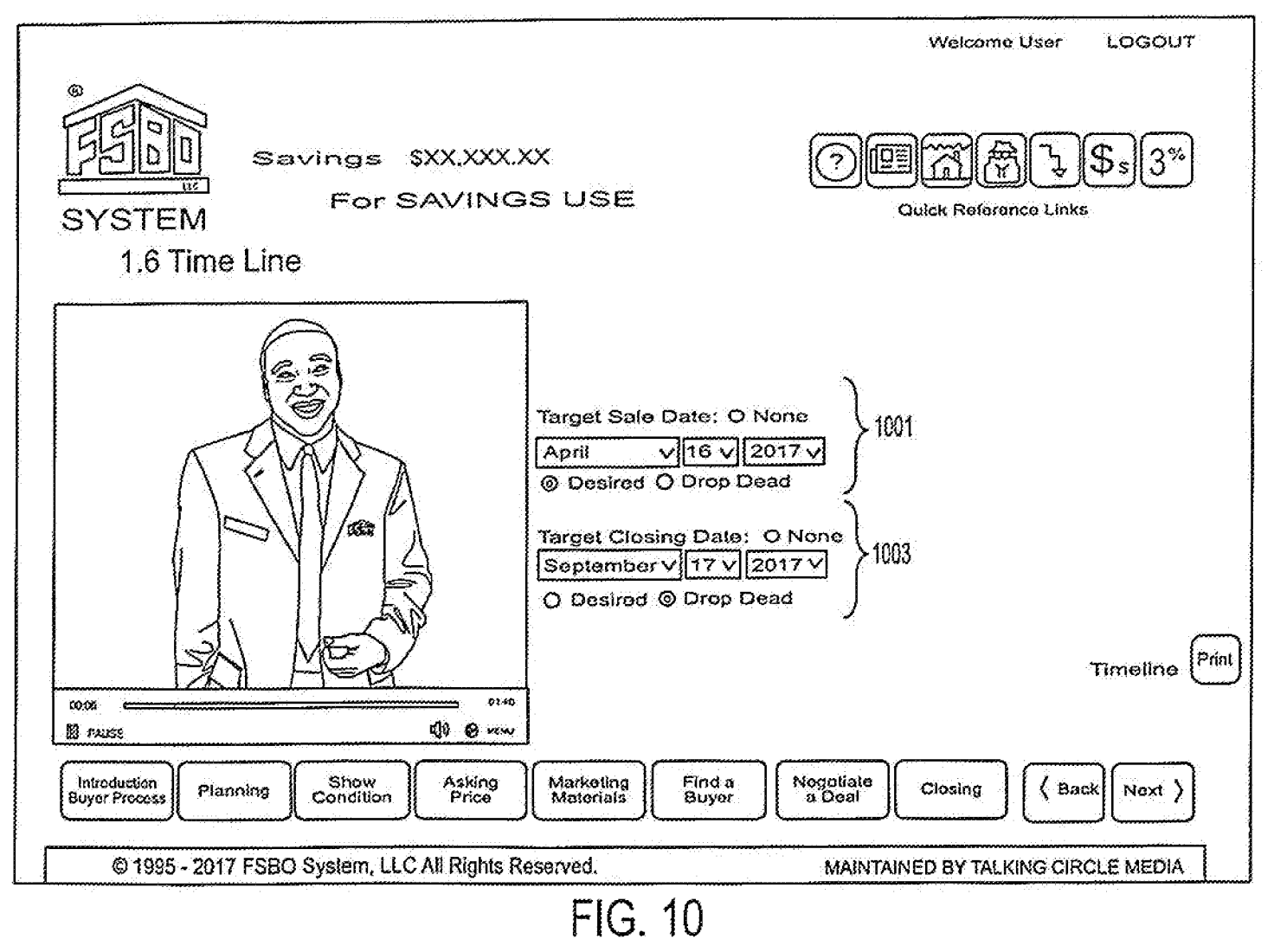

As a part of Step 1: Plan Ahead 10 and more particularly, Step 1.6: Calculate Time Line(s) 16, the online interactive tutorial 162 may be used to manage the timing of marketing and closing procedures. In a traditional real estate transaction process having agents, timelines are not typically used to manage the process. Instead, a seller may tell their agent of a looming date, and the agent's only technique is a dramatic price drop. By contrast, in the systems and methods described herein, both the seller and the counselor know of dates early in the process, and can plan ahead to eliminate the need for a price drop. As illustrated in FIG. 10, as a part of Step 1.6: Calculate Time Line(s) 16, the online interactive tutorial 162 may request a seller to enter information regarding the target sale date in a first area 1001 and closing date in a second area 1003 for the real estate transaction.

In an alternative embodiment, the interactive input area 411 may include an additional calculator. Selecting the calculator may calculate one or more time lines for the real estate transaction process, based on the information provided by the seller through the interactive input area 411 in connection with FIG. 10. In one embodiment, the calculator may calculate one or more of an On Market Date, Closing Date and A Sale Date. The On Market Date may refer to the date of a first open house. The Closing Date may refer to the date to close on a new house a seller may be buying. The Sale Date may refer to the date a seller expects to leave town for a new job. The dates comprising the timeline generated in Step 1.6 may drive the actions of both the counselor and the seller. In some examples, a seller may not have a specific For Sale Date or Closing Date (which may also be important information for both the seller and the counselor). In an example, a seller may select and print out the various time lines, via printing device•t 50, and add them to the Seller's Manual. In another example, Calculated Time Lines may also be displayed on dashboard 132, so a counselor can coach the seller to meet the Calculated Time Lines and achieve their Determined Selling Goal.

Figure 11:
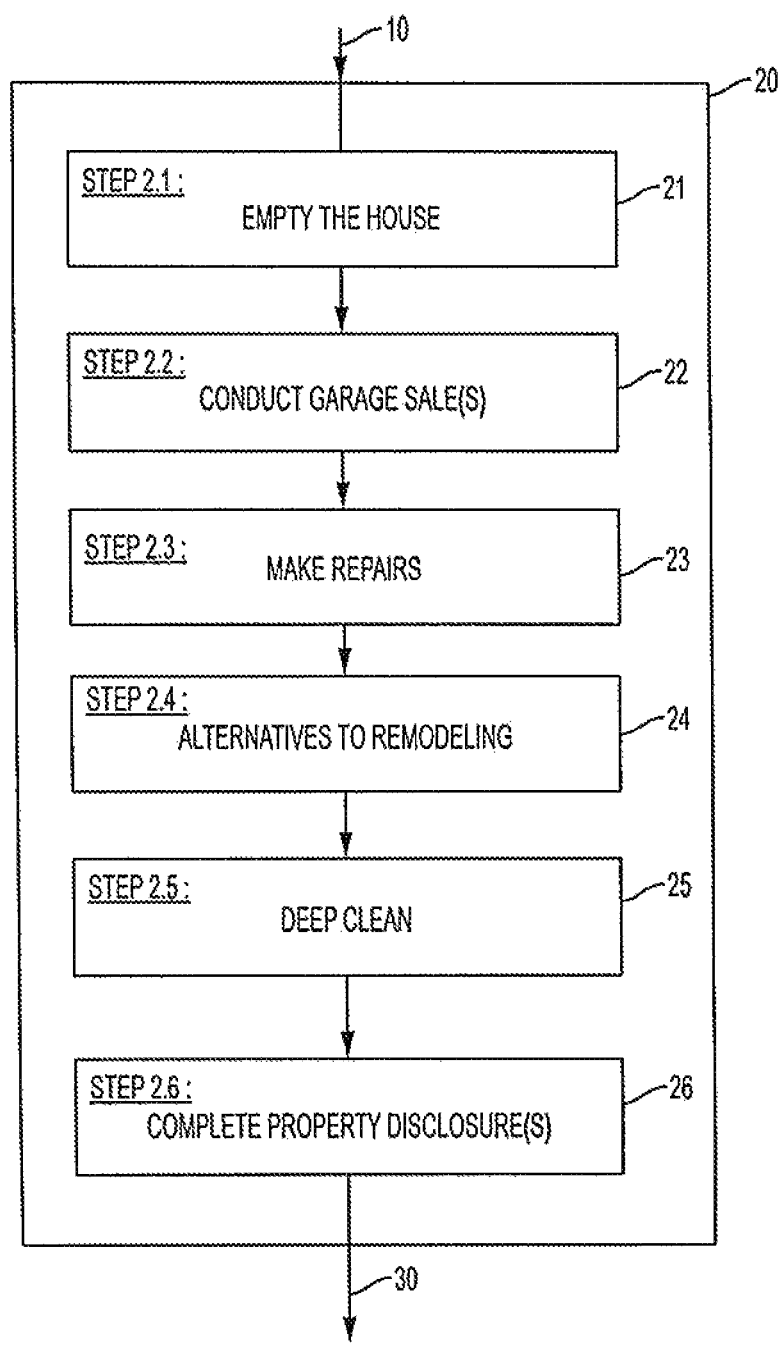
FIG. 11 illustrates one or more example sub-steps of the method shown in FIG. 5 according to an aspect of the present disclosure.

In one embodiment, after the completion of Step 1: Plan Ahead 10, the seller may proceed to the second step of the online interactive tutorial 162, namely, Step 2: Place a Property in Show Condition 20. As is illustrated by FIG. 11, an example process for Step 2: Place a Property in Show Condition 20, may include various sub-steps including, for example, Step 2.1: Empty the House 21, Step 2.2: Conduct Garage Sale(s) 22, Step 2.3: Make Repairs 23, Step 2.4: Alternatives to Remodeling 24, Step 2.5: Deep Clean 25, and Step 2.6: Complete Property Disclosure(s) 26. The sub-steps involved in Step 2: Place a Property in Show Condition 20 may involve receiving data and information from the seller, transmitting the information to the server 160, and receiving updates to the online interactive tutorial 162 from the server 160. The updates may then guide the prompts presented to the seller via GUI 112 as a part of the online interactive tutorial 162. Additionally, a counselor having counselor device 130 may contribute towards the processing step of Placing the Property in Show Condition 20 before, during, and/or after a home visit.

In Step 2.1: Empty the House 21, the online interactive tutorial 162 may present methodology and instructions to seller via GUI 112 for emptying the real estate property. As opposed to traditional real estate transaction process, the systems and methods described herein, in some examples, may advocate an empty house, as an empty house condition may allow a buyer to envision their own personalization (e.g., furniture, decorations, etc.) in the real estate property.

In an effort to empty the house, the seller may hold a garage sale, in accordance with electronic guidance from the online interactive tutorial 162 in Step 2.2: Conduct Garage Sale(s) 22. In some embodiments, a garage sale may be optional.

As a next step, the online interactive tutorial 162 may guide the seller to perform maintenance and repairs to the real estate property in Step 2.3: Make Repairs 23. In some embodiments, a counselor may assist the seller in identifying the maintenance and repairs necessary to the property. A seller may retrieve a Repair Checklist from the online interactive tutorial 162 and print, complete and catalogue (or electronically complete and store) the checklist into the seller's manual.

In connection with a counselor, the online interactive tutorial 162 may assist the seller in recognizing, anticipating, and handling functional issues (i.e., issues involving an obsolete layout or floorplan) in Step 2.4: Alternatives to Remodeling 24. The seller may then obtain a set of plans and an estimate for the remodel. Rather than carrying out the remodel, the seller may present the plans and estimate to the buyer and the buyer may decide whether to pursue the remodel. Similarly, if the counselor and/or online interactive tutorial 162 identifies style issues (i.e., worn or outdated cosmetics, paint, flooring, fixtures, window coverings, trim and appliances), the seller may be encouraged to make some of the small and inexpensive fixes. In one embodiment, the online interactive tutorial 162 may generate and provide a Style Issues Memorandum to seller device 110, that may offer different remedies for dealing with worn or outdated cosmetics. The memorandum may include suggestions such as: performing easy and inexpensive fixes, offering an allowance and offering a credit. In an example, a counselor may coach a seller to select the most effective remedy. Alternatively, the seller may be encouraged to offer an allowance to the buyer, or offer a credit to the buyer.

In Step 2.5: Deep Clean 25, the online interactive tutorial 162 may presents one or more checklists and guidelines to the seller that provide suggested guidance to the seller on cleaning of the real estate property. In some examples, an additional checklist may be presented in the event that one or more members of the seller's household is a smoker.

In Step 2.5: Complete Property Disclosures 26, the online interactive tutorial 162 may gather disclosure forms obtained from federal, state, and local government organizations, and the like. Once the disclosure forms are obtained, the online interactive tutorial 162 may present the forms to the seller for printing (and/or storage), and any signatures. The forms may disclose latent defects in the property, include well and septic inspection certificates, lead based paint disclosures, home inspection advisories and the like. In one embodiment, a counselor may be trained to assist the seller in completing the disclosure forms. In one embodiment, the information obtained from the seller may determine the forms the online interactive tutorial 162 presents to the seller for completion. For example, information regarding the age of the property, location of the property, etc. may determine whether a seller is provided with a lead paint certificate form and the like.

Figure 12:
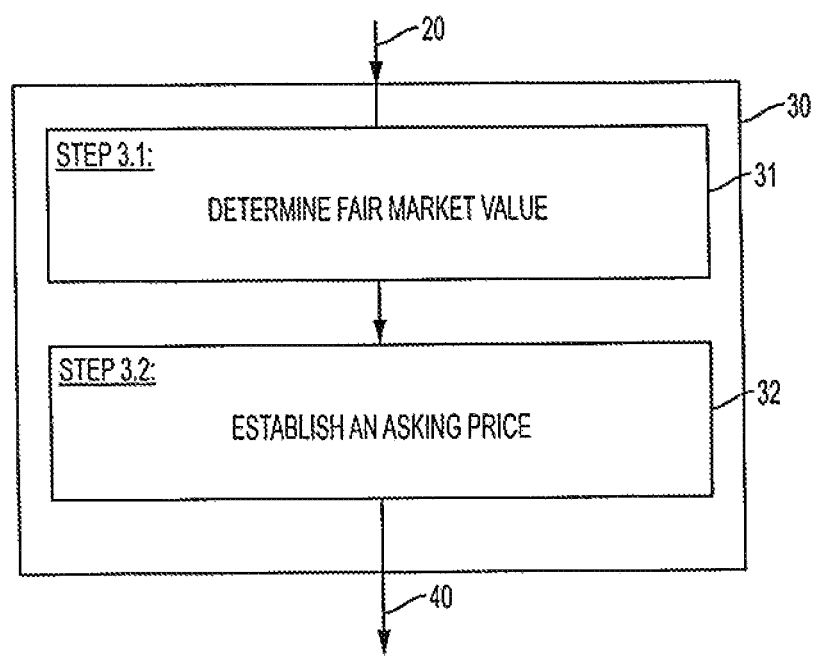
FIG. 12 illustrates one or more example sub-steps of the method shown in FIG. 4 according to an aspect of the present disclosure.

In one embodiment, after the completion of Step 2: Place a Property in Show Condition 20, the seller may proceed to the third step of the online interactive tutorial 162, namely, Step 3: Determine an Asking Price 30. As is illustrated by FIG. 12, an example process for Step 3: Determine an Asking Price 30, may include various sub-steps including for example, Step 3.1: Determine Fair Market Value 31, and Step 3.2: Establish an Asking Price 32. The main objective of Step 3 may be to determine an asking price at which the real estate property may be listed on MLS listings.

The online interactive tutorial 162 introduces an objective means of establishing an asking price. In the first step 3.1: Determine Fair Market Value 31, a counselor may provide the seller with an objective professional Comparative Market Analysis (CMA) of active listings and recent sales of properties that share one or more characteristics in common with the real estate property at issue. The counselor may prepare the CMA using a process that mirrors the buyer's process of using quantifiable search criteria in their on-line search for a home to buy. A counselor may use one or more home listing websites 120, via counselor device 1330, such as, MLS, Realtor.com, Zillow or Trulia to search for criteria related to home prices. In an example, a counselor may prepare two different CMAs, one based on pending and recently sold houses, and another for active listings. While sold houses are a good indicator of buyer demand, they may not reflect current market conditions. Active listings may be more relevant, because they represent the seller's competition. Search criteria may include one or more of number of bedrooms; number of bathrooms; number of garage spaces; house size, plus or minus 10%; lot size, plus or minus 20%; the year the home was built, plus or minus five years; or the neighborhood or school attendance area. Typically, for a normal house in a normal urban or suburban market, the search may find 10-12 comparable houses. A counselor may increase or decrease the number of comparable houses, based on factors related to a seller's house and comparable houses. The factors may include a recent remodel, the layout of the house (such as, ranch, two-story, etc.), the architectural style of the house, or special features (such as, waterfront, community association etc.) In some embodiments, the counselor may use these factors to identify three or four very close approximations of the seller's house.

A counselor may calculate the price per square foot of the best comparable properties found with the search. A counselor may multiply the price per square foot of the best comparable properties by the number of square feet in the seller's house, to produce a range of prices for the seller's house. Accordingly, in one embodiment, the CMA may provide a range of prices that are representative of the fair market value and are then presented by the counselor to the seller. In an embodiment, a counselor may present the CMA to a seller via seller device 110, using GUI 112 or web browser 114. In another embodiment, a counselor may present the CMA to a seller at a home visit and discuss it with them. In another embodiment, counselor may communicate the CMA to a seller via phone, Skype, social media, email, instant messaging, and the like.

As a part of Step 3.2: Establishing an Asking Price 32, the seller may make price adjustments to the CMA. In one embodiment, in order to ensure that the adjustments are calculated objectively, a seller may do the adjustment calculation in advance of seeing the CMA provided by the counselor. Prior to a counselor session or receiving the CMA via the seller device 110, the seller may use online interactive tutorial 162 to calculate price adjustments. Price adjustments may be calculated as positive or negative points, related to positive and negative market conditions. In an example, a seller may use one or more worksheets to calculate price adjustments while in a neutral environment, (i.e., without knowing what the CMA shows).

In one embodiment, a price may be adjusted upwards (a higher asking price) for stable and/or rising market dynamics, selling during spring and/or summer, when the show condition is high, when the seller is financing or is a lease purchase, for a selling goal of Top Dollar, when the housing market is appreciating at double digits, or the like. In one embodiment, a price may be adjusted downwards (a lower asking price) for falling or unstable market conditions, selling during the holidays, when tenants are present on the property, when the seller cannot hold regular open houses, for low show conditions, for a selling goal of Quick Sale or Emergency Sale, or when the seller is selling into a failing market. In one embodiment, the seller may enter their answers regarding questions based on the above market and property conditions such that the computational modules 165 of the server 160 may receive the answers and compute the appropriate price adjustment. The various algorithms or calculations including that for adjusting the CMA provided by the present systems and methods are discussed below.

After a seller has made price adjustments, the seller's adjusted weight, the CMA and the average price for the house from the CMA may be reviewed with the counselor. If there is an issue as to whether a house is a good comparable property, a seller may make an appointment to look at the comparable house, or attend a scheduled open house.

Optionally, Step 3.2: Establishing an Asking Price 32, may also include calculating a Baseline CMA. A Baseline CMA may be dependent upon the average price per square foot of the comparable properties (from the CMA) and is discussed in full, below, in relation to various algorithms or calculations determined by computational modules 165.

Optionally, Step 3.2: Establishing an Asking Price 32, may further include polishing (i.e., adjusting) the asking price. Polishing may include one or more sub-steps geared directly towards the search parameters a buyer typically enters into a home listing website to find houses that meet their criteria. Polishing may include matching search parameters. A buyer's search parameters are often expressed in $10,000 increments. For instance, if an asking price is $402,500, it will miss prospective buyers who cut off their search parameter at $400,000. Polishing may include matching search parameters by dropping an asking price below the next lowest natural cutoff used for searching. For instance, in the $402,500 situation, the asking price may be dropped to $399,000. Polishing may also include rounding up the price. Rounding up the price may include making an extra $900 by rounding up the asking price from the price determined by matching search parameters to the nearest $900. For example, in the case of a $399,000 asking price determined by dropping below the next lowest natural cutoff used for searching, the asking price may be rounded up to $399,900.

The determined asking price may be input to the dashboard 132 by a seller using seller device 110, or a counselor using counselor device 130. The determined asking price may be displayed on GUI 112, a flyer, an MLS listing and any marketing materials produced by the systems and methods described herein.

In some embodiments, Step 3: Determine Asking Price 30 may include special pricing situations, including, a short sale or a falling market. In such an embodiment, the GUI 112, and more specifically the interactive input area 411 of the online interactive tutorial 162 may include one or more additional links to select documentation related to special pricing situations. A first additional link may link to a short sale document related to a seller owing more on the house than it is worth (i.e., a short sale situation). A short sale document may advise the seller as to how to find the extra money to pay off their mortgage, to save their credit rating, and to prevent a delay (and consequent buyer uncertainty) inherent in a short sale process. However, if a short sale is the only option, the short sale document may advise contacting a lender to get a loan process going as soon as possible.

Figure 13:
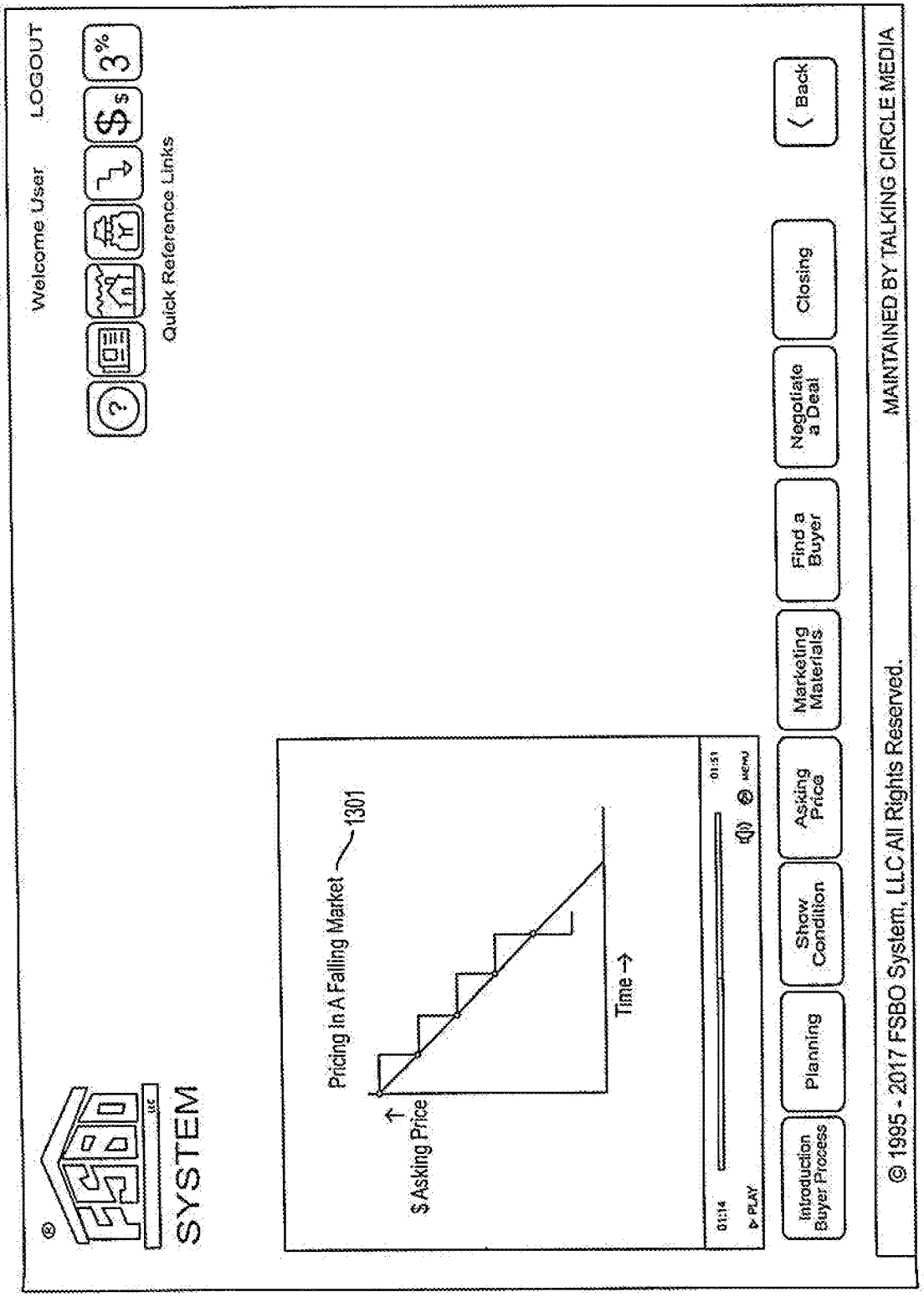
FIG. 13 illustrates an example online interactive tutorial screen in a sub-step of FIG. 12 according to an aspect of the present disclosure.

A second additional link may link to a falling market document. In a falling market, the longer the house is on the market, the lower the sale price, or, conversely, the quicker the sale, the higher the sale price. In a falling market, the goal may be simply for the seller to get a deal. In an example, a second additional link may link to one or more graphs showing a relationship between an initial asking price, price reductions, and time to sell. In another example, a second additional link may link to a video presentation related to falling market conditions, as illustrated in FIG. 13. In a further example, a second additional link may link to a combination of a video presentation related to falling market conditions and one or more graphs 1301 showing the relationship between an initial asking price, price reductions, and time to sell. GUI 112 may display one or more print buttons linked to print falling market documentation for adding to a Seller's Manual, via printing device 150 (or may include one or more buttons to electronically store the falling market documentation).

Figure 14:
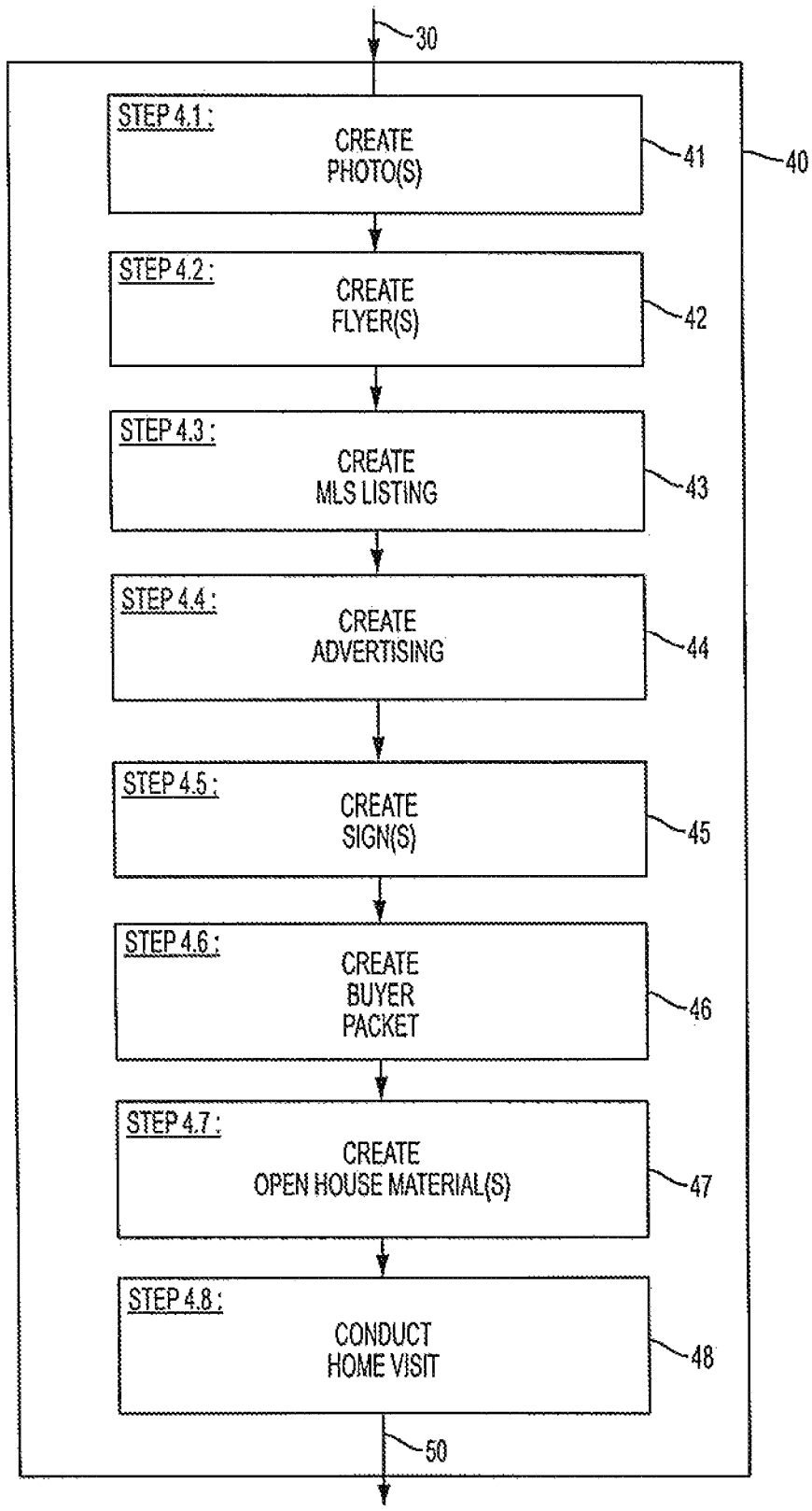
FIG. 14 illustrates one or more example sub-steps of the method shown in FIG. 5 according to an aspect of the present disclosure.

In one embodiment, after the completion of Step 3: Determining an Asking Price 30, the seller may proceed to the fourth step of the online interactive tutorial 162, namely, Step 4: Produce Marketing Materials 40. As is illustrated by FIG. 14, an example process for Step 4: Produce Marketing Materials 40, may include various sub-steps including for example, Step 4.1: Create Photo(s) 41, Step 4.2: Create Flyers 42, Step 4.3: Create MLS Listings 43, Step 4.4: Create Advertising 44, Step 4.5: Create Sign(s) 45, Step 4.6: Create Buyer Packet 46, Step 4.7: Create Open House Material(s) 47, and Step 4.8: Conduct Home Visit 48.

As a part of Step 4: Producing Marketing Materials 40, a seller may take (i.e., capture) and upload one or more pictures to the online interactive tutorial 162. The photos created in Step 4.1: Create Photo(s) 41 may include exterior photos and interior photos. In some examples, tutorial 162 may also support the capturing and uploading of videos. The online interactive tutorial 162 may provide instructions for taking the optimal quality of photographs and videos. In one embodiment, a seller may receive feedback on the quality of images uploaded to the online interactive tutorial 162 from the tutorial 162 and/or the counselor via the counselor device 130. The photos and videos may be used in all the prepared marketing materials and MLS listing.

Figure 15A:
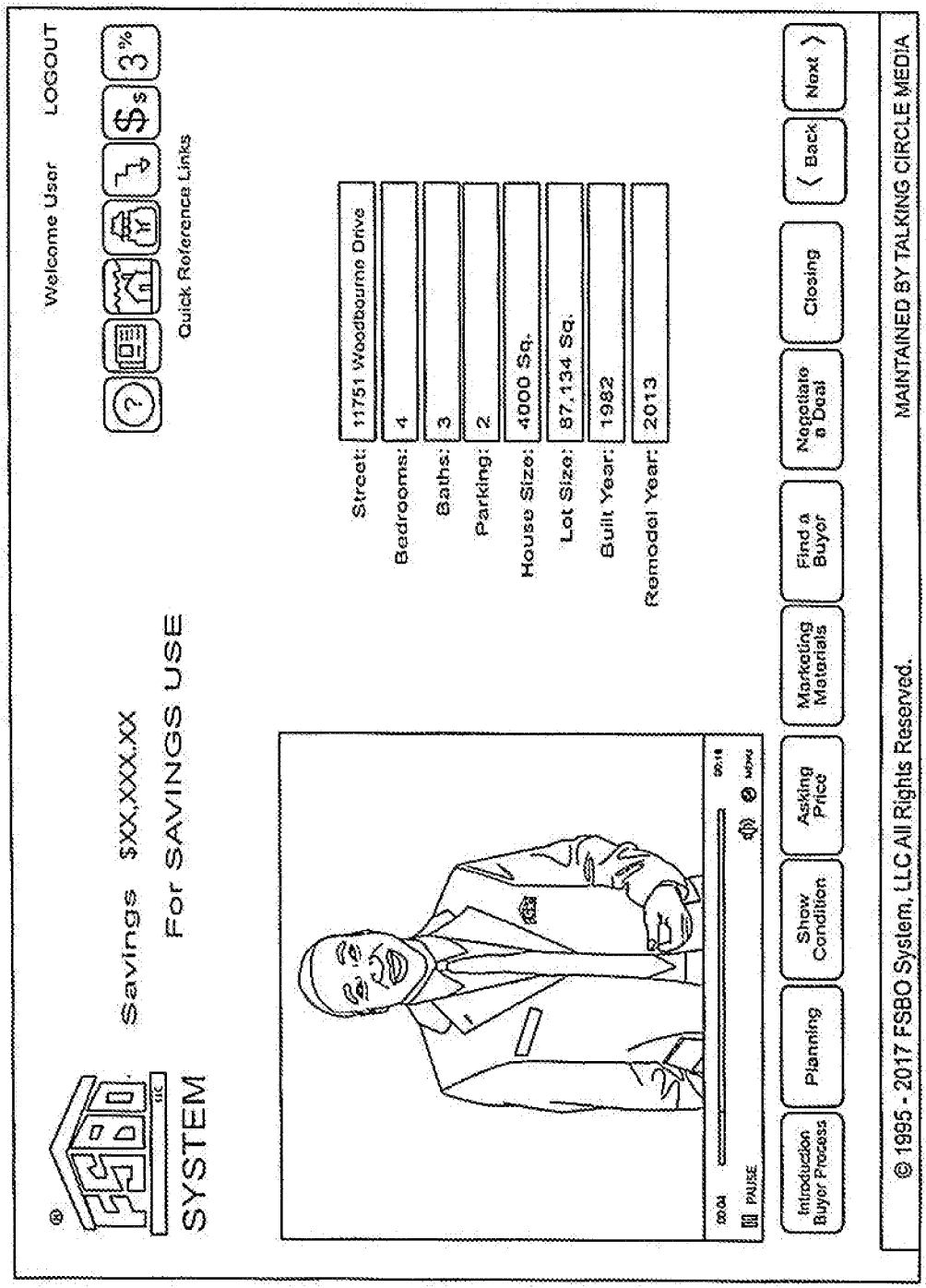
FIG. 15A illustrates an example online interactive tutorial screen in a sub-step of FIG. 14 according to an aspect of the present disclosure.
Figure 15B:
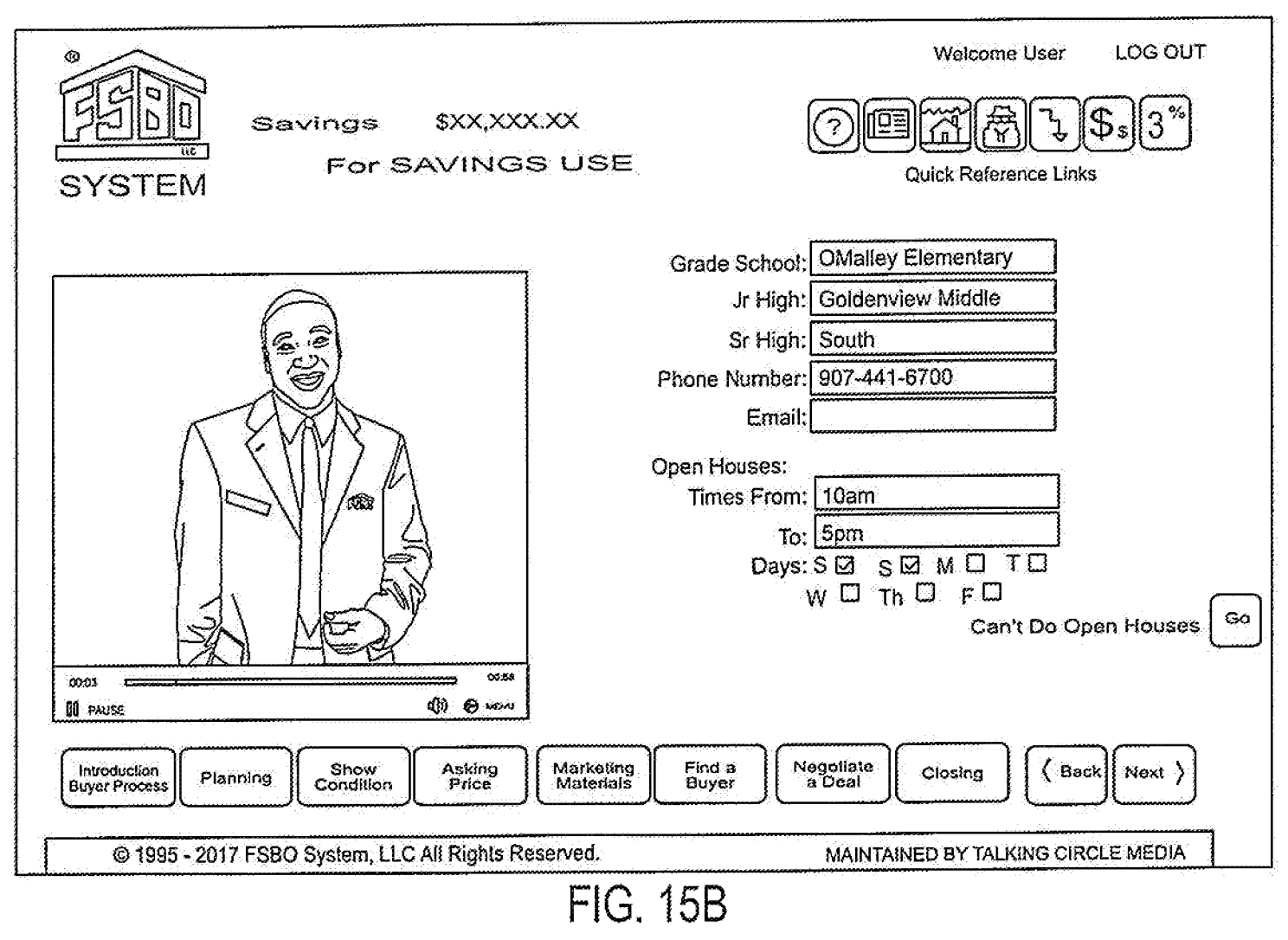
Figure 15C:
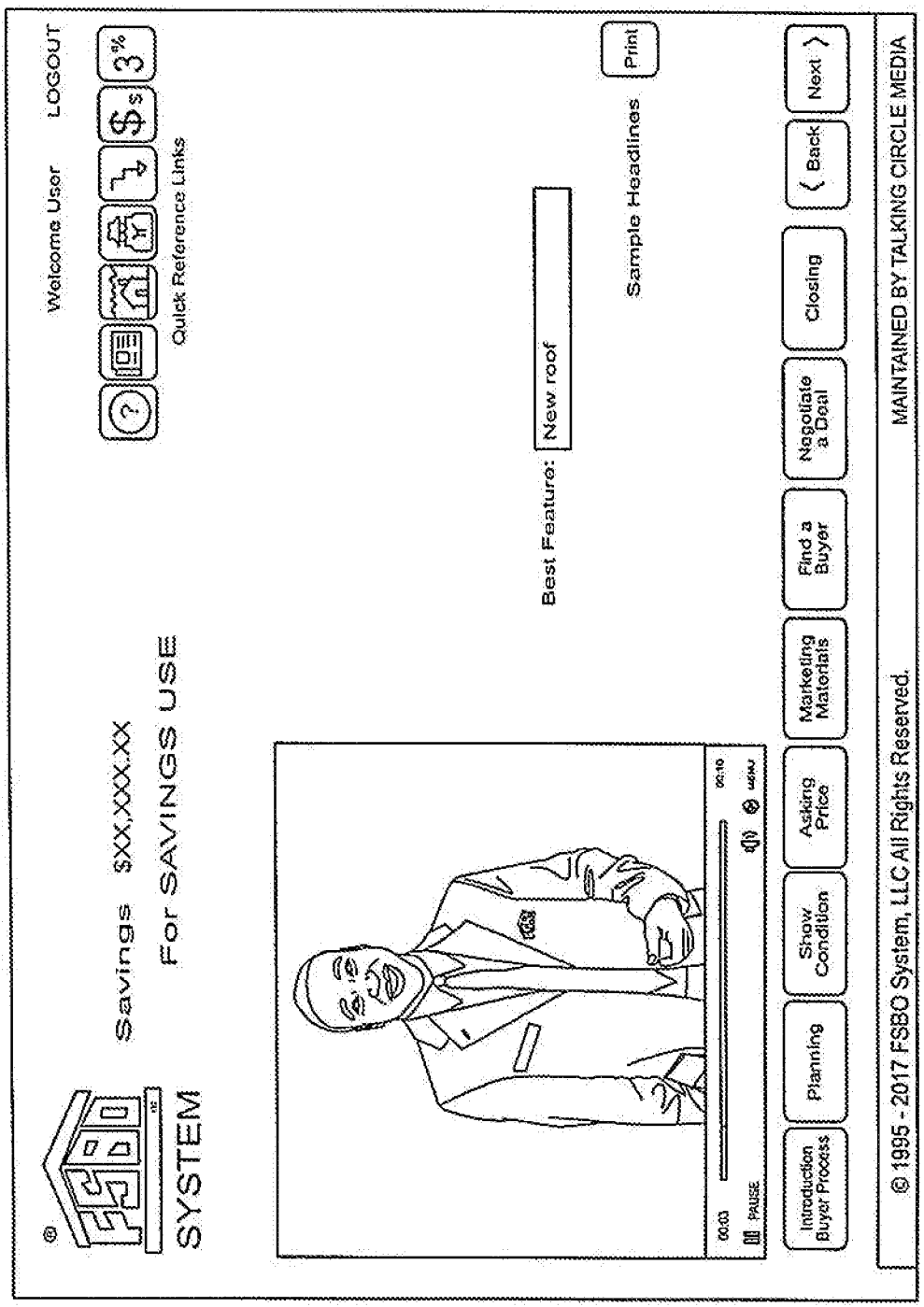
FIG. 15C illustrates an example online interactive tutorial screen in a sub-step of FIG. 14 according to another aspect of the present disclosure.
Figure 15D:
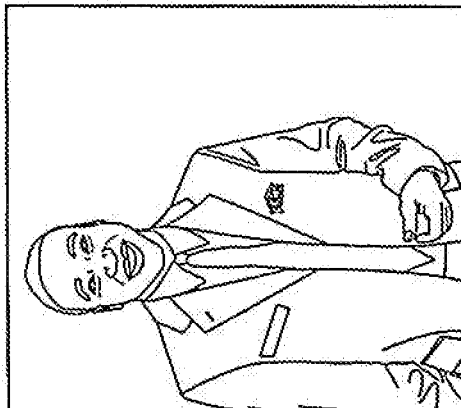
FIG. 15D illustrates an example online interactive tutorial screen in a sub-step of FIG. 14 according to another aspect of the present disclosure.
Figure 15E:
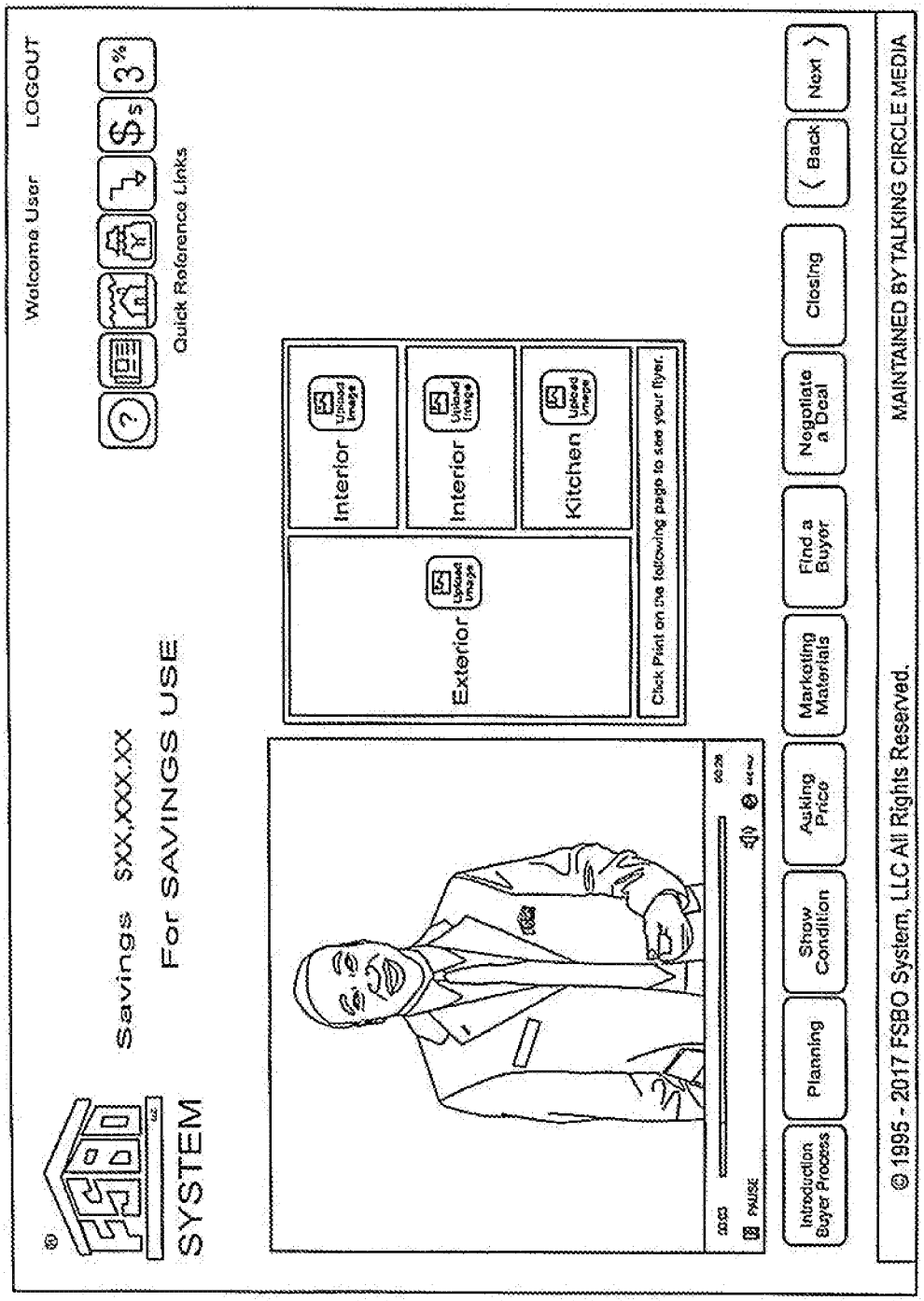
FIG. 15E illustrates an example online interactive tutorial screen in a sub-step of FIG. 14 according to another aspect of the present disclosure.

As a part of Step 4.2: Create Flyer(s) 42, the seller may enter information into one or more fields of the interactive input area 411 of the online interactive tutorial 162, as is illustrated in FIG. 15A. For example, the seller may input data and information related to the address, number of bedrooms, number of bathrooms, parking, house size, lot size, year built, and year remodeled. Once a first set of information is entered and transmitted to the server 160, a second set of information may be requested from the seller, as is depicted in FIG. 15B. For example, as depicted in FIG. 15B, the interactive input area 411 may request information related to nearby schools, contact information for the seller, and times for regularly scheduled open houses. By holding regular open houses, the need for a buyer's agent may be eliminated. Additionally, the interactive input area 411 may request information related to the best feature of the property, as illustrated in FIG. 15C, and other features of the property (optionally, those not visible from the front of the house) as illustrated in FIG. 15D. The seller may then upload one or more photos and videos taken during Step 4.1: Create Photo(s) 41 to the interactive input area 411 as is illustrated in FIG. 15E. The photos may include exterior and interior photos, including the kitchen.

Figure 15F:
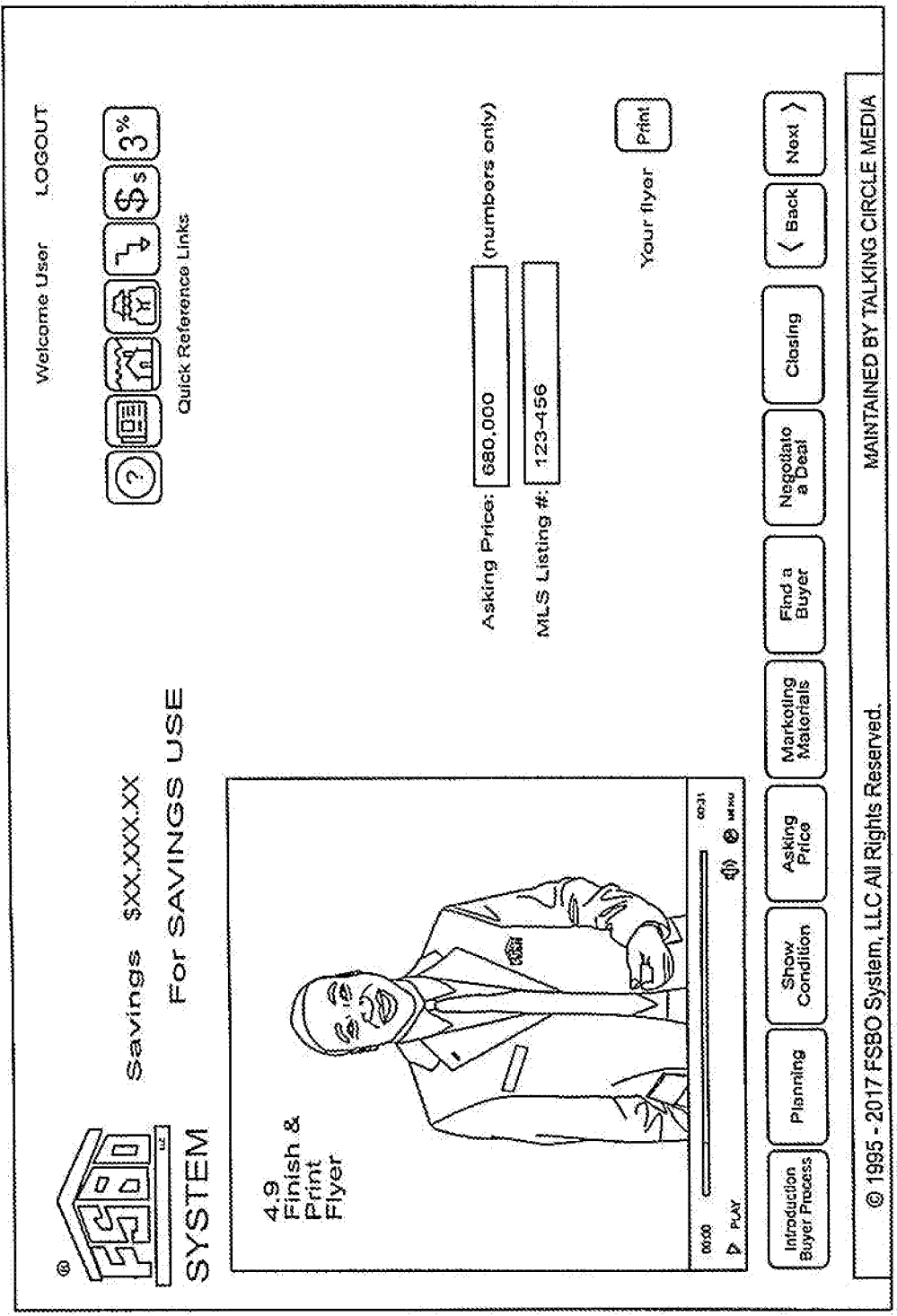
FIG. 15F illustrates an example online interactive tutorial screen in a sub-step of FIG. 14 according to another aspect of the present disclosure.

Additionally the seller may input the asking price (see Step 3: Determining an Asking Price discussed above) and MLS information as is illustrated in FIG. 15F. The data and information input into the interactive input area 411 may then be transmitted to the server 160, and server 160 may then create a sample flyer. The sample flyer may then be transmitted back to the seller, and printed at the seller's printing device 150 (or another printing device). The flyer constructed in this process may be transmitted and stored on the CSU 160 for use by the counselor. Any updates to the flyer by the seller using the online interactive tutorial 162 may also be transmitted and stored on the CSU 164 and provided to the counselor. In one embodiment, the CSU 164 may detect that a flyer has been completed and transmit a notification (i.e., email) to the counselor device indicating the flyer has been created It is noted that the systems and methods described herein often utilize open houses to attract buyers of the real estate property. Accordingly, in one embodiment, the flyer may reflect regular, scheduled, advertised open houses for the real estate property. Thus the systems and methods described herein allow for real estate transactions to proceed without the presence of an agent.

As a part of Step 4.3: Create A MLS Listing 43, the online interactive tutorial 162 may provide the seller with MLS input forms and checklists. The data and information input via seller device 110 for the flyer (including photos) may be used to complete the MLS input form. In one embodiment, online interactive tutorial 162 may gather information from the seller via the seller device 110, construct an electronic version of the MLS input form at the server 160, and submit the created MLS form to one or more home listing websites 120.

As a part of Step 4.4: Create Advertising 44, the online interactive tutorial 162 may include guidance on how the seller may advertise on different platforms including social media. In one embodiment, the online interactive tutorial 162 may include links to and may be integrated with social media websites that allow the seller to upload their created flyer. In one embodiment the uploaded flyer information may be stored in the database 170.

As a part of Step 4.5: Create Sign(s) 45, the online interactive tutorial 162 may provide the seller with an electronic version of a sign that may be printed at a local office store and the like. Alternatively, the counselor may print the signs and provide them to the seller. Like the flyer(s) created in Step 4.2, the signs may also be based on the seller's responses to prompts in the interactive input area 411 of the online interactive tutorial 162.

As a part of Step 4.6: Create Buyer Packet 46, the online interactive tutorial 162 may include links to a purchase and sales agreement that may be a part of the buyer packet. In one embodiment the purchase and sales agreement may be drafted in plain English (i.e., in layman's terms). In one embodiment, the purchase and sales agreement may be capable of electronic signature. Optionally, in one embodiment, the purchase and sales agreement may be capable of electronic execution. In an alternative embodiment, the purchase and sales agreement may be reviewed, and then printed and/or copied. The purchase and sales agreement may be filled in by the seller and/or buyer with assistance from the online interactive tutorial 162 and/or a counselor.

As a part of Step 4.7: Create Open House Material(s) 47, the online interactive tutorial 162 may provide the seller with a telephone log and guest log so that seller may track visitors to an open house for the real estate property. Additionally, the online interactive tutorial 162 may provide advice to the seller for conducting a real estate transaction with and without buyer's agents. The online interactive tutorial 162 may provide the seller with one or more signs that may be displayed by the seller during the open house so that a buyer may take a self-conducted tour of the real estate property. In one embodiment, the signs may correspond to the features entered by the seller into the interactive input area 411 as a part of Step 4.1. The signs may be provided in an electronic format that is transmitted to the seller device 110 and printed by one or more printing devices 150. In one embodiment, the seller may compile all of the documents provided by the online interactive tutorial 162 in a central location (either electronically or physically).

As a part of Step 4.8: Conduct Honie Visit 48, the seller may be visited by a counselor prior to an open house. After the seller has placed the real estate property in "show condition" the seller may indicate via the online interactive tutorial 162 that the property, disclosures, and prepared materials are ready for review by a counselor (e.g., are ready to go on the market). Upon receiving an indication, the CSU may 164 transmit a notification to the counselor device 130 and counselor so that the counselor schedules a visit with the seller. In one embodiment, a calendar and appointment system on the sever 160 may facilitate scheduling a meeting between the seller and counselor.

Prior to the home visit, the counselor may conduct a comparative market analysis (CMA) as described in Step 3.1. In some embodiments, the CMA may require utilizing one or more computational modules 165 of the server system 160. At the home visit the CMA may independently score the show condition of the house, review the property disclosures, review the marketing materials, review the seller's price adjustments, and deliver various marketing materials (e.g., signs developed in Step 4.2).

Figure 16:
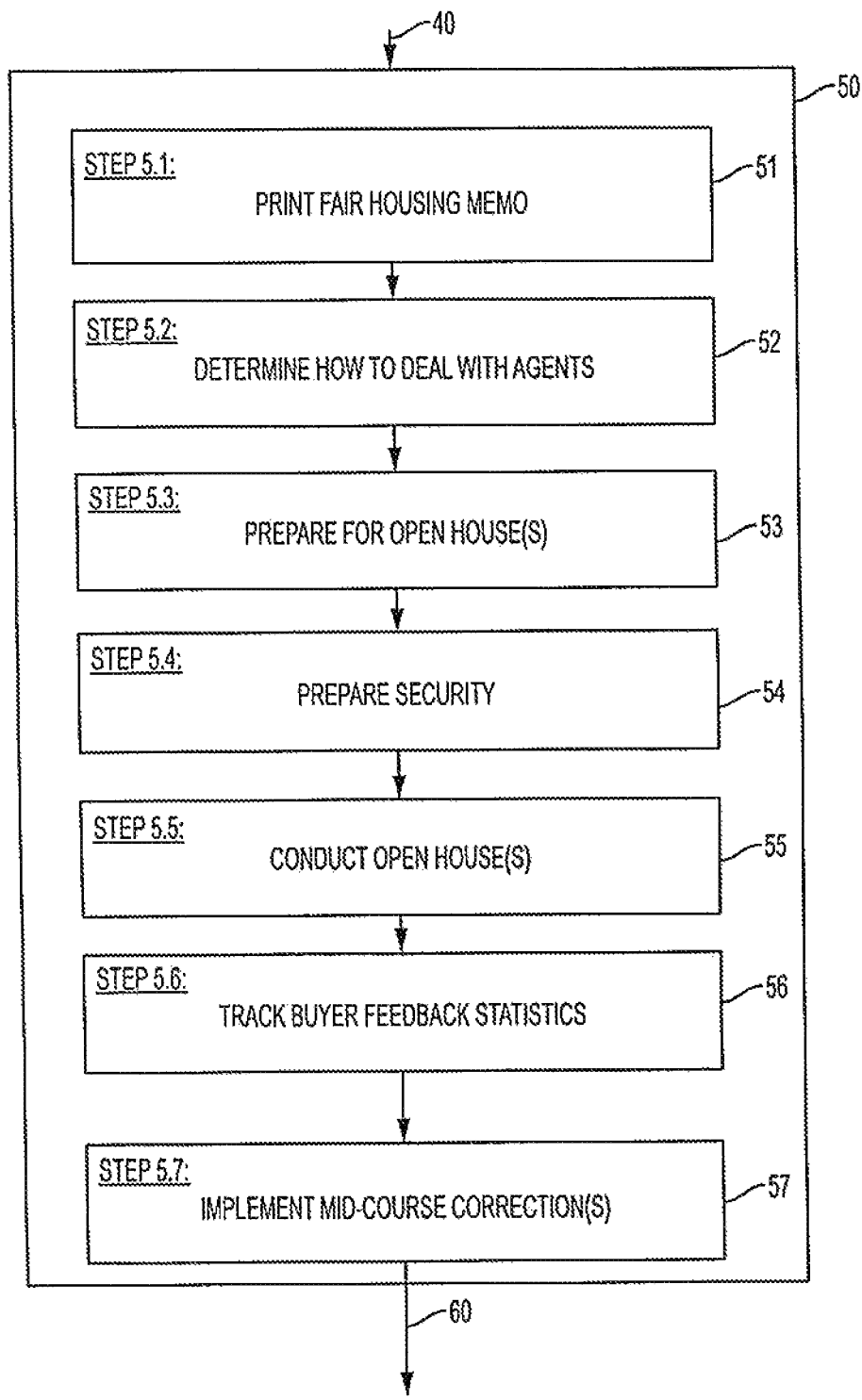
FIG. 16 illustrates one or more example sub-steps of the method shown in FIG. 5 according to an aspect of the present disclosure.

In one embodiment, after the completion of Step 4: Produce Marketing Materials 40, the seller may proceed to the fifth step of the online interactive tutorial 162, namely, Step 5: Find a Buyer 50. As is illustrated by FIG. 16, an example process for Step 5: Find a Buyer 50, may include various sub-steps including for example, Step 5.1: Print Fair Housing Memo 51, Step 5.2: Determine How to Deal With Agents 52, Step 5.3: Prepare for Open House(s) 53, Step 5.4: Prepare Security 54, Step 5.5: Conduct Open House(s) 55, Step 5.6: Track Buyer Feedback Statistics 56, and Step 5.7: Implement Mid-course Correction(s) 57.

As a part of Step 5.1: Print Fair Housing Memo 51, the online interactive tutorial 162 may provide anti-discrimination training to the seller by way of the tutorial 162 and/or the counselor. Anti-discrimination training may include electronic documentation, video, audio and the like.

As a part of Step 5.2: Determine How to Deal with Agents 52, the online interactive tutorial 162 may provide the seller with guidance as to how address buyers who wish to pursue a real estate transaction using a buyer's agent. Guidance may include electronic documentation, video, audio and the like. In some embodiments, a seller may be able to complete the real estate transaction without having to pay a commission to the buyer's agent or may remove the role of the buyer's agent.

As a part of Step 5.3: Prepare for Open House(s) 53, the seller may, for example, distribute the flyers and signs created in Step 4: Produce Marketing Materials 40 about one or more neighborhoods. Additionally, the seller may be guided (via electronic documentation, video, audio and the like) to distribute marketing materials prior to each open house.

As a part of Step 5.4: Prepare Security 54, the seller may be guided (via electronic documentation, video, audio and the like) by the online interactive tutorial 162 to remove valuables from the property. The seller may also be provided with guidelines for personal security.

As a part of Step 5.5: Conduct Open House(s) 55, the seller may hold an open house. Prior to holding an open house, the seller may review one or more instructional videos from the online interactive tutorial 162 for suggestions on how to hold an open house.

As a part of Step 5.6: Track Buyer Feedback Statistics 56, the seller may input one or more metrics representative of the effectiveness of the open house into the online interactive tutorial 162. In particular, the seller may provide the online interactive tutorial 162 with a measure of flyer loss (which may be indicative of how many people were aware of the open house), a visitor ratio (which is the number of new visitors to the open house), and a return visitor ratio (which is the number of return visitors to the open house). In one embodiment, upon receiving these values by way of the online interactive tutorial 162, the computational modules 165 may compute a ratio of the visitors to flyer loss and/or a ratio of the return visits to initial visits. Alternatively, the seller may calculate the ratios and provide them to the online interactive tutorial 162.

Based on the statistics and metrics entered in Step 5.6: Track Buyer Feedback Statistics 56, in Step 5.7: Implement Mid-Course Correction(s) 57, the seller may make one or more mid-course corrections. For example, when the measured flyer loss is below a certain threshold, this value may be an indication of a problem in the advertising strategy (i.e., MLS listing, display of signs, frequency of open houses). In one embodiment, the threshold may depend on the season (i.e., spring and summer may include a higher flyer loss). Accordingly, the seller may adapt their advertising strategy with guidance from the online interactive tutorial 162 and/or the counselor. Additionally, when the visitor ratio is determined to be low (i.e., below a threshold), this value may be indicative that the seller's asking price is not viable (too high). When the visitor ratio is determined to be too high (i.e., above a threshold), this value may be indicative that the seller's asking price is also not viable (too low). The return ratio may be indicative of whether the buyers like the real estate property. When the return ratio is low (i.e., below a threshold), this value may be indicative of a problem with the show condition, functional issues with the house, style issues, and/or problems with the buyer's experience. The counselor and/or interactive online tutorial 162 may provide the seller with possible mid-course correction suggestions such as advertising differently, reducing the price of the real estate property, adjusting the show condition, refraining from interacting with potential buyers at the open house, and the like.

In one embodiment, if the seller elects to reduce the price of the listing as a part of the mid-course correction, the online interactive tutorial 162 may prepare updated flyers, signs, and the like for use by the seller. Additionally the online interactive tutorial 162 may assist the seller in updating the MLS listing for the house with the new price. The seller may be encouraged to contact previous visitors to the real estate property (as logged by the telephone and guest log) to notify them of the new price.

In one embodiment, various mid-course corrections may be determined based on statistics performed by the buyer-focused computational utility 168. Mid-course corrections may include, for example: suggestions for more frequent open houses, obtaining renovation plans (but not performing the renovations), cleaning more items out of the house or garage, more self-guided tour signage, offering a commission (e.g., 3%) to buyer's agents and/or price reduction. A price reduction may include: suggestions for discussing (e.g., via email, phone, physical discussion, etc.) the reduction with a counselor (to identify whether price is the issue), selecting a new price, contacting (e.g., emailing) a counselor with the new price, suggestions on how to indicate the reduction (e.g., using a black marker to cross through the price on a flyer so it can still be seen, writing across a photo on the flyer "REDUCED!!!" and the new price, and calling visitors on a guest log and telephone log and inviting them back).

FIG. 17 is illustrative of the options the online interactive tutorial 162 may present to a seller when making mid-course corrections. As depicted, the seller may indicate that there were not enough visitors at a first selector 1701 and receive additional guidance from the online interactive tutorial 162. Alternatively the seller may opt to reduce the price of the listing at a second selector 1703.

Figure 18:
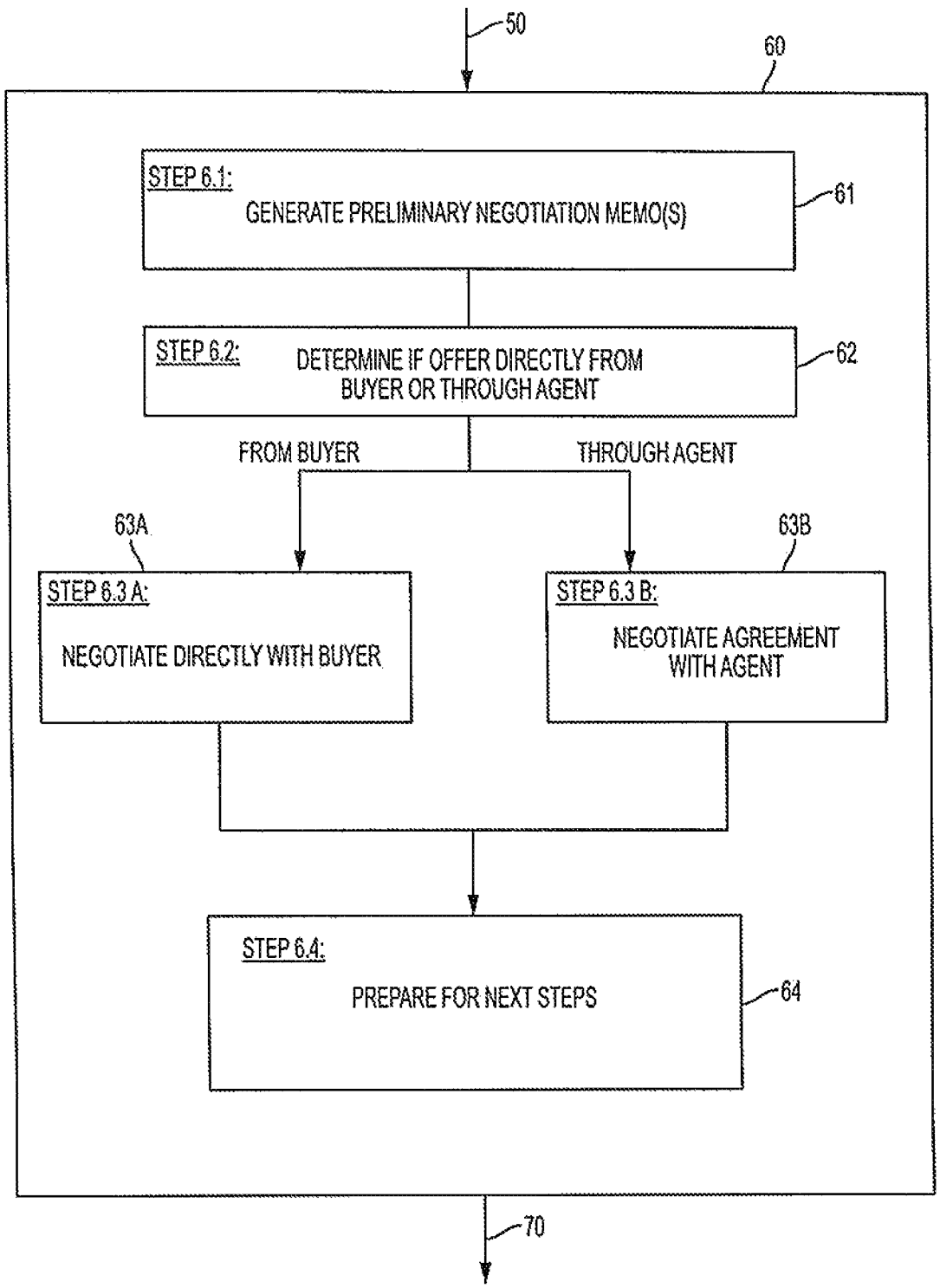
FIG. 18 illustrates one or more example sub-steps of the method shown in FIG. 5 according to an aspect of the present disclosure.

In one embodiment, after the completion of Step 5: Find a Buyer 50, the seller may proceed to the sixth step of the online interactive tutorial 162, namely, Step 6: Negotiate a Real Estate Transaction 60. As is illustrated by FIG. 18, an example process for Step 6: Negotiate a Real Estate Transaction 60, may include various sub-steps including for example, Step 6.1: Generate Preliminary Negotiation Memo(s) 61, Step 6.2: Determine if an Offer is Directly from a Buyer or Through a Buyer's Agent 62, Step 6.3A: Negotiate Directly with Buyer 63A (when the offer is directly from a Buyer), Step 6.3B: Negotiate Agreement With Agent 63B (when the offer is through an Agent), and Step 6.4: Prepare for Next Steps 64. In a first step 6.1: Generate Preliminary Negotiation Memo(s) 61, the online interactive tutorial 162 and counselor may provide the seller with information regarding the negotiation process, and tips, including those useful for when negotiating with multiple buyers.

In a second step 6.2: Determine if an Offer is from a Buyer or a Buyer's Agent 62. In this step, the seller may determine whether the received offer is from a buyer or their representative. In one embodiment, the seller may provide the tutorial 162 with a selection as to whether the received offer is from a buyer or their representative.

When the received offer is from a buyer, then in Step 6.3A the seller may negotiate directly with the buyer 63A. As a part of the negotiation process, the seller may prepare (for example, with the online interactive tutorial 162 and/or counselor) a buyer's packet containing one or more documents including property disclosure documents, and purchase and sale agreement documents (see also Step 4.6). Additionally, the buyer's packet may include one or more addendums such as, without being limited to, a repair addendum, early occupancy, holdover tenancy, prior sale, Federal Housing Administration ("FHA") or Department of Veterans Affairs ("VA") loan information, owner financing terms, and off-market agreements.

In general, the counselor may assist the seller during the negotiation process. In one embodiment, the counselor may assist during the negotiation process through the online interactive tutorial 162. For example, the counselor may answer questions via phone, email, text, instant messaging, or other communication platform provided by the online interactive tutorial.

When the received offer is through an agent, then in Step 6.3B the seller may negotiate with the buyer's agent 63B (instead of directly with the buyer). The online interactive tutorial 162 may provide behavioral guidance (e.g., electronic documentation, video, audio and the like) to the seller so that they are not pressured into paying a commission fee to the buyer's agent. If however, the seller elects to pay a fee to the buyer's agent (as may be the case for Emergency Sales), the online interactive tutorial 162 may provide the seller with a Single Party Commission Agreement.

In one embodiment, Step 6.3 may include calculating a Buyer's Agent commission when there is a buyer's agent involved. For example, mid-course correction suggestions may include convincing the agent to reduce their 3% commission by 0.5%, to 2.5%; a buyer paying 1.2% of that amount to their agent in the form of a higher price for a real estate property; and a seller paying the balance, 1.3%. In an example, a recalculated Seller's Savings may be determined by a sale price—any commission paid.

In Step 6.4: Prepare for Next Steps 64 the seller may be advised by the online interactive tutorial 162 to make copies of the purchase and sales agreement, as well as execute the purchase and sales agreement. Additionally, the online interactive tutorial 162 may include a calculator on GUI 112 to enter the sale price and (optionally) any commission paid to a buyer's agent, so that the seller's actual savings may be calculated by the computational modules 165. The online interactive tutorial 162 may also include a calculator for performing one or more mathematical operations. Additionally, the online interactive tutorial 162 may include a process for opening escrow at an escrow closing company. The tutorial may also encourage a seller to upload a photograph of the seller and/or buyer in front of the sold real estate property holding a SOLD sign. The CSU 164 may receive the data and information uploaded by the seller (including, for example the selling price, escrow information, days on market, and photo), identify the relevant data from tutorial 162, cause computational modules 165 to calculate the savings from this information, and transmit the information to counselor device 130. The counselor may then facilitate any paperwork surrounding the pending MLS listing and opening escrow responsive to the information received from CSU 164.

In one embodiment, after the completion of Step 6: Negotiate a Real Estate Transaction 60, the seller may proceed to the seventh step of the online interactive tutorial 162, namely, Step 7: Close the Real Estate Transaction 70. As is illustrated by FIG. 19, an example process for Step 7: Close the Real Estate Transaction 70, may include various sub-steps including for example, Step 7.1: Open Escrow 71, Step 7.2: Conduct Due Diligence 72, Step 7.3: Prepare Home Inspection Report(s) and Repair Addendum 73, Step 7.4: Conduct Appraisal(s) 74, Step 7.5: Prepare for Closing 75, Step 7.6: Conduct Feedback 76 and Step 7.7: Conduct Closing 77. In one embodiment, the seller may be in daily contact with the buyer throughout Step 7: Close the Real Estate Transaction 70.

In Step 7.1 Open Escrow 71, the online interactive tutorial 162 may provide a seller with guidance (e.g., video, audio, electronic documentation, etc.) as to opening an escrow account including information regarding the process, the documents required and the like. For example, the online interactive tutorial 162 may instruct the seller to obtain a Preliminary Commitment for Title Insurance. The online interactive tutorial 162 may also generate a calculator and/or other means that may be made available to the seller, to determine whether the real estate transaction may result in a short sale for the seller. In order to determine whether the real estate transaction may result in a short sale, in one embodiment, the seller may input the firm sale price and details of existing mortgages, liens, and the like into the online interactive tutorial 162. The online interactive tutorial 162 may then transmit the data and information to the computational modules 165, which may make a determination as to whether the real estate transaction may result in a short sale. When a determination is made that the real estate transaction may result in a short sale, the online interactive tutorial 162 may update with documents, video tutorials, and other resources for the seller related to short sale guidance.

In Step 7.2 Conduct Due Diligence 72, the online interactive tutorial 162 may guide a seller through providing data and information to a buyer. For example, the seller may prepare and provide the seller with information such as, without being limited to, a resale certificate, an as-built survey, well and septic information, a lead-based paint certificate, sex offender registry information, an annual property operating data form, and any amendments to the property disclosure form. In one embodiment, the online interactive tutorial 162 may link to one or more legal statutes, that may provide more information regarding the data and information the seller may be legally obligated to prepare and provide to a buyer.

In connection with Step 7.3 Prepare Home Inspection Report(s) and Repair Addendum 73, a buyer may perform a home inspection (optional) and request one or more of the recommended repairs be completed by the seller. The online interactive tutorial 162 and counselor may guide a seller through the home inspection process, and the list of recommended repairs.

In Step 7.4 Conduct Appraisal(s) 74 the online interactive tutorial 162 may provide instructions as to interactions between the seller and buyer and/or appraiser during the appraisal process. For example, when the CMA prepared by the counselor supports the sale price, the seller may be encouraged to provide the CMA to the appraiser. In one embodiment, the online interactive tutorial 162 may support electronically transmitting the CMA from the online interactive tutorial 162 to the appraiser via email or other means, upon the server system 160 receiving a request from the seller. Additionally, if the buyer is using Federal Housing Administration ("FHA") or Veterans Administration ("VA") loans, the online interactive tutorial 162 may guide the seller through one or more forms for FHA and VA loans including, for example, a FHAN A Amendatory Clause.

In Step 7.5: Prepare for Closing 75, the online interactive tutorial 162 and/or counselor may guide the seller through the closing. In one embodiment the online interactive tutorial 162 may provide the seller with a moving checklist and an address change checklist. Optionally, the online interactive tutorial 162 may electronically interface with an escrow closing company to transmit and receive the relevant closing documents and power of attorney. Additionally when it is determined that the real estate transaction may not close in a timely manner, the online interactive tutorial 162 may provide the seller with an Extension Agreement that both the buyer and seller may complete to extend the time of the real estate transaction. In one embodiment, the online interactive tutorial 162 may facilitate the Extension Agreement by transmitting the Extension Agreement electronically to the buyer and/or seller device and being configured for online signatures.

Figure 20:
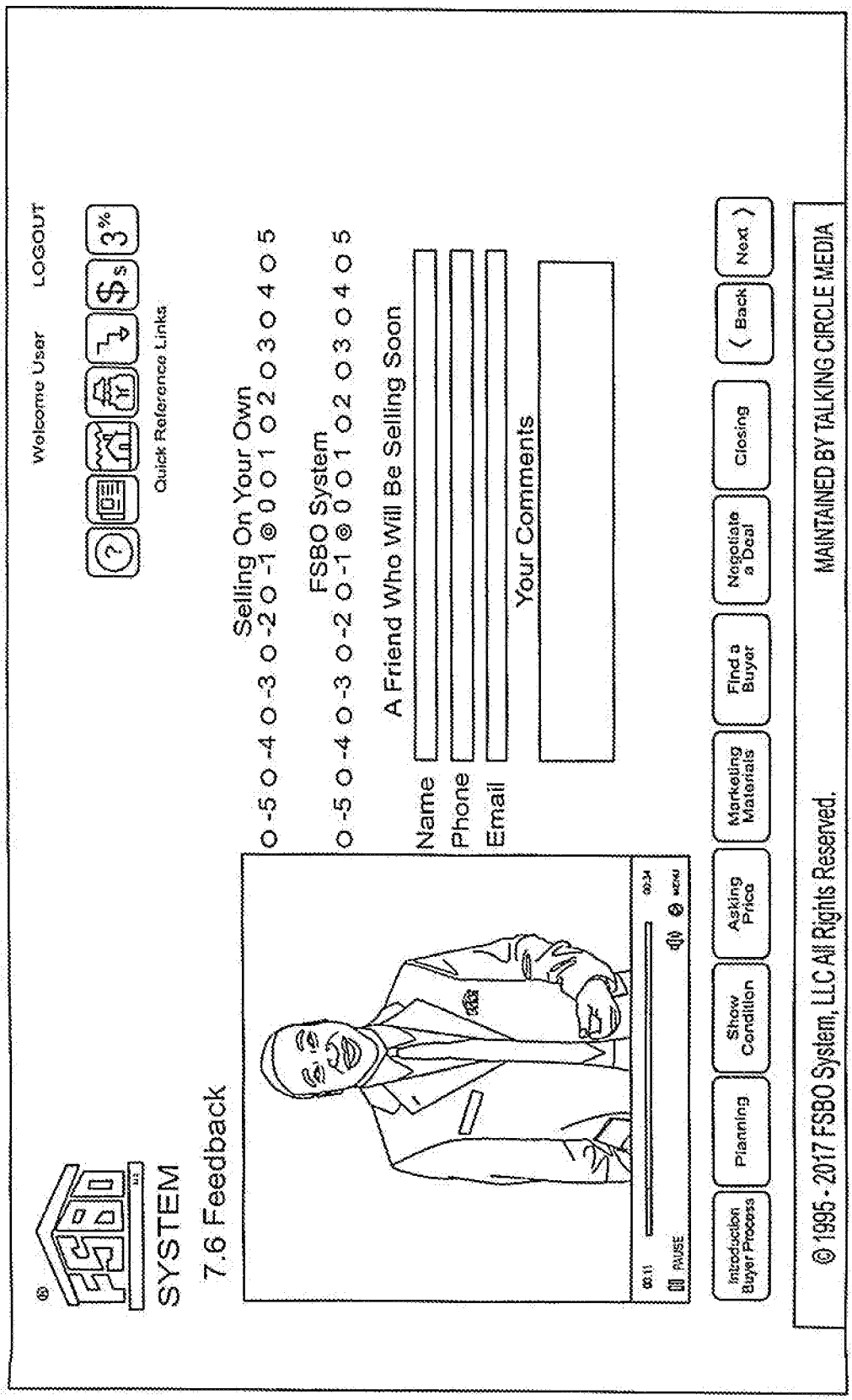
FIG. 20 illustrates an example online interactive tutorial screen in a sub-step of FIG. 19 according to an aspect of the present disclosure.

In Step 7.6: Conduct Feedback 76, the online interactive tutorial 162 may request that a seller provide information related to their experience. In one embodiment, feedback may include rating one or more features of the online interactive tutorial 162, and counselor. In one embodiment, the feedback may be used to calculate statistics related to the online interactive tutorial 162 and counselor's performance. Additionally, the online interactive tutorial 162 may be improved in accordance with the received feedback. The feedback may be transmitted to the counselor and/or stored in the database of the server system 160. Feedback may be entered via the tutorial 162 as is illustrated in FIG. 20.

In Step 7.7: Conduct Closing 77, the real estate transaction is finalized. The online interactive tutorial 162 may provide the seller with a checklist of items to bring including, for example, photo identification, keys, mailbox keys, garage door openers, signs, brochures, bank account information, routing information and the like. In one embodiment, the closing is attended by the counselor, buyer, seller, and/or agent(s) (e.g., a buyer's agent). Prior to the closing, the counselor may check the deed, check the settlement statement, verify that the closing costs are apportioned according to the purchase and sales agreement, and close out the listing on the MLS system. In some examples, tutorial 162 and/or the counselor may indicate any submission date requirements for settlement documentation prior to and/or at the closing, in accordance with any local, state or federal regulations. Typically, on the next business day after the closing, the escrow closer may record the deed, and buyer's mortgage. The escrow closer may write a check to pay off all the seller's liens, mortgages, judgments, etc. and may write a check to the seller for the balance. If the buyer and seller have agreed to seller financing, the escrow closer may set up a payment escrow at a local bank. In one embodiment, the online interactive tutorial 162 may provide the seller with an overview information of what to expect at a closing.

Optionally, after the closing, the seller may enter data and information related to the closing and/or life after the real estate transaction into the online interactive tutorial 162. For example, in one embodiment, the online interactive tutorial 162 may provide the seller with a field or similar graphical user interface to feature so that the seller may enter information related to what they did with the savings afforded by system 100.

As discussed above, the data and information provided to the online interactive tutorial 162 by a seller using a seller device 110 may be routed to the customer service utility (CSU) 164, computational modules 165, database 170 and other components of the server 160. In one embodiment the computational modules 165 may include two or more separate computational utilities including a seller focused computational utility 166 and a buyer focused computational utility 168. In one embodiment, the computational utilities may form a single computational utility.

As discussed above the computational modules 165 may perform various algorithms or calculations based on the data and information server 160 receives from seller device 110, home-listing website(s) 120, counselor device 130, and/or optional buyer device 180.

In one embodiment, the computational modules 165 may perform seller focused calculations by way of the seller focused computational utility 166.

For example, the seller focused computational utility 166 may calculate a compensation (e.g., what the seller paid for the systems and methods described herein). For example, a compensation may equal one percent of the tax assessed value of the property.

In one embodiment, the seller focused computational utility 166 may calculate a seller's savings. For example, a seller's savings may be calculated as: seller's savings=a seller's ballpark price for the home−6% agent commission−what the seller paid for the system.

In one embodiment, the seller focused computational utility 166 may calculate a target closing date based on data and information received from the seller device 110 including, for example, a target sale date. For example, a target closing date may be calculated as: target closing date=target sale date+45 days.

In one embodiment, the seller focused computational utility 166 may calculate a target on market date based on data and information received from the seller device 110 including, for example, the seller's goals. For example, a target on market date may be calculated as: target on market date=target sale date+0-30 days for an emergency sale.

In one embodiment, the seller focused computational utility 166 may calculate a target closing date based on data and information received from the seller device 110 including, for example, the seller's goal. For example, a target closing date may be calculated as: target closing date=target sale date+30-60 days for a quick sale. Alternatively, a target closing date may be calculated as: target closing date=target sale date+>60 days for a top dollar sale option.

In one embodiment, the seller focused computational utility 166 may calculate a show condition score based on input received from the seller device 110. For example, a seller may check one or more checkboxes corresponding to the show condition of the house. The computational utility 166 may award points based on the checkboxes, and calculate a show condition score by adding the awarded points.

In one embodiment, the seller focused computational utility 166 may calculate a CMA and/or an adjusted CMA. The adjusted CMA may be calculated in a multi-step process. In a first step, a first factor may be calculated by subtracting points for various general market dynamics and conditions as discussed above in connection with Step 3.2 Establish an Asking Price 32. In an example, general market dynamics may include subtracting one or two points for falling market prices. In an example, points that may be subtracted for conditions may include: one point for selling during the holidays; one or two points for having tenants in the property; two points for not doing open houses on a regularly scheduled basis; one point for a show condition score of 4-6; two points when show condition is less than 4; one or two points for a selling goal of Quick Sale; five points when the selling goal is an Emergency Sale and up to five points when the seller is selling into a falling market.

In a second step, a second factor may be calculated by adding points for various conditions as is also discussed in relation to Step 3.2 Establish an Asking Price 32. In an example, the points that may be added may include: one point for selling during spring or summer; one point when the show condition score is 8 or 9; two points for show condition score of 10; one for seller financing or a lease purchase; one or two for a selling goal of top dollar and two when the housing market is appreciating at double digits. In an example, one or two points may be added for a general market dynamic of rising prices.

In a third step, a third factor, the Price Adjustment Weight, may be calculated based on the first and second steps. For example, the Price Adjustment Weight=Total Points from First Factor (i.e., minus points)+Total Points from Second Factor (i.e., positive points)+general housing market conditions+100 points.

In one embodiment, the seller focused computational utility 166 may also calculate the baseline CMA. For example, the Baseline CMA=Average price per square foot from Comparative Market Analysis X square footage of house being sold.

In one embodiment, the Adjusted CMA (also referred to as Asking Price) may be calculated using the Baseline CMA and the Price Adjustment Weight. For example, the Adjusted CMA=Baseline CMA X Price Adjustment Weight.

In one embodiment, the seller focused computational utility 166 may calculate the days on market based on information provided by the seller device 110 to the tutorial 162.

In one embodiment, a buyer focused computational utility 168 may be configured to perform various mid-course corrections, based on statistical computations of what prospective buyers actually do during a seller's marketing process. In one embodiment, the buyer focused computational utility 168 may calculate a number of statistics based on data and information received from the seller device 110. As discussed above, in one embodiment the seller enters information related to flyer loss (FL), visitors (V) and return visitors (RV) into the online interactive tutorial 162. The online interactive tutorial 162 may then route the received data and information to the buyer focused computational utility 168. In one embodiment, the buyer focused computational utility 168 is used in connection with Step 5.6: Track Buyer Feedback Statistics 56, discussed above.

The Flyer loss (FL) may represent the number of flyers taken from a brochure box. The Visitors (V) may represent the number of visitors signed into a Guest Log during an open house for the previous week. The Return Visitors may represent the number of visitors who kept an appointment to revisit the property.

In one embodiment, the buyer focused computational utility 168 may calculate, the Flyer loss, the Viability of Asking Price Ratio=V/FL, and the Show Condition Ratio=RVN.

One or more of the embodiments discussed above may include a calculator in the interactive area 411. In one embodiment, the computations performed by the calculator may be integrated with the computational modules 165.

As discussed above, the online interactive tutorial 162 may receive data and information from the seller device 110, the home-listing website 120, and the like. In one embodiment the CSU 164 may be configured to receive data and information from the seller device 110 and, optionally, home-listing website 120 related to the real estate property the seller wishes to transact in. The CSU 164 may process the received data and information and provide the processed data and information to one or more web pages (described herein as a dashboard) configured for display to a counselor via GUI 132 of counselor device 130 (via web browser 134). Processing may include performing computations by the computational modules 165.

FIGS. 19b through 19g diagrammatically illustrate the overall process utilizing the present inventive system and method as a preferred embodiment. FIG. 19h diagrammatically illustrates an exemplary adaptive home selling system and method in accordance with the principles of the present invention. FIGS. 19i and 19j diagrammatically illustrate timelines associated with a successful time to contract and an error routine when the key monitoring modules of flyer loss, buyer or visitor count, and return buyer-visitors to total buyer-visitor count ration is greater than the threshold. FIG. 19k diagrammatically illustrates an adaptive attribute-based correction routine.

The following definitions are helpful and are sometimes used in this patent specification. Definitions: (a) "Asking price"=the price for the property that the seller advertises. (b) "Selling price"=the price for the property agreed in writing by the buyer and seller. (c) OH=Open House. (d) PSA=Purchase and Sale Agreement. (e) CMA=Comparative Market Analysis. (f) V=Groups or families who visit an OH on a weekly basis. Visitors include curious neighbors and others (but not real estate agents) not accompanied by a buyer. Sometimes "visitors" are called "buyers" or prospective buyers" herein. (g) RV=Return visitors on a weekly basis. (h) SGT=Sell-guided tour signs or placards. (i) FL=Flyer loss from the brochure box in the front yard, on a weekly basis. (j) FMW=Fair Market Value.

STEP 1: FIGS. 19b through 19h diagrammatically illustrate the overall process utilizing the present inventive system and method as a preferred embodiment. Functional Step 78 establishes a selling goal by the seller of the residence, home or property (top price, sell quickly, no required time to vacate property). Functional Step 80 sends this info to FS 96. Functional Step 82 involves establishing a shopping list for items needed to properly use the system and method based upon the home input data and establishes a glossary and manuals. Returning to step functional 78, functional step 79 generates a timetable for the seller. Functional step 81 involves a personal preparation of the seller. These functional steps relate to "Step One" described earlier.

STEP 2: Empty house functional step 83 leads and suggests to the seller to empty the house and engage in garage sale 84. Once the empty house functional step 83 is accomplished, the seller determines whether there are any structural issues in functional step 85. If not, the NO branch 87 is taken to functional step 89 which determines the "show condition score" for the home or property. The "show condition score" algorithm is discussed at other locations in this patent. Returning to functional step 85, if the YES branch 86 is taken, the seller obtains photos of structural items to be repaired in functional step 88 and then engages in the repairs in functional step 88. In functional step 91, the seller clean, paints and spackles or fixes minor damages on the property which leads to functional step 89.

In decision step 92, the seller determines whether renovations or remodeling are indicated. If the NO branch is taken, in functional step 95, the seller completes property disclosures. If the YES branch is taken from decision step 92, the seller engages an architect to create a plan and a bid for the renovation functional step 94. These functional steps, from functional step 83 to functional step 95, outline "Step Two" discussed above. Renovation (reno) plans and reno cost data and reno descriptive data may be entered in step 94.

STEP 3: FIG. 19c is a continuation from FIG. 19b. In functional step 96, the seller considers pricing factors. In functional step 97, the selling goal and timetable are factored into the pricing factor function. The selling goal could be "sell at high price" or "quick sale" or "no time-frame to sell" the property. In functional step 98, the CMA is input from the counselor in functional step 99. Otherwise the system may do a search and via an algorithm compute an estimated CMA. Functional step 98 establishes the initial asking price for the residence or property. These functions, from functional step 96 to functional step 99, relate to "Step Three" discussed above.

STEP 4: Functional step 230 involves taking pictures of the residence and the property and the views. These are pre data. Functional step 231 creates a flyer using a computer template. Functional step 232 the seller completes MLS input sheets for listing the home or property on the MLS system. Textual inputs describing the property are d-text. Functional step 234 is the preparation of the open house book. In functional step 235, the counselor provides the deed and the covenants, the survey, HOA documents, well and septic tank disclosures and other property disclosures for the OH book. In functional step 236, the buyer packet is prepared. In functional step 237, the PSA disclosures and instructions are included in the buyer packet. In functional step 238, the self-guided (SG) tour pages, packet, placard or document(s) are prepared. SG tour placards use a pre-formatted computer form. From functional step 232 functional step 238, the flow chart describes "Step Four" discussed earlier.

STEP 5: FIG. 19d follows FIG. 19c. In functional step 239, the seller places the "for sale" sign on the property. In functional step 240, the seller places flyers in the brochure box on the FS sign. In functional step 241, this counselor lists the home or property or residence on the MLS where it is then picked up by other Internet listing sites (e.g. Zillow). In functional step 243, the counselor gives input to the seller. The MLS data uses a pre-formatted computer form with pic data and d-text.

In functional step 244, the seller distributes flyers around the neighborhood (flyer-Loc-a, Loc-b). In functional step 245, the seller places open house signs outside and about the neighborhood. In functional step 246, the final preparations of the property are done. In functional step 247, the self-guided tour signs or placards are placed in the residence. A sign-in sheet or OH Visitor log is also provided to document prospective buyers or visitors. Pets and kids are segregated during the open house sessions because they are distractions to the visitors.

In functional step 248, the seller conducts one or more open houses. In step 249, the seller collects data regarding the prospective buyers-visitors at the open house and the flyer-loss count. Functional steps from 239 to 257 are part of the "Step Five" discussed earlier. As described below, the flyer-loss count is a key performance indicator (KPI). Typically the flyer loss KPI is only from the "near residence" flyer box (OOR Location) or distribution point.

Figure 19A:
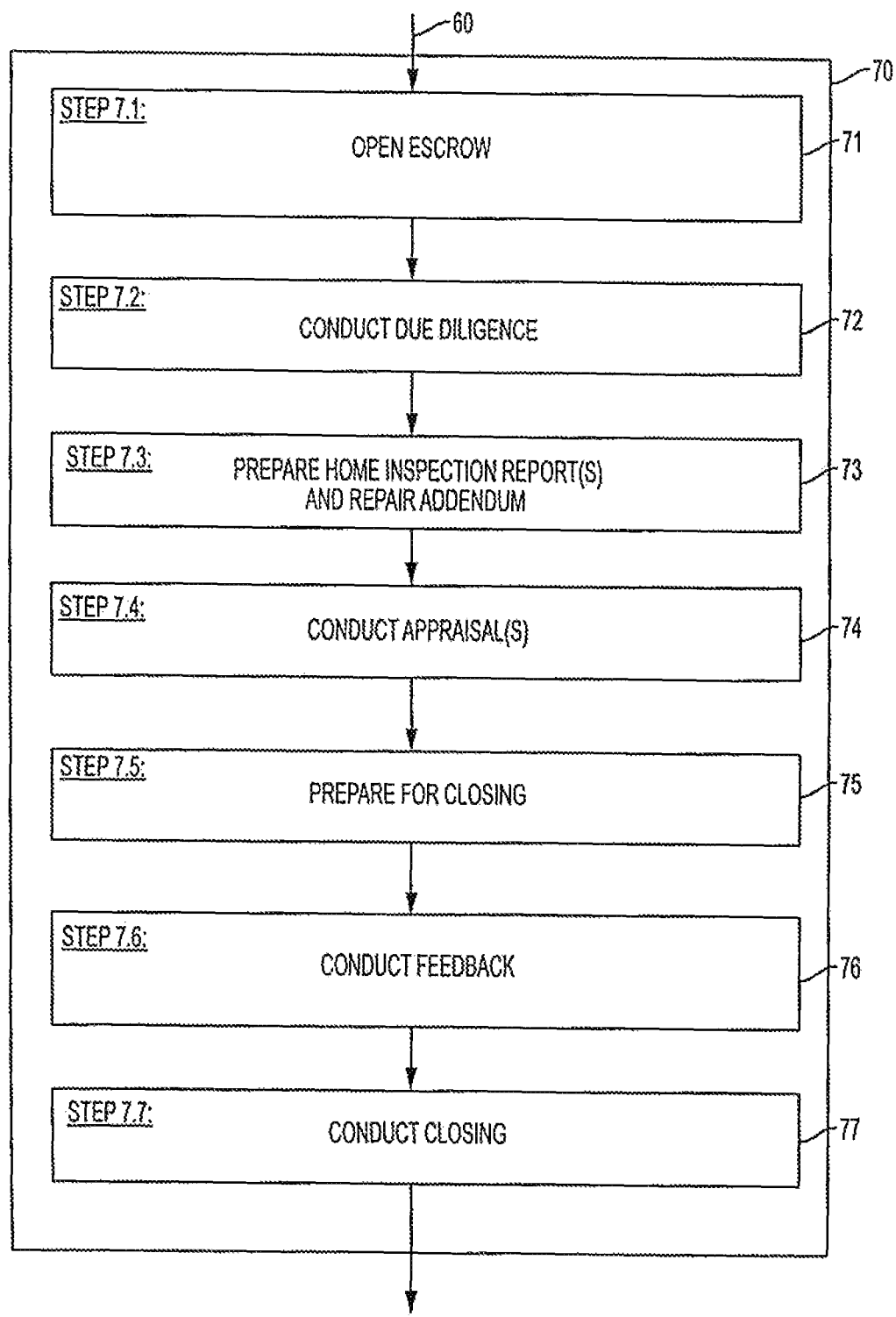
FIG. 19a illustrates one or more example sub-steps of the method shown in FIG. 5 according to an aspect of the present disclosure.
Figure 19B:
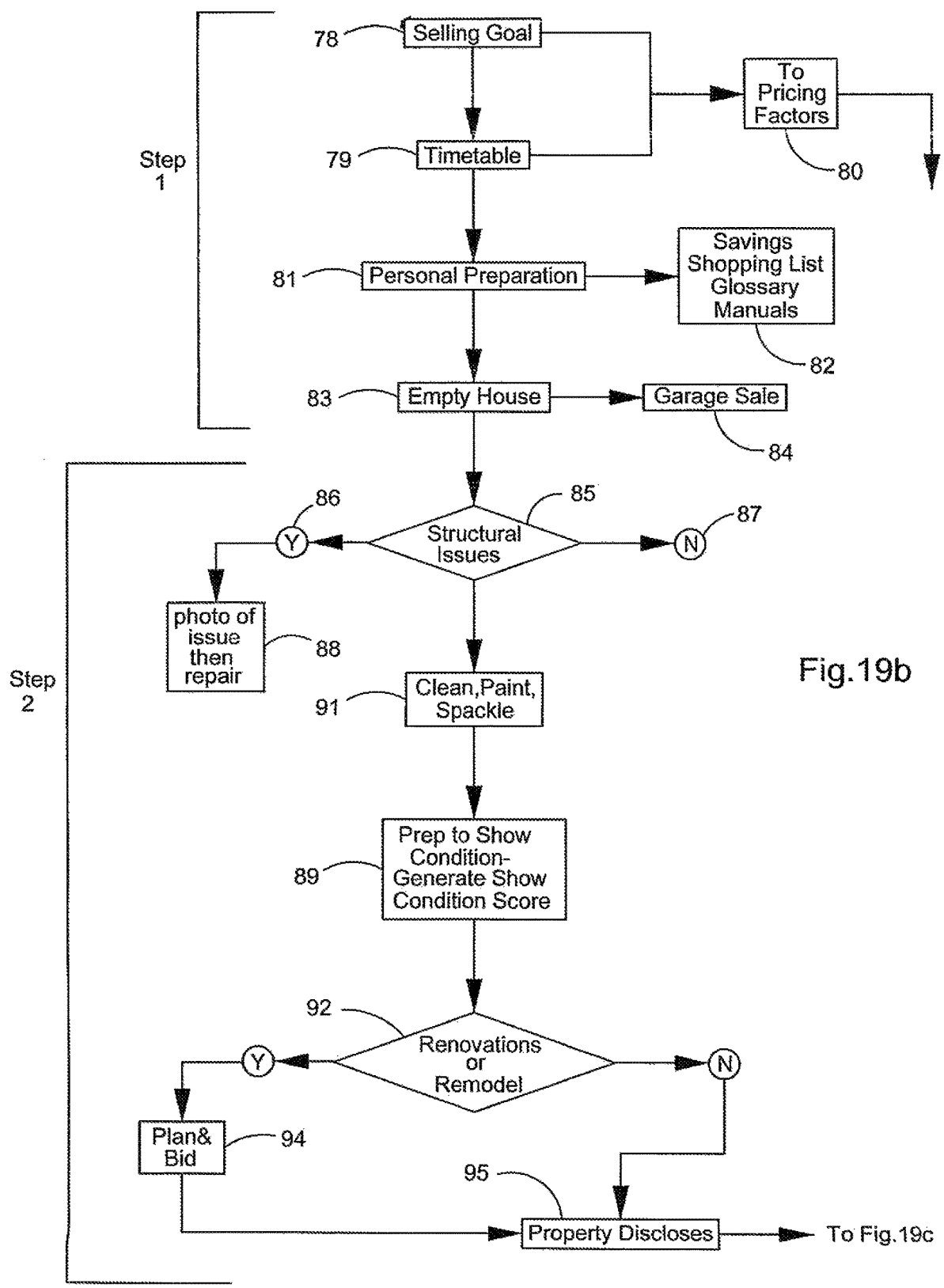
Figure 19C:
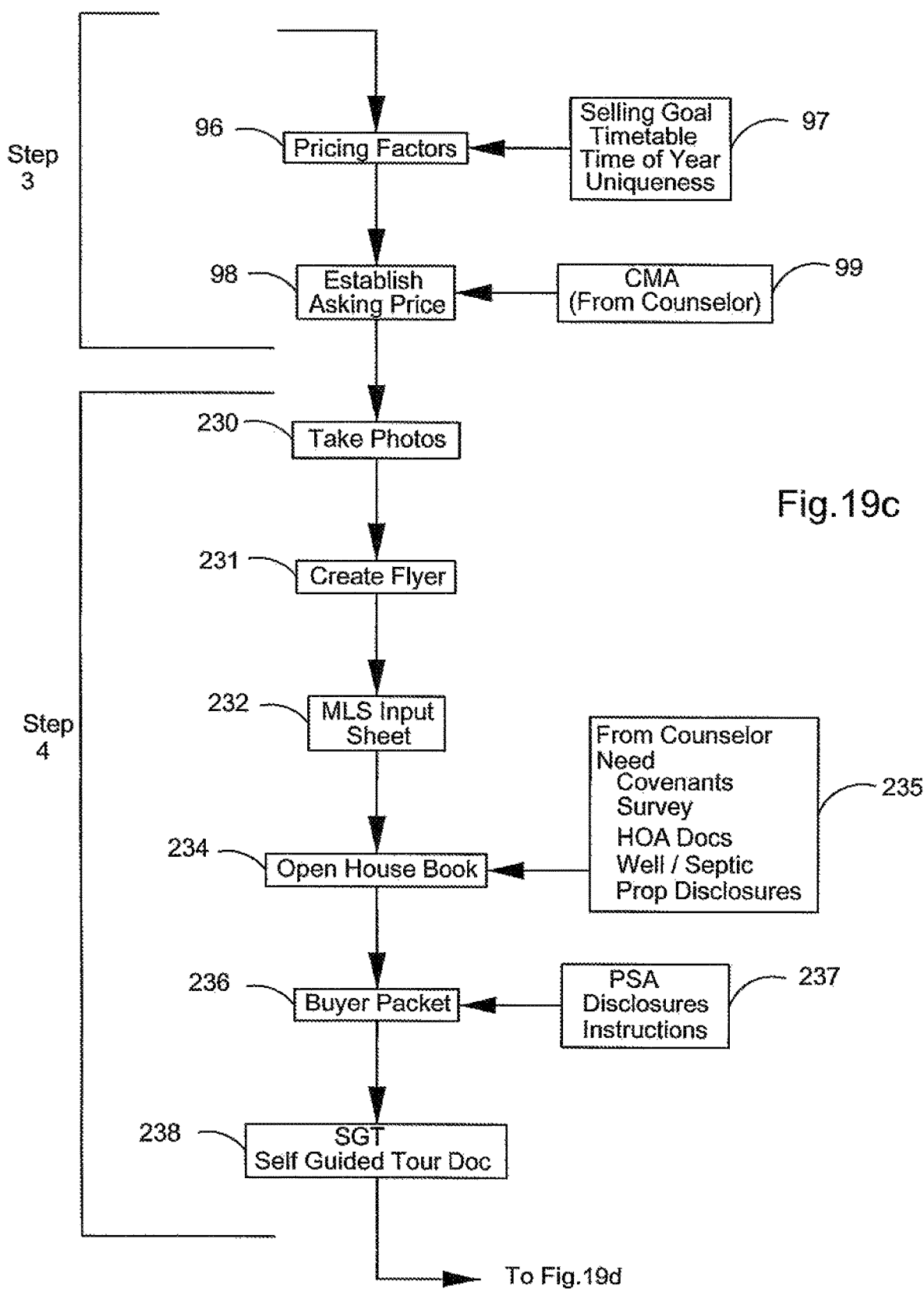
Figure 19D:
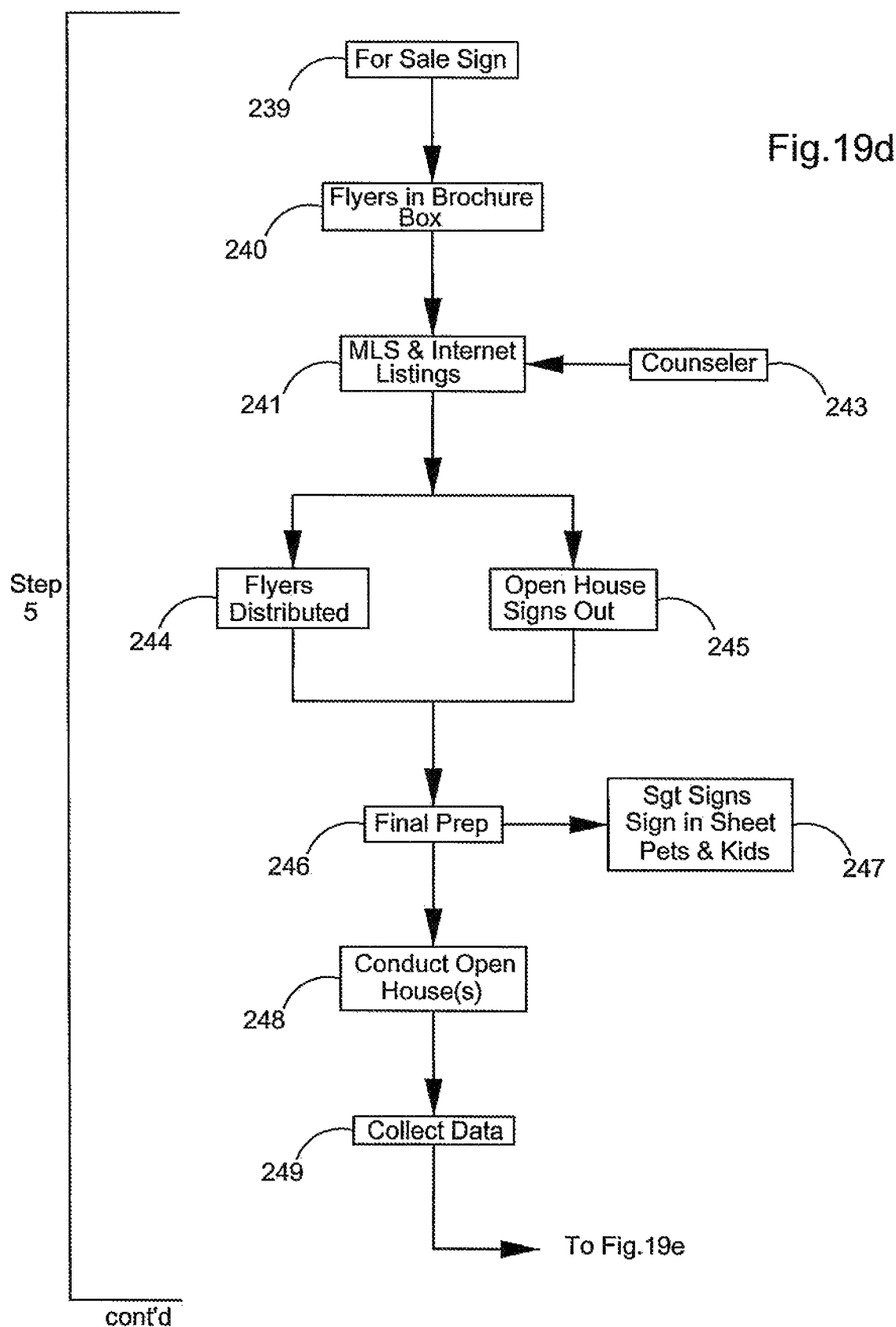

FIG. 19e continues from FIG. 19d. Functional step 249 identifies midcourse corrections. In decision step 250, a determination is made whether the flyer loss for the open house weekend exceeds the predetermined flyer-loss (FL) count threshold. This threshold is discussed later herein. From the NO branch if the FL KPI does not exceed a threshold, the seller and the typically system in functional step 251 determines whether the flyer or MLS listing has a typographic error, whether open house signs have been misplaced or stolen or whether the seller must engage in additional open house sessions or have longer time frames for each open house event. If none of the above factors are indicated, the threshold for the flyer loss may be changed. For example, if the house is very isolated or very unique, prospective buyers may not even take a flyer (on the other hand, if the seller did not pass the flyers around the neighborhood, the first OH could experience a large flyer loss to curious neighbors). Follow-on OH events typically have less visitors or prospective buyers. The reset threshold functional step 251 recognizes this first-OH-event and the reset of the FL KPI. Other corrective actions for inadequate flyer loss are discussed below.

Whether or not FL meets or exceeds the minimum threshold, the system executes decision step 252 which is the visitor or prospective buyer to flyer loss ratio. This visitor to flyer loss ratio threshold is discussed later in conjunction with a certain predetermined threshold ratio. From the NO branch, functional step 253 indicates a reduction in the asking price. This functional step relates to "Step Three" discussed earlier in connection with FIGS. 19b through 19d.

Whether or not the FL V threshold is met, the system then executes decision step 254 which is a determination whether the return visitors to original visitor ratio exceeds a threshold. If the threshold is exceeded by this RV versus V ratio, the YES branch is taken to "repeat OH as necessary" functional step 256. If the NO branch is taken from decision step 254, in functional step 255, there is an error indicated in the "show condition" of the home. The seller should re-execute Step Two as discussed above shown in FIG. 19b and then step 256 repeat OH as necessary until an offer is received. After the "repeat as necessary" functional step 256, "offer presented" function step 257 is noted. This offer is from a prospective buyer and is TS in FIG. 19i.

STEP 6: FIG. 19f follows FIG. 19e. The functional step "offer made" begins the general "Step 6" elements discussed earlier. In functional step 258, the buyer signs a receipt copy of the home or residence disclosures. In decision step 259, a determination is made whether the buyer is prequalified to purchase the home, residence or property. If NO, functional step 261 sends the buyer to a mortgage company before step 260. If YES, functional step 260 involves negotiating and signing the PSA. Functional step 261 notes that the buyer delivers an earnest money check to the seller. In functional step 262, the counselor opens an escrow closing account at a title/escrow closing company. In functional step 263, the counselor assists the seller in the closing process as necessary. Functional steps 257 to 263 relate to the "Step 6" discussed above.

Figure 19G:
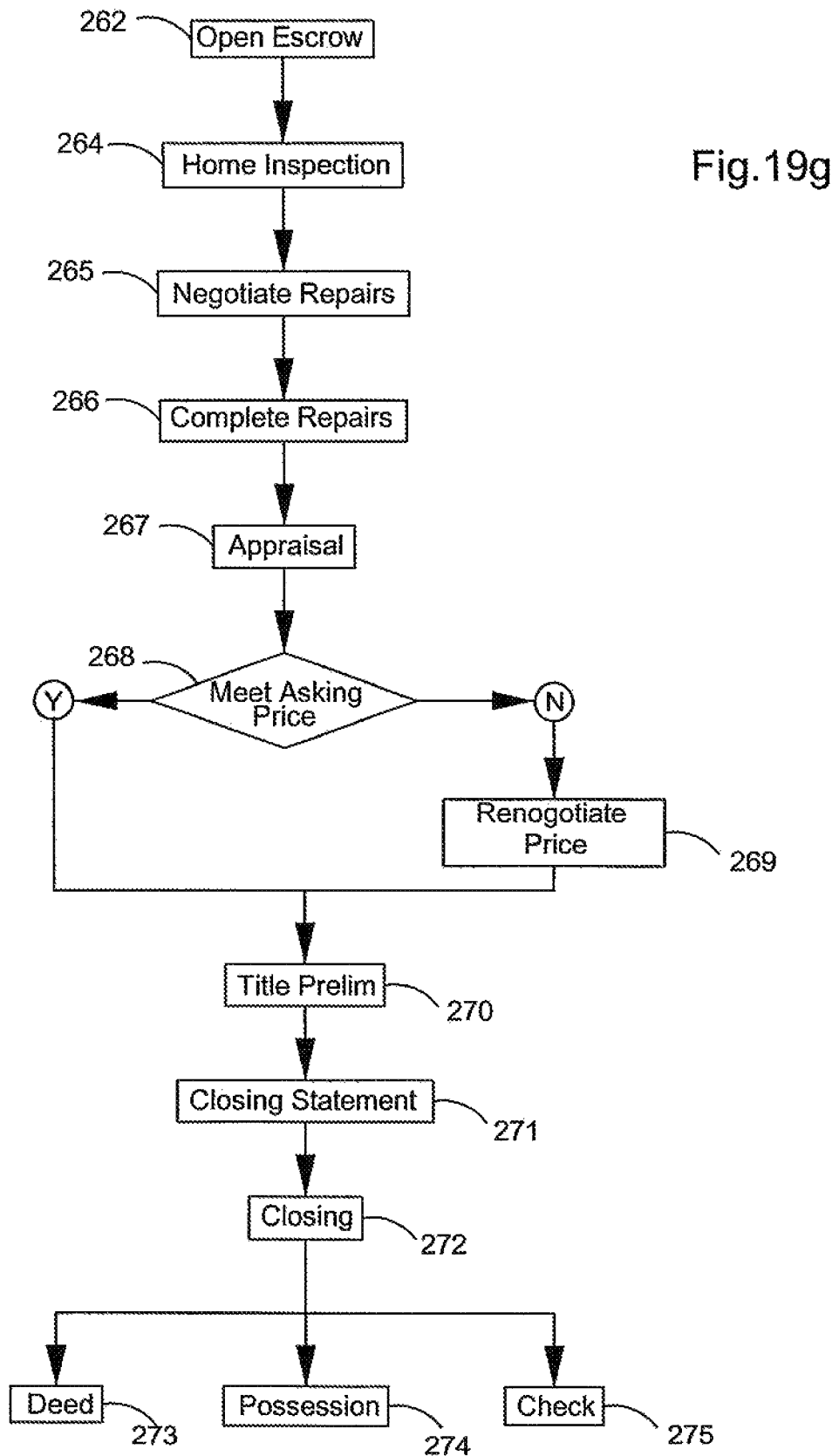
Figure 19H:
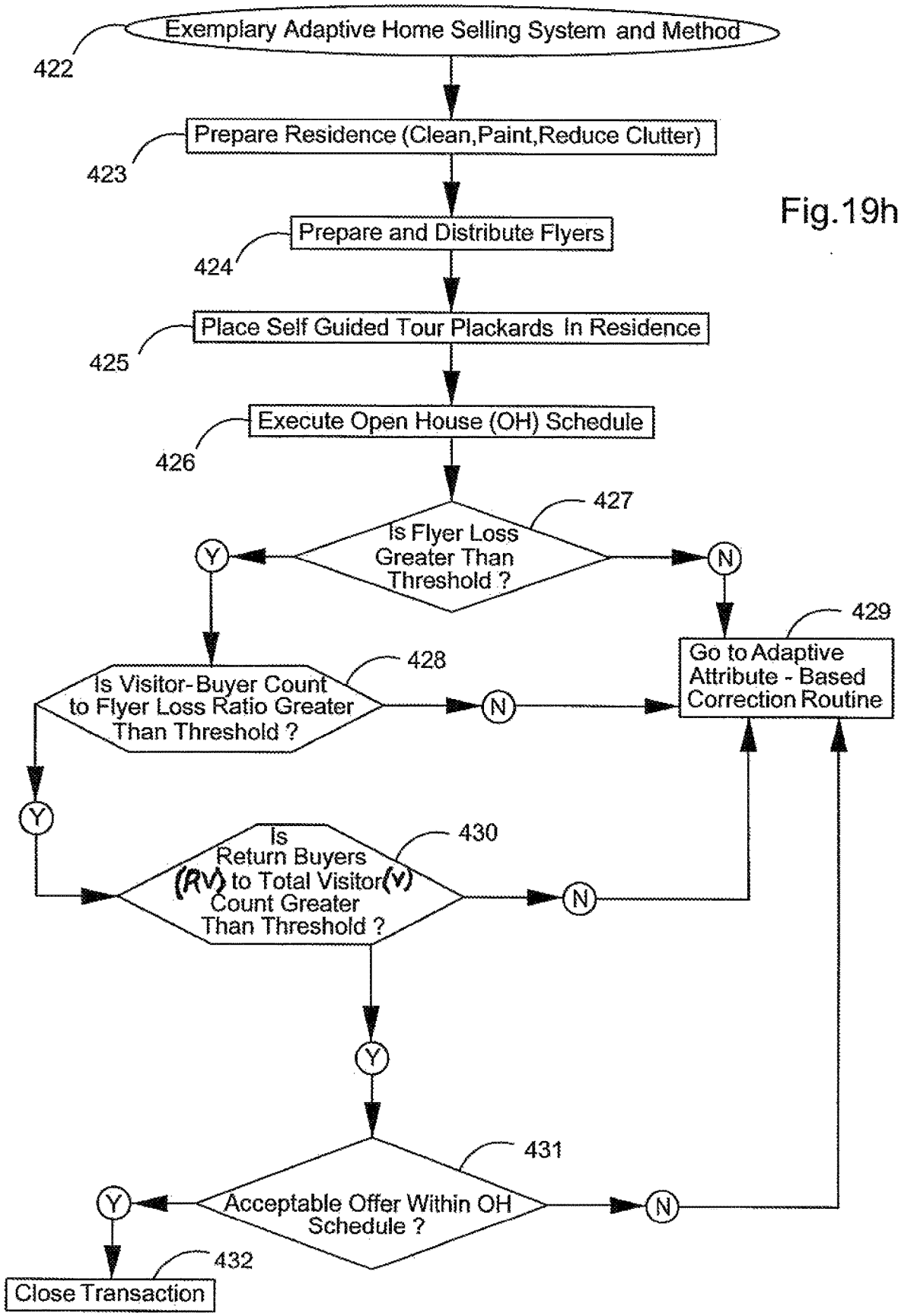
FIG. 19h diagrammatically illustrates an exemplary adaptive home selling system and method in accordance with the principles of the present invention.
Figure 19K:
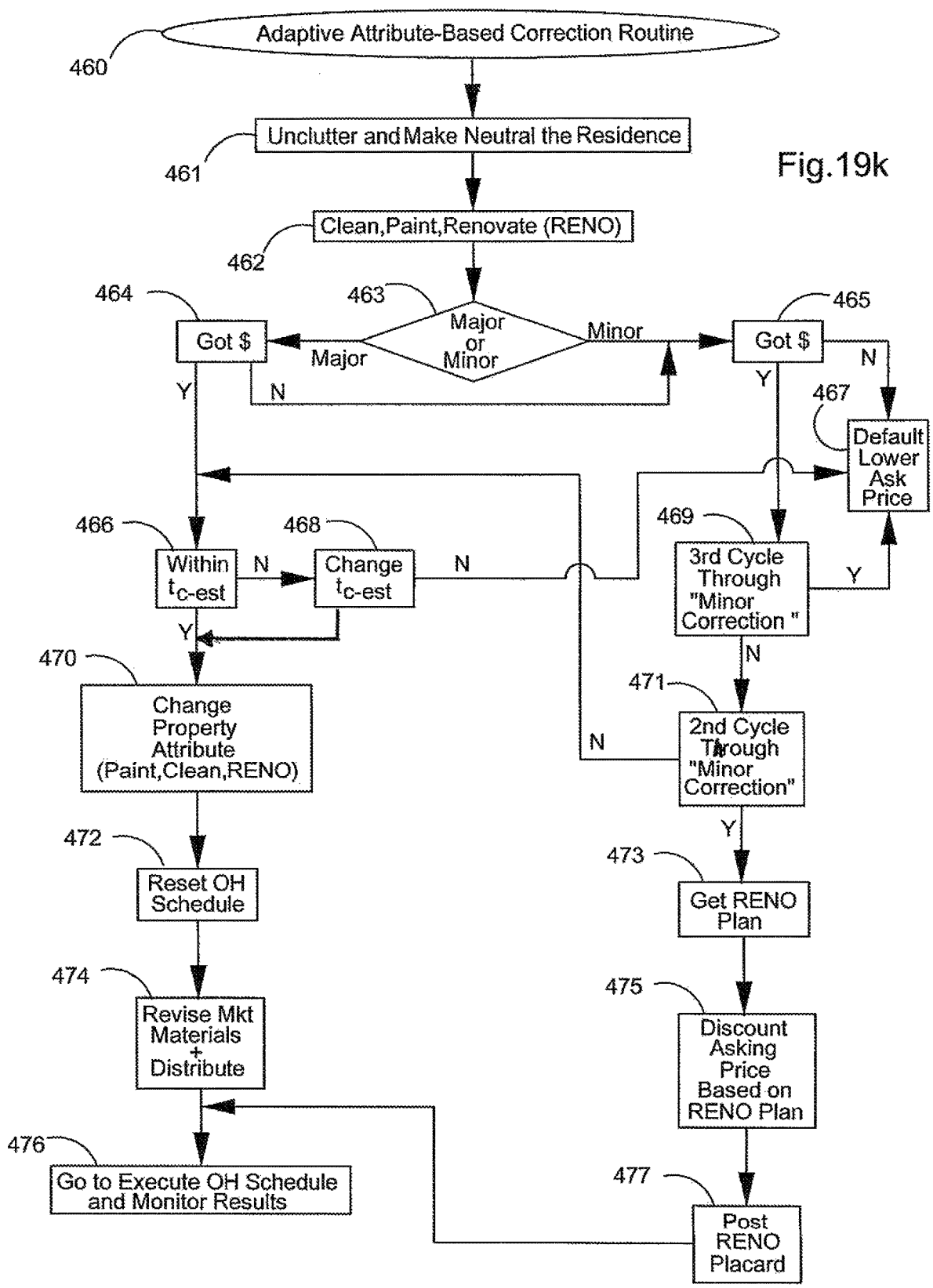
FIG. 19k diagrammatically illustrates an adaptive attribute-based correction routine.

STEP 7: FIG. 19g follows FIG. 19f. Functional step 262, open escrow, is noted in FIG. 19g. Functional step 264 involves a home inspection. Repairs are negotiated by the buyer and seller in functional step 265. In Functional step 266 the seller completes the agreed repairs. An appraisal is obtained in functional step 267. In step 268, a decision is made as to whether the asking price meets the appraisal price. If NO, functional step 269 is activated in which the buyer and seller renegotiate the price. If YES, the transaction moves to functional step 270 which is obtaining the preliminary title report. In functional step 271, the closing statement is generated by the escrow closing company. In functional step 272, the closing is completed, including, a deed possession of the property is taken by the buyer and check is delivered to the seller.

Exemplar Implementations of Adaptive Home Selling System

In order to appreciate the scope of the inventions set forth herein, the following section describes how the system and method alters both the behavior of the seller and integrates computer related outputs which alter (a) seller behavior, (b) provides print outputs to improve the ultimate seller goal of selling the property (the contract date followed by the closing date), and (c) provides key performance indicators or KPIs and several target ratios and predetermined thresholds for these KIPs which permits the system and the method to adapt to the time-based needs and monetary factors for the seller.

As an example of a time-based factor or "seller need," initially the seller may have planned that the closing date would be in 6 months (6 mth) from the date the home, office, real estate property (improved or unimproved) (collectively herein the "property") was placed on the market (t-start). However, after 3 months (t-start+3 mth), the seller becomes more desperate to sell the property.

The inventive system and method quantifies and qualifies the multi-variable problem of selling a home or property, and more particularly a home or residence. There are several factors effecting the process.

(A) Time-based factors (a job transfer suggests a quick sale date (time to contract), time of season (there is a "active season" in most markets), flexible time to get a contract (when the seller is not pressed for time to move out of the home), no seller time to clean and limited funds to clean and paint and improve home attributes (the time-based factors represent data supplied to a time line module and an open house calendar schedule). (B) Emotional based factors ("emo-based" factors).

(C) External or environmental factors ("ext-factors") (falling home sales market (CMA quantified, e.g., by CMAs falling over a prior 3 or 6 month period), rising home sales (CMA quantified), distance to schools, places to worship, restaurants or other external amenities, falling or rising home mortgage interest rates. (D) Controllable home or property attribute factors ("attribute-based" factors) such as clean home, fix cosmetic flaws, paint, clean yard and garage, "show the home" acts within the control of the seller (both time-wise and money-wise) (see discussion above in connection with Steps 2.1 through 2.5).

(E) Monetary factors (net-to-seller-price value (the amount due seller at closing) or negative net-to-seller-price value (neg-net-to-seller-price when the mortgage on the property is higher than the CMA)(a renovation, painting, cleaning, among other things, represents a monetary cost factor that adversely effects the net-to-seller-price value)(if the asking price discount associated with a proposed cost of renovation causes a neg-net-to-seller-price, this is a monetary factor for the seller to consider and make a decision regarding the then-posted asking price and/or the reno asking price discount).

(F) Marketing-based factors (such as flyer production, flyer distribution, self-guiding tour placards, video production and distribution, prospective buyer-visitor log, open house visitor counts, open house days and cycles, and related ratios based thereon). (G) other factors discussed herein.

In a conventional, non-computer-assisted transaction, the seller could (a) change seller's agent and/or (b) lower the posted asking price. The present invention and system drastically provides multiple options to the seller such as: (a) change the asking price; (b) clean up the property (Steps 2.1 to 2.5); (c) renovate the property; (d) get architectural drawings for a planned renovation (reno-plan) and estimates for the reno-plan and to post the same as part of the self-guided tour materials scattered about the property (compare tour-docs-t-start to tour-docs-t-3mth); (e) upgrade the flyer data (compare flyer-t-start to flyer-t-3mth)(see Steps 4.1, 4.2, 4.5 and 4.7) (including update to MLS and Internet listings); (f) upgrade the flyer data to include (i) price-t-3mth, (ii) reno-plan, (iii) new photos ("pic" or "pics") of the property (compare pic-t-start with pic-t-3mth), (iv) more punching and interesting descriptive textual material ("d-text") for the property (compare d-text-t-start to d-text-t-3mth), (v) alter the flyer as suggested earlier herein; (f) alter flyer distribution locations ("fly-loc") such as (i) adding new flyer locations (compare fly-t-start-loc-a,b,c (the locations, loc a: curb-side front yard, loc b (an OOR): front door loc, loc c (another OOR): residence remote local store (note: sometimes location is designated herein as loc-1, loc-2, loc-3)) to new locations fly-t-3mth-loc-a,b,c,d (loc-d being a local church, synagogue or community center); (g) alter flyer format or appearance, such as color flyer at the front door loc-b OOR but black and white at loc a, c and d; and (h) change location and/or color print the tour-doc.

The seller could also (i) increase open house ("OH") cycle (compare "OH-cycle-t-start" to OH-cycle-t-3mth, wherein OH-cycle-t-start is: OH week-1-Sa-Su and OH week-2-Sa-Su and OH week-3-Sa-Su and OH week-4-OFF and OH week-5-Sa and OH week-6-Su (otherwise the OH cycle ON-ON-ON-ON-ON-ON-OFF-OFF-ON-OFF-OFF-ON, stated further Sa-Su-Sa-Su-Sa-Su-OFF-OFF-Sa-OFF-Su) and wherein OH-cycle-t-3mth is: Fri(pm)-Sa-OFF-Sa-Su-Sa(am)-Su-Sa-Su-OFF-Su-Sa-Su-Sa-OFF).

The seller could also (j) prepare a short 3-5 minute video clip of the property posting it on YouTube or other social media sites and annotating the flyer with the video link. Other variables compelled or suggested by the inventive computer-assisted property sale program are discussed earlier and later highlighted in this exemplary section.

The Current Agent System: To understand the benefit of the inventive system and method, one should consider the current seller' agent marketing practice. The conventional practice used by seller's agents for the marketing a house or property involves the following basic process up to submission of an offer to a prospective buyer-visitor. Seller's Agents: the seller's provides a comparative market analysis ("CMA") as a marketing tool, to get the property listed in his or her name as a broker. The CMA asking price controls the seller's agent's sales commission, typically 6% of the sale price. Therefore, the seller's agent's CMA usually exaggerates the true market value of the property. The seller's Agent's marketing is passive. The home or property (herein, all references or "home" apply equally to any "property" for sale by the owner) is listed on the local multiple listing service ("MLS") where it is picked up by other Internet home listing sites (e.g. Zillow). A "For Sale" sign goes in the yard of the home. The seller's agent's primary marketing tool is offering 3% of their 6% commission to other agents to bring a buyer (these are "buyer's agents").

Since the seller is psychologically invested in an inflated CMA price, a price drop to fair market value (FMV), generally comes late in the process, often wasting one or two months of marketing time (t-start, t-1mth and t-2mth). Since the seller's agent complimented the seller's house and property and the seller's decorating taste, the seller's agent cannot now tell the seller to clean the house out. The seller's agent instead recommends "staging" the home with decorations, tables, chairs, art, vases, whatever, which consists of replacing the seller's furnishings and decoration with other furnishings and decorations, at great expense to the seller. Comparing real life use of the present system and computer-assisted methods described herein, experience has shown that the "staging" results is longer marketing time (t-3mth, t-4mth) and costs thousands of dollars, compared to inventive system. Again comparing real life use of the present system and computer-assisted methods described herein, experience has shown that seller's agent inspired open houses are not used by seller's agents to market the house, although that may sometimes happen. The main purpose of a seller's agent is to use the house as bait to obtain new buyer clients. Essentially, the seller can use many free or low cost tools to post a Home For Sale listing on the internet. In the current market, buyers need more help than sellers.

As for buyers' agents, before the Internet, buyers' agents used to select houses for their clients-prospective buyer-visitors to see. But with the advent of on-line MLS and other Internet home listing sites like Zillow, buyers now use the sites' sophisticated search engines to select the homes they want to see. The buyer's agent gains them access to the house and, working through the seller's agent to obtains answers to their questions. The buyer's agent does not provide any services to the seller, but is entitled to a portion—usually 3% of the commission paid by the seller.

Basic System Marketing Process with the Invention

With inventive system and method, the seller actively markets the house with the assistance of a licensed, trained professional real estate "counselor." It eliminates both the seller's agent and the buyer's agent, and results in a faster sale, at a slightly higher price, with a higher chance of success and without paying a commission.

The present system and method matches the way buyers buy a home. Buyers go on the Internet to find the houses that meet their criteria (this is the "brain" part of their decision). Then they select three or four properties to go see. After that, they make an offer on the one they like the best (the "heart" or emotional "emo") part of their decision).

The inventive system and method works. Incremental changes to the inventive system and method over years and experimental implementations of the inventive system and method in good markets and bad, have proven that the inventive system and method used by sellers, on the average, have (a) has sold property faster, (b) for slightly more money, (c) have achieved a better chance of success than the average agent listing, (d) saved the commission, and (e) no legal or regulatory issues. The inventive system and method works best for: (a) Condominiums and 1-4 Family Residences; (b) not located near noxious uses (freeway, junkyard, etc.); (c) not extremely isolated (e.g. in a gates community); and (d) not highly unique home or building designs (e.g. geodesic dome).

The inventive system and method works best when the home seller does the following: (a) Marketing Show Condition Factor. Put the home or property in show condition before putting it on the market. (b) Price Factor. Pricing the home within a range determined by using the inventive system and method to select accurate initial asking price. (c) General Marketing Factors. Engaging in marketing using quantifable marketing factors within the control of the seller. (d) Employing Open House Marketing Factors (OH marketing factor). (e) Employing Emotional Factor (emo-factors) such as providing a self-guided tour of the property with tour docs or placards to highlight aesthetic features (as well as necessary home elements such as master bedrooms, bathrooms, etc.) and avoiding the seller-engaged tour of the property which somewhat embarrasses the buyer-visitor and inhibits discussions between a wife and husband buyer-visitor pair. (f) Monetary Factor: Avoid engaging a buyer's agent to assist in the sale of the property. This monetary factor increases the net-to-seller-price value by 3%. These factors are discussed below and at other locations throughout the description of the invention.

(A) Put the home or property in show condition before putting it on the market. This module addresses attribute-based factors, which by necessity involves the seller's time and/or the seller's money. The system and method incorporates a show condition scoring system (sh-score), from 1-10 (10 is high score), and recommends that the home and garage be at least a score of 8. To achieve sh-score of 8 or better, the property should be: (i) vacant or nearly so, (ii) completely neutralized, (iii) cosmetic flaws repaired (paints, spackled, aesthetically neutralized), (iv) other flaws disclosed, (v) professionally cleaned, and (vi) without staging and use of rented accessories. Lower sh-scores either (1) extend out the time to contract (compare t-start to t-contract) and/or (2) cause reduction in the sale price (compare price-t-start to price-t-3mth to price-t-6mth and price-t-close).

Examples of an Sh-Score System follow: Level 1: zero or no home or property preparation. Level 2: removing valuables. Level 3: removing clutter and garbage. Level 4: placing the home in dinner party condition. Level 5: neutralizing and sanitizing the home (remove personal pictures and items and nick-nakes, and political and religious items). Level 6: one-half empty home (½ the furniture). Level 7: three-quarter empty home with respect to furniture. Level 8: 90% empty home. Level 9: no furniture. Level 10: freshly painted, empty home. Sh-scores of 8 or higher are recommended.

(B) Price the home properly. The inventive system and method works best when the home seller: prices the home within a range determined by using the inventive system and method to select a more appropriate asking price. One may refer to this price-start as a more objective CMA. For example, the system and method has the seller input near the beginning of the process whether the seller is: (i) interested in a quick sale, and the system suggests a price at the low end of the range; or (ii) interested in a sale at top dollar, which causes the system to price the home at the high end of the CMA scale.

Time-based Factors: Note that time-based factors include, among others: (1) t-contract-est; (2) time to get the property in condition to be shown (t-show-prep) wherein the initial seller input for t-contract and t-start is altered or extended to account for t-show-prep time period (for example, cleaning the garage may take 1 week and can be coordinated with professional clean time, but interior painting to correct cosmetic home flaws may take 2 weeks; therefore t-show-prep is 4 weeks (week-1 garage, week-2,3 paint, week-4 professional clean). The inventive system and method provides computer guided time lines to the seller to account for these time-based factors. Some time-based factors are within the control of sellers, such as cleaning and painting. Other time-based factors are not within the control of sellers, such as "active market seasons" and holidays which may disrupt open house cyclic plans. Examples of time-based non-controllable factors include time-based OH factor (this is time-based factor 3): OH days available (for example, it is not productive to have an OH on major holidays such as Christmas, Thanksgiving, Easter, 4th of July, but it may be highly effective to have OH the days after Thanksgiving and/or the weekend before and after the 4th of July holiday); (time-based factor 4) OH total days per weeks (part of the OH cycle), that is the numbers of OH days per week, and per month, accounting for special national events (national holidays) and local events (extremely high traffic days such as St. Patrick's Day in Boston, Mass. or the annual boat show in Fort Lauderdale, Fla.). A fifth time-based factor (time-based factor 5) is a seller's desire for a quick sale which both (i) compresses the t-start to t-contract-est time period and (ii) reduces the t-price-initial-est (t-price-ini-est) to some price at the low end of the CMA-based price range to achieve the quick sale. At the other end of the time-based factor 5, if the seller wants a top dollar asking price, the seller must lengthen the t-contract date.

(C) Engaging in marketing using quantifable marketing factors within the control of the seller. The are identified in the inventive system and method as Marketing Factors. Market Photo or Pic Factor: Create multiple good photos or pics on the home for use on flyers on the self-guided tour docs and the MLS website posting. Market MLS Factor: List the house on the local MLS website with photos (pics) and d-text. Market-flyer Factor: Place a For Sale sign in the front yard of the property with a OOR brochure box stocked with flyers. Count the initial flyer count total (flyer-cnt-ini-tot) and count per location, flyer-cnt-ini-loc-a, etc., and monitor the count per location periodically (weekly) and input the data into the inventive system and method as a marketing performance factor. Typically, flyer loss is only measured at the near or outside-of-residence (OOR) flyer box. Market Flyer Distribution (Flyer-Distrib) factor: Pass the flyers around the neighborhood before the first open house. Market Tour-Guide Factor: prepare self-guided tour materials (signs or placards) which will be placed in each room or unique space in the home or on the property to highlight both (i) needed features (each bedroom, bath, study room) and (ii) aesthetic features (room-with-a-view, a quiet pouch, a place by the fire, etc.) scattered about the property. As a set, these self-guided tour placards are "tour docs" (tour-docs-t-start).

(D) Open House Marketing Factor (OH marketing factor): Conduct regular open houses on Saturday and Sunday afternoons (OH-cycle factor). Advertise the open houses with directional signs leading from the closest major intersection (OH-signage factor), on the flyer (flyer-format factor), and in the MLS listing (MLS market factor). OH Visitor Guest or Log Factor: Create an open house book with detailed information about the house and ask all visitors to sign in the log. Monitor the date and the number of visitors (visitor-log-cnt per time period, wk-1-Sa, compared to wk-1-Su, compared to wk-2-Su, etc.).

(E) Emotional Factor (emo-factor): Almost universally, seller's like to show off their home because they are proud to live in it and want others to enjoy the property. However, again almost universally, prospective home buyer-visitors want to view the home as they would like it, not as the seller sees and lives in the home. Therefore, this emo-factor requires that the sellers leave buyer-visitors alone when buyer-visitors are in the house. Instead of sellers conducting a tour, sellers should tape up self guided tour signs to showcase features of the house (the "Self-Guided Tour" with tour-docs).

(F) Monetary Factor: Avoid engaging a buyer's agent to assist in the sale of the property. This monetary factor increases the net-to-seller-price value by 3%.

The present inventive system and method is an adaptive system which adjusts the seller's behavior and provides additional or corrective seller materials to assist in the sale of the home or property. As earlier described herein with respect to Steps 5.7 and 5.8 and the process has been coded and can be performed by automated program embedded in the tutorial, or manually using worksheets.

The seller maintains and inputs into the computer based system and method (or effects the input by a system counselor) three statistics on a weekly basis: Buyer-visitor Interest based upon number of prospective buyer-visitors at an open house (OH) or otherwise; Flyer Loss; KPIs for Basic Buyer-Visitor Interest Data Table: (a) Flyer loss FL from the OOR brochure box. (flyer-cnt per location; flyer-cnt-loc-a-wk-1, then wk-2 and for loc-b, etc.) (typically FL only at on-residence site). (b) Visitors to the open house. (visitors or prospective buyers are not individually counted, because a husband-wife team is a single "buyer-visitor" and equates to "one visitor" or "one prospective buyer-visitor". This is the "buyer-visitor-cnt" value or "V"). (c) Return Visitors ("buyer-visitor-ret-cnt" value or "RV").

The following table sets for examples of flyer loss thresholds during typical active marker seasons and off seasons. Please note that second homes may have different "second home active seasons" such as in Florida and particularly on beach front property, the Flyer Loss Count (flyer-loss-cnt) time frame may be December 15 through April 15, resulting in a much higher loss count threshold in December than the December threshold listed below. The inventive system and method can account for local seasonal conditions by changing the Flyer Loss Count Threshold. Also, there is no maximum flyer-loss-cnt. Typically, the seller will lose an excessive number of flyers to curious neighbors on the first open house OH weekend if the seller did not distribute the flyers around the neighborhood beforehand. If so, the system and method discounts or ignores the flyer-loss-cnt for the first OH weekend. A reset week 2 of FL is done.

TABLE

| Minimum Flyer Loss Count Thresholds (Seasonal)(flyer-loss-cnt) | |
|---|---|
| January 1 to April 15 | 15 |
| April 15 to July 31 | 20 |
| August 1 to September 15 | 15 |
| September 15 to November 15 | 10 |
| November 15 to December 31 | 5 |

If the Flyer Loss Count FL meets or exceeds the Threshold during the designated time frame period, the system and method determines the ratio of buyer-visitor-cnt to flyer-loss-cnt discussed below. If FL exceeds threshold, the marketing and advertising is working for the seller. If NO, there is something wrong with the advertising and marketing of the open house, e.g. typo in the MLS listing or flyer, or misplaced or insufficient open house directional signs. The system and method provides an adaptive corrective error result, reported to the seller, as further discussed below. Typically, an insufficient flyer loss remediation is (1) check for typos, (2) check OH signs or (3) revise the threshold.

Another adaptive corrective error output by the system and method includes (A) a review by the seller of the initial data input on the following topics and (B) system-generated improvement targets presented to the seller. The several options presented to the seller are: (a) change the posted asking price from price-t-start to price-t-now, for example at the 3 month mark, "price-t-3mth" (the new posted asking price of the property, this results in a flyer update (flyer-t-3mth); (b) clean up the property; (c) renovate the property if the reno is within the monetary factors of the seller and the time-based factors of the seller; (d) alternatively, get architectural drawings for a reno-plan and estimates and to post the same as part of the self-guided tour (tour-docs-t-3mth); (e) upgrade the flyer data as flyer-t-3mth with new pics, more pics, more descriptive textual material ("d-text"); (f) alter flyer distribution locations from fly-loc-a to fly-t-start-loc-b and flyer-loc-c (loc a: curb-side front yard, loc b: front door loc, loc c: local store, church, synagogue or community center); (g) alter flyer format or appearance, color vs. black and white; (h) change location and/or color print the tour-docs; (i) increase open house ("OH") cycle (described earlier); and (i) preparing a short 3-5 minute video clip of the property posting it on YouTube or other social media sites and annotating the flyer with the video link. If the V to FL is over 50%, this means that the property is under priced.

Table: Examples of Buyer-visitor Count to Flyer Loss (buyer-visitor-cnt to flyer-loss-cnt ratio): Time-based Factor: Quick Sale: minimum ratio of buyer-visitors to flyer loss is 35%.

Monetary Factor: Seller's goal is top dollar: minimum ratio is 20%.

Whether or not the seller is achieving the threshold ratio (a YES result), the inventive system and method determines the ratio of return visitors/buyer-visitors (buyer-visitor-ret-cnt) to total visitors/buyer-visitors (buyer-visitor-cnt-tot). If NO, the system and method recommends that the seller reduce the price (reduce price-t-start to price-t-ERR-1) until the minimum buyer-visitor-cnt to flyer-loss-cnt ratio is achieved. The supporting explanation follows. When a prospective buyer-visitor gets a flyer from the brochure box, the buyer-visitor knows all the pertinent details about the house. The flyer should discuss details (as flyer d-text) and have photos (pics) for: bedrooms, bathrooms, size, price, neighborhood, school attendance areas, etc. Some buyer-visitors need four bedrooms, and will thus pass over a house with only three. This is a functional need of the prospective buyer-visitor.

If the marketing materials (the flyer) indicates that the house meets the functional parameters of the buyer-visitor, the seller's materials should draw the buyer-visitor to the open house OH. If time-based limits are placed on the OH cycle, the buyer-visitor-cnt to flyer-loss-cnt will be lower. If buyer-visitor-cnt is not happening at a sufficient rate, it means that there's something wrong with the information on the flyer. The only thing the seller can change is the price.

The adaptive corrective error output by the system and method discussed above in connection with the minimum threshold value for flyer-loss is again reviewed by the seller and this creates system-generated improvement targets to the seller.

The only information on the flyer that the seller can change is the asking price. The seller should drop the asking price to price-to-ERR-1 until the seller achieves the minimum buyer-visitor-cnt to flyer-loss-cnt ratio for the seller's selling goal. The same is true if the seller's goal changes from a top dollar sale to a quick sale.

Table: Example Return Buyer-Visitor to Total Buyer-Visitor Ratio (buyer-visitor-ret-cnt to buyer-visitor-cnt-tot) (RV compared to V):minimum ratio is 17% (1 in 6 visitor-buyers should return a second time).

If the seller is achieving at least 17% RV to V, the system and method processes a YES event to the decisions point. There is no maximum buyer-visitor-ret-cnt to buyer-visitor-cnt-tot ratio. If the seller is not getting at least 17% return visitor-buyer-visitors, the NO decision brand is taken. With less than a 17% ratio, this informs the seller that buyers do not like the house. This is an emotional or emo-factor. There are four possible reasons for less than 17% buyer-visitor-ret-cnt to buyer-visitor-cnt-tot ratio. (1) Show Condition Issue: The remedy is to clean it out and clean it up. The show factor score or sh-score discussed earlier must be improved to 8 or higher. (2) Style Obsolescence: (e.g. four-inch orange shag carpet from 1968). The remedy is to either (a) remove the outdated style features (i.e. remove the carpet but not replace it), or (b) post on the self-guided tour placard or tour-doc a price discount or allowance for replacement features at the buyer's choice. (3) Functional Obsolescence (e.g. the small kitchens, bathrooms and closets in older homes). The remedy is to drop the asking price (price-t-ERR-2) until the 17% buyer-visitor-ret-cnt to buyer-visitor-cnt-tot ratio is achieved. In this case, the ratio of initial visitors might increase substantially. (4) Back Off. This is an emotional or emo-factor. If the house has no problems, the only remaining problem is with the sellers themselves. Buyers need to be in touch with their feelings when going through the house, making their heart decision (the buyer-visitor emo-factor). The remedy is to leave the buyer-visitors alone in the home or property, and use the Self Guided Tour signs to showcase the property's features.

System Eliminates the Need for Conventional Buyers and Sellers Agents

The inventive system and method replaces the seller's agent for the marketing process, (providing signs and the MLS/Internet listing), and provides more effective marketing services (accurate market analysis, accurate evaluation of show condition, accurate marketing feedback). The inventive system and method provides the same services as a conventional seller's agent for contract negotiation and closing. As for the Buyer's Agent, the agent provides a showing appointment for the buyer. The system and method provide sellers to conduct regular open houses and advertise the open houses in the MLS/Internet listing, and on the flyer. Prospective buyers can visit the house without any help from an agent. The buyer's agent also accompanies the buyer to the appointment. The only service from the buyer's agent to the seller is security of valuables in the home. Counseling and online tutoring is provided by the system and method such that seller take care of that by removing all valuables before the first open house. The buyer agent also may point out features of the house. The inventive system and method points out features with the Self-Guided Tour signs (developed by pics and d-text earlier provided by the seller) (typically, the tour signs do not have pictures), allowing the buyers to go through the house by themselves at their own pace, to get in touch with the buyer's feelings. Buyers agents communicate their client's questions to the seller's agent, who obtains the answer from the seller and then communicates back to the buyer agent, who communicates with the buyer. The present system and method handles questions by the Self-Guided Tour signs, the Open House book, and by direct communication between the seller and buyer. The system and method is faster and provides more accurate than the agent-driven process. Finally, buyers' agents provide no services to the seller in the negotiation and closing process. The buyer's agent works for the buyer.

Thus inventive system and method eliminates the need for both the listing agent and the buyer's agent. It eliminates over 5% of the 6% agent commission, and works faster, with a better chance of success. The system and method is unique and truly disruptive to the conventional real estate industry.

Integration of the Computer-Assisted Method and System

FIG. 19h diagrammatically illustrates an exemplary adaptive home selling system and method in accordance with the principles of the present invention. FIGS. 19i and 19j diagrammatically illustrate timelines associated with a successful time to contract and an error routine when the key monitoring modules (Key Performance Indicators or KPIs) of flyer loss, buyer or visitor count to flyer loss ratio, and return buyer-visitors to total buyer-visitor count ratio are less than the threshold. FIG. 19k diagrammatically illustrates an adaptive attribute-based correction routine.

In FIG. 19h, the exemplary adaptive home selling system and method is diagrammatically illustrated beginning in program element 422. In functional step 423, the residence is prepared by cleaning, reducing the clutter, painting, in effectively neutralizing the look and feel of the entire residence and property. In functional step 224, the seller prepares and distributes the flyers with the assistance of the computer-based program. In functional step 425, the seller places the self-guided tour placards or signs about the residence and property. The self-guided tour placards or signs show both functional aspects of the residence as well as aesthetic aspects of the property. In functional step 426, the seller has several open house events as scheduled manually or by the computer assisted method.

In one potential embodiment, the open house schedule is a calendar prepared by the computer system. Further, the flyers can be prepared by utilizing preformatted forms on the computer. The self-guided tour placards can also be prepared using other preformatted forms on the computer. Pictures taken by the seller are uploaded to the computer and the forms filled out with the manual assistance of the seller. Textual material describing the property is added to the flyers as well as to the self-guided tour placards. Typically, the self-guided tour placards do not have photographs. However, by using photographs on the tour placards the seller can highlight and aesthetic view not currently seen during the active buying season (for example, a winter scene of a lake which, in the summer season, the lake view is obscured).

In decision step 427, a determination is made whether the OOR flyer loss at a particular open house event (one OH may be a Saturday-Sunday combination, considered as a single open house event) exceeds a threshold. Flyer loss can be calculated over several OH. The seller counts the near residence flyer loss and inputs into the computer. The seller counts initial flyer distribution at the curbside of the property or at the door of the property. This is the "out of residence" location discussed hereinafter as "OOR." After the OH event, the seller counts the OOR "on property" flyer and determines the "flyer loss" for the OH event. The flyer loss count is input into the computer. If the flyer loss is very high on the first weekend it is an indication that the seller did not pass flyers around the neighborhood, so the FL/V ratio will be invalid. If the NO branch is taken from decision step 427, the system executes functional step 429 which is "go to adaptive attribute-based correction routine."

If the YES branch is taken from decision step 427, the system executes decision step 428 which is a determination whether the visitor or buyer count to flyer loss ratio is greater than a predetermined threshold. If NO, the system returns to functional step 429, "go to adaptive attribute-based correction routine." If YES, the system executes decision step 430 which determines whether the return buyer count to total visitor or buyer count is greater than a threshold. If NO, the system goes to functional step 429 which is the "adaptive attribute-based correction routine." If YES, the system goes to functional step 431 which is a determination whether an acceptable offer has been obtained. If NO, the system returns to functional step 429. Alternatively, the open house schedule can be changed and the frequency the open house can be increased. Other corrective measures can be employed. If YES, functional step 432 closes the transaction.

In the currently working embodiment, these KPIs (flyer loss; V vs. FL ratio, and RV vs. V ratio) are computed for each OH (a Sa-Su OH pair is considered a single OH in the system).

FIGS. 19i and 19j diagrammatically illustrate timelines associated with a successful time to contract and an error routine when the KPI monitoring modules of: (a) flyer loss exceeds minimum, (b) buyer or visitor count to flyer loss ratio exceeds minimum, and (c) return buyer-visitors to total buyer-visitor count ratio exceeds minimum corresponding predetermined thresholds. It should be noted that all three key monitoring modules are generally processed at the same time. Therefore, the seller could achieve one or the other or all three key performance indicators (KPIs) at the same time. Other KPIs are reasonably documented in completely unrelated management and engineering systems and processes. As in all KPI-based systems, the important discovery is (i) what indicator(s) should one select out of the multiple variables which change the resultant and (ii) what are the thresholds for each KPI, and finally, (iii) does the KPI work to affect the output or resultant of the process. Herein, the resultant is the significant reduction to time T-S, the time to contract and chance of success.

FIG. 19i begins at time T0. The seller initiates the system at time T0 and enters the seller's profile and any basic residence data and pics as discussed above. In time block 434, the seller prepares the residence. Between the time block T1 through T2, that is, during period 435, the seller prepares his or her marketing materials and distributes those marketing materials. As indicated above, the marketing materials include flyers with pictures and text describing functional features and aesthetic features of the home or residential property (pictures for aesthetics), self-guided tour signs or placards, as well as electronic marketing materials including releases to the MLS and other Internet-based real estate property sites. During time period 436, the seller in period 436 engages and executes the open house OH schedule between times T2 and TS. Time TS graphically indicates that the seller has obtained an acceptable offer and effectively is the time to contract. As noted by Variable A at location 438, the time to contract TS is variable and can move forward or backward because it is completely dependent upon the independent acts of another.

Time TC-EST is the time the seller initially estimated as the time to obtain an acceptable contract. This TC-est is initially either input or generated by the system. Although this estimated time to contract TC-EST may be initially set and then system readjusted based upon the data input and the likes and dislikes of the seller and visitors during the initialization of the adaptive computer method and system, generally, the time is set once the initial settings are input based upon computer data input. Lastly, at time TC, the transaction is closed. As shown in OH region 439, the time of contract TS is subject to Variable A. Generally, time TC, the close of the transaction, is linked to time TS, that is when the contract for sale of the property signed. Of course, as discussed above, not every property placed "for sale" sells within an acceptable time period. Therefore, at time T3, during the open house period 436, the system may detect an error 440 at time T3. The errors are indicated by inadequate KPIs. The error correction routines are discussed above and, to some extent, in connection with FIG. 19*k*, below.

Assuming an error has been detected by the system at time T3 based upon one or another of the three KPI monitoring modules, the computer assisted method and system adapts and promotes buyers' behavior as discussed herein. The three key monitoring modules are: (a) flyer loss, (b) buyer or visitor count to flyer loss ratios, and (c) return buyer-visitors to total buyer-visitor count ratios, which are gauged or measured against corresponding predetermined thresholds. The thresholds set forth above were determined over years of testing the present system. Some thresholds are unique to geographic areas, such as the "active home or property season" in the locale. Some are driven by seasonal weather conditions. Also, although the flyer-loss-count has a minimum threshold, a negative algorithm could be used to measure flyer loss.

FIG. 19*j* begins at time T3-error or T3-err. The error routine is a result of error at region 440 in FIG. 19*i*. In time block 442, the seller plans to further prepare the residence or improve the residence either by cleaning, painting, obtaining renovation plans or removing carpets or other fixtures or otherwise. These changes are discussed earlier and discussed later in conjunction with FIG. 19*k*. At time T4, the seller makes a decision as to what steps if any the seller would undertake to achieve the estimated time to contract. The revised estimated time to contract T-C-EST(rev) is shown in FIG. 19*j*. In time period 443 between times T4 and T5, the seller effects a change to the residence during period 443. Experience has indicated that sometimes this time period 443 is only a matter of days, such as in connection with making the residence more neutral or cleaning the garage or painting one or more rooms. Between times T5 and T6, the seller prepares additional marketing materials and distributes those marketing materials during period 445. In period 446, the seller resets the open house schedule and executes that open house schedule. Time TS is noted to be the time that the seller obtains an acceptable offer. Time TS is subject to Variable B at region 447. The time to close TC is generally linked to the time to contract TS as noted by Variable B in region 448. The seller, being more realistic at time T3-error, has revised the estimated time to contract TC-EST. In some situations, the computer assisted method would reset the time to contract TC-EST. If during the open house schedule 446 the seller does not achieve one or more of the three key KPI monitoring items, the system at time T7 executes an error routine 450. This repeats the general timeline steps at T3-error as noted in region 452.

FIG. 19*k* diagrammatically illustrates an adaptive attribute-based correction routine. FIG. 14*k* shows the activation of the adaptive attribute-based correction routine 460. In functional step 461, the system prompts the seller to unclutter and make neutral the residence or property. In functional step 462, the system instructs the seller to clean, paint and conduct either minor renovations, such as the removal of old or outdated carpets, repair holes in walls, etc. In decision step 463, the system, based upon input of the seller, determines whether the renovation is major or minor. If minor (such as minimal renovation), the system in functional step 465 determines whether the seller has the money to do that minor renovation (a monetary factor, this may alter the net-to-seller-price, that is the net to the seller at closing, less the cost of renovation or reno discount on the asking price). If not (N), the system activates functional step 467 which is the default or lower the asking price for the property.

If the seller has adequate funds as noted in functional step 465, the system goes to YES (Y) and in functional step 469 activates makes a determination whether this is the third cycle through the minor correction routine from decision step 463. If not (N), the system asked activates functional step 471. If yes (Y), the system recycles to default, lower asking price, functional step 467. If this is not (N) the third cycle through the minor correction routine from decision step 463, the no (N) branch is taken from functional step 469, and the system activates decision step 471 which determines whether this is the second cycle through the minor correction. The three-cycle and two-cycle tests suggest that before the seller lowers the price of the home certain repairs be made to the property. If the no (N) branch is taken, the system loops to the output of functional step 464 discussed later. If yes (Y), the system activates functional step 473 which enables the seller to obtain a renovation plan. In functional step 475, the system discounts the asking price based upon the reno plan. This discount could be provided by a self-guided tour sign, or a note added to the marketing materials, or otherwise. In functional step 477, the computer-based system prompts the seller to post the renovation as a placard.

Returning to major/minor decision step 463 (the term "major" and "minor" may be dictated by the prospective mortgage or finance entity), if the major branch is taken, in functional step 464, the system determines whether the seller has sufficient funds to engage or do the major renovation. If not, the no branch is taken to the minor or minimum renovation branch output of decision step 463. If the yes branch is taken from monetary factor 464, the functional step 466 determines whether the major renovation can be completed within the estimated time to contract TC-EST. If no, the system in functional step 468 changes the estimated time to contract and obtains TC-EST-REV (estimated time to contract revised). If this further estimated time to contract-revised is not acceptable to the seller, the no branch is taken and default functional step 467 prompts the seller to lower the asking price.

Returning to functional time-based factor step 466, if the yes branch is taken, in functional step 470 the seller changes the property attribute(s) such as by painting, cleaning, renovation, etc. In functional step 472, the system resets the open house schedule. As indicated earlier, this may be a calendaring action prompting the user to set the open house schedule. In functional step 474, the user revises the marketing materials and distribute the marketing materials as needed. The seller also sets out the signs for the open house and the directions to the home or property and whatever else is needed including distributing additional flyers or providing flyers throughout the neighborhood and community centers, churches and other places of worship. In functional step 476, the system prompts the user to execute the open house schedule and monitor the results.

In a preferred working embodiment, the three major KPIs (flyer loss count) (flyer loss to buyer-visitor count ratio) (return visitors to total visitors) are all important at every OH event. As stated earlier, a Sa-Su combo event is a single OH event for the system.

It should be noted that the processes and functional steps set forth above may be re-organized to achieve a more efficient system or a modified system or process flow within the scope and spirit of the present invention.

Figure 21:
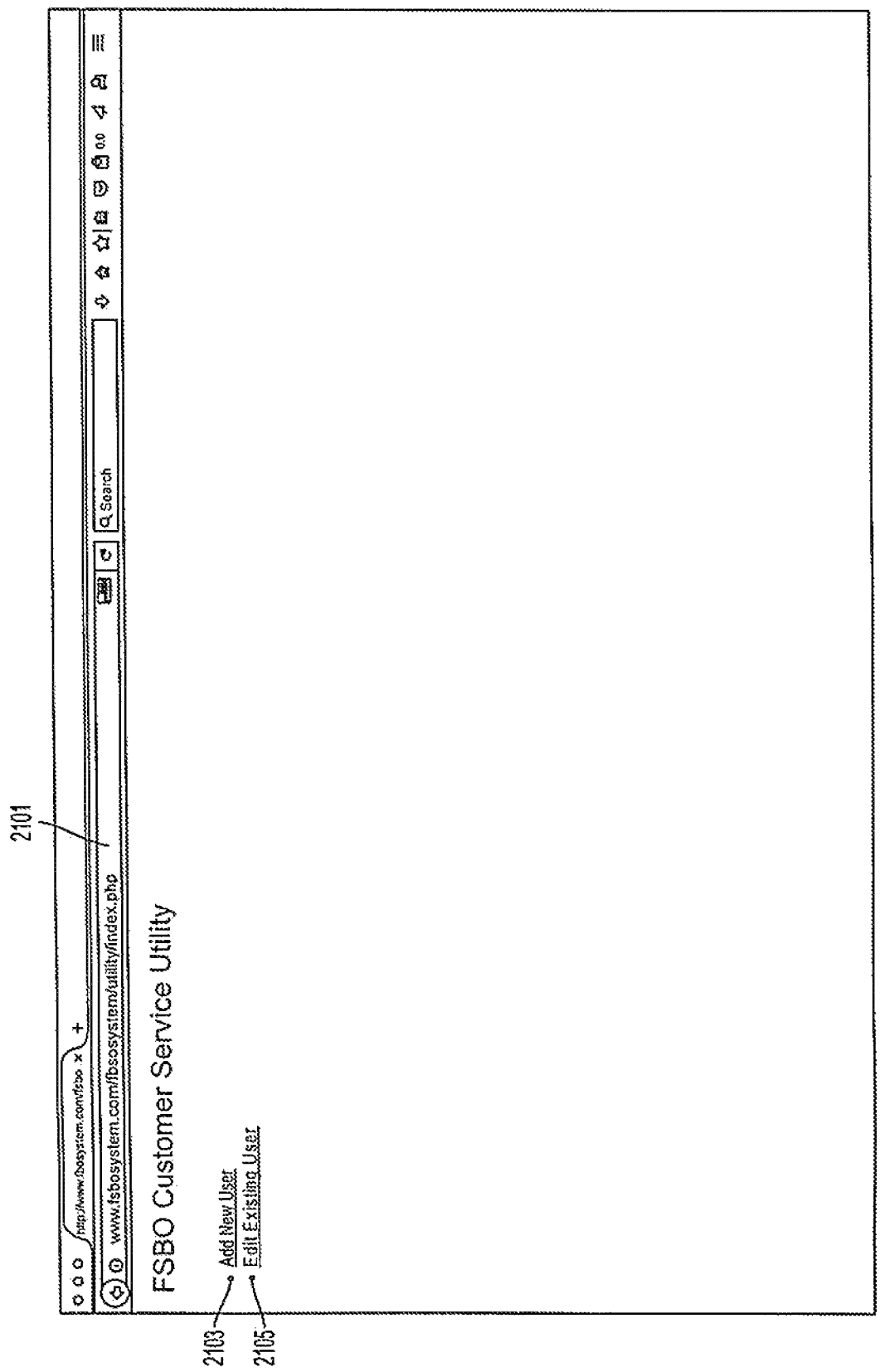
FIG. 21 illustrates an example login feature of a webpage in accordance with an interactive web based guide for processing of real estate transactions from the perspective of a counselor, according to an aspect of the present disclosure.

As illustrated in FIG. 21, in one embodiment, a counselor may navigate to a website 2101 via web browser 134 on GUI 132 of the counselor device 130. In one embodiment, the website 2101 may display a webpage that provide means for the counselor to interact with the CSU 164. For example, the webpage of the website 2101 may include link 2103 to add a new user and/or link 2105 to edit an existing user. In one embodiment, a seller may be the seller associated with the real estate transaction systems and methods described herein.

Figure 22:
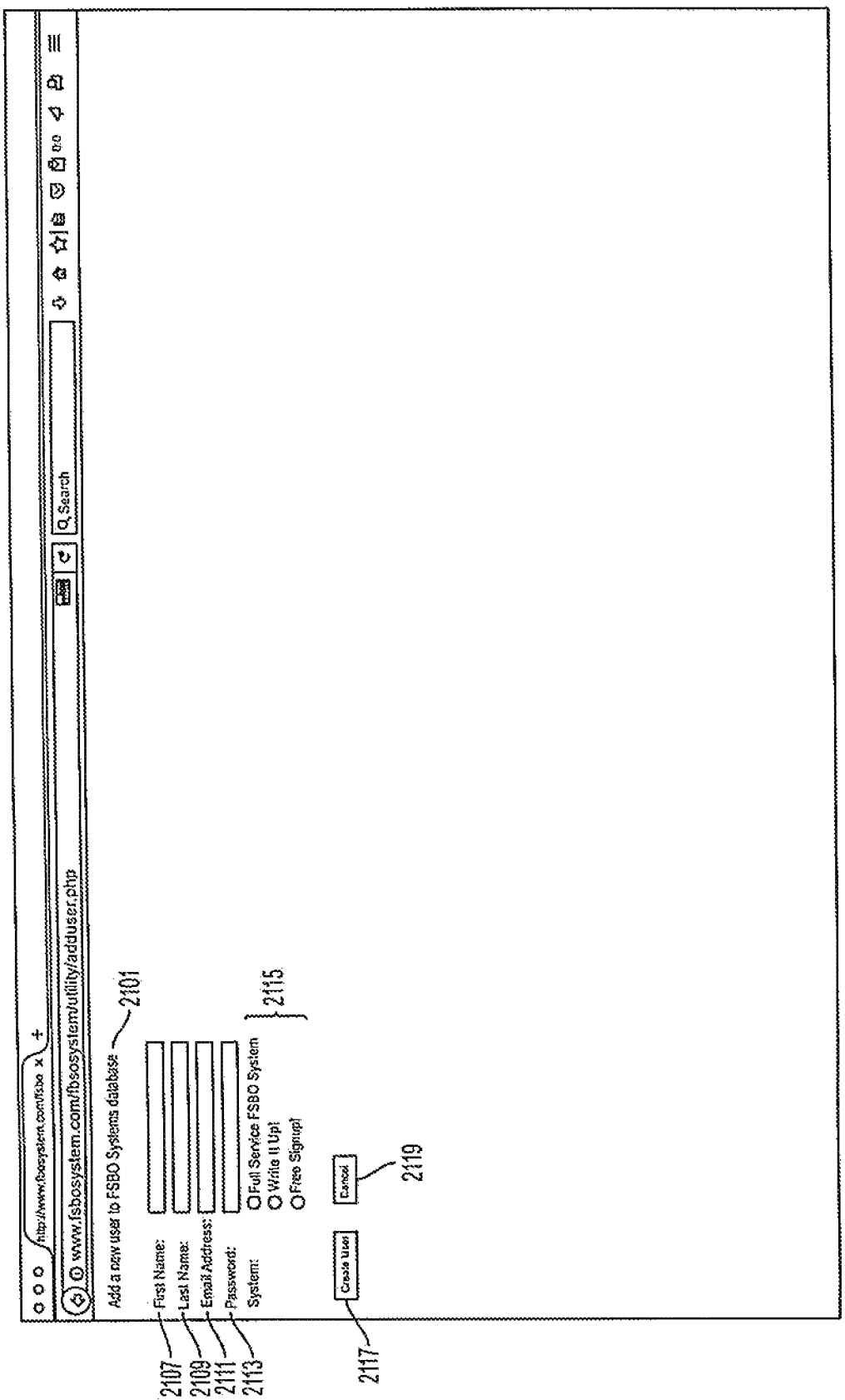
FIG. 22 illustrates an example additional login feature of a webpage in accordance with an interactive web based guide for processing of real estate transactions from the perspective of a counselor, according to an aspect of the present disclosure.

In one embodiment, a counselor may add a new seller associated with the real estate transaction systems and methods described herein. For example, as illustrated in FIG. 22, upon selecting add a new user link 2103 in FIG. 21, the webpage of website 2101 may update to display one or more fields configured to receive information regarding a new user. In one embodiment the counselor may input a first name in field 2107, last name in field 2109, email address in field 2111, and password in field 2113 associated with the seller. In one embodiment, the counselor may create different types of accounts via selectors 2115. Upon selecting the create user button 2117 of the webpage of website 2101, an account may be created in the database 170 in connection with the created user (i.e., seller). In one embodiment, the database 170 may be a MySQL database or similar data structure. In one embodiment, only after a counselor enters the information related to the seller, may server 160 provide access to the seller and/or permit the seller to provide data and information to the CSU 164 via the online interactive tutorial 162. In one embodiment, the online interactive tutorial may display the MySQL data for each user using dynamic Hypertext Preprocessor (PHP) via the CSU 164.

Figure 23:
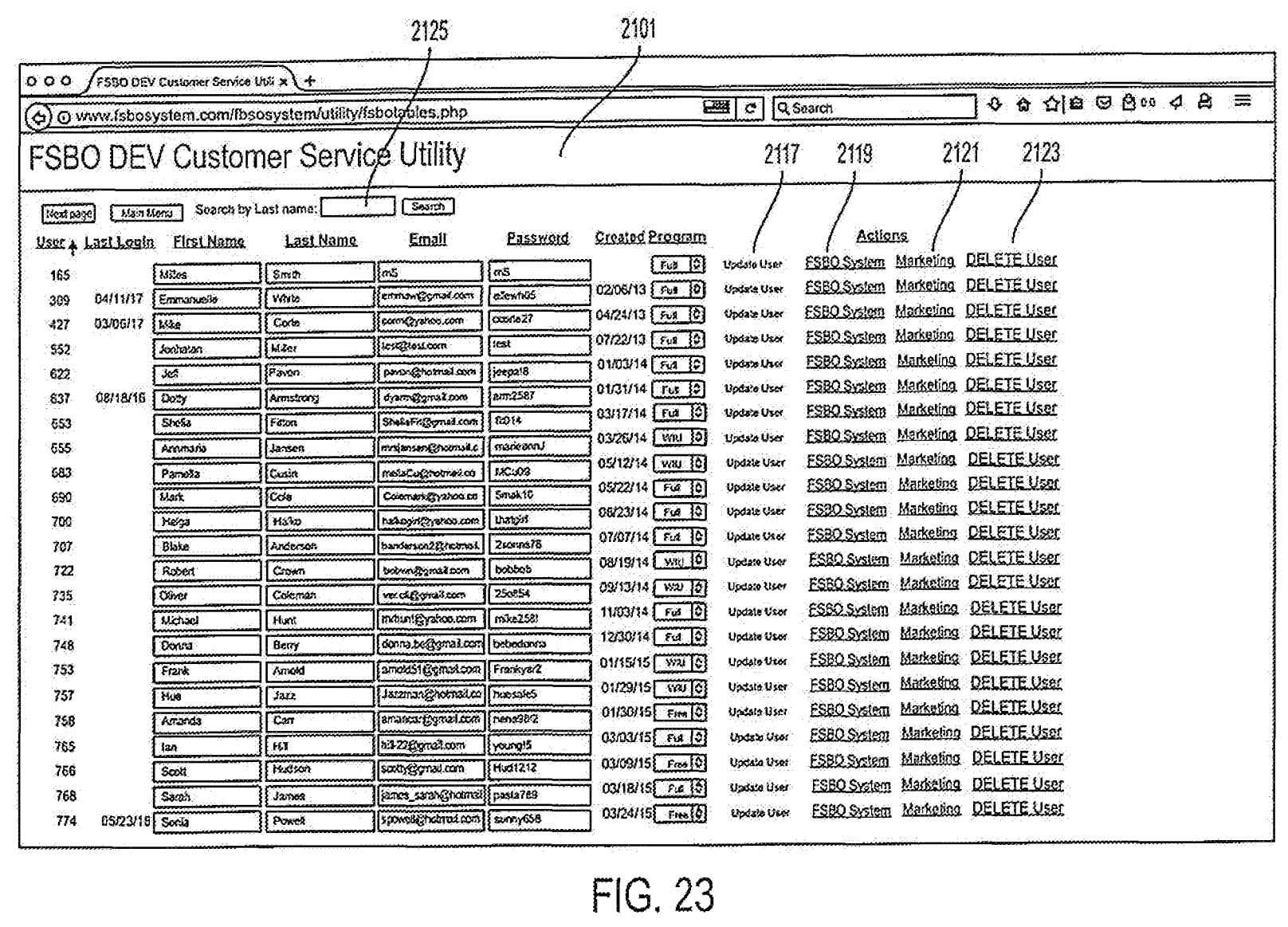

In one embodiment, a counselor may edit an existing seller record associated with the real estate transaction systems and methods described herein. For example, as illustrated in FIG. 23, upon selecting edit an existing user link 2105 in FIG. 21, the webpage of website 2101 may update to display the one or more users of the real estate transaction system stored in the database 170. User information may be displayed in the webpage of website 2101 including user index, last login, first name, last name, email, password, date when the account was created, and the account type. From the user information webpage of website 2101 the counselor may update information regarding the seller 2117, retrieve information related to the user's progress in the Real Estate Transaction link 2119, Marketing Information for the seller in link 2121, or delete the record via 2123 from the database 170 corresponding to the user. Optionally, the webpage of website 2101 may include a function 2125 to search the users by last name.

General System Description

In one embodiment, as illustrated in FIGS. 24A-24E the counselor may view the user's progress in the Real Estate Transaction 2119. One or more of the fields illustrated in FIGS. 24A-24E may be editable by the counselor. The fields may include information received from the seller in connection with the online interactive tutorial 162. For example, the following information related to the real estate transaction may be included: counselor's notes, ball park price, projected savings, top priority item (goal), top priority cost (goal's cost), sale date, sale date type, closing date, closing date type, goal, seller name, seller address, seller contact information, seller phone, seller email, show condition score, show condition score (as entered by a third party, e.g., the counselor), reconciled show condition score, tentative asking price, goal adjustment factor (factor 1 for adjusted CMA, factor 2 for adjusted CMA), general market condition including market collapse, time of year, short sale, owner financing available, other conditions, special features, vacancy, tenancy, additional market weakness, failed home owners association, show condition difference, adjusted price, major repairs completed, major repairs needed, asking price, expected sale price, projected savings, flyer information (including address, exterior and interior photographs, asking price, street address, bedrooms, bathrooms, garages, house size, lot size, built year, remodel year, grade school, junior high school, senior high school, contact email, best features, other features, days/times available for regularly scheduled open houses), primary image of the real estate property, map image, front of flyer, back of flyer, actual sale price, agent commission, other costs, calculated savings, foundation contributions, days on market, user feedback regarding selling on own (i.e., without an agent), selling with real estate transaction system 100, and counselor reviews. One or more of the fields may be automatically populated based on information received by the CSU 164 and/or calculated by the computational modules 165.

Figure 25A:
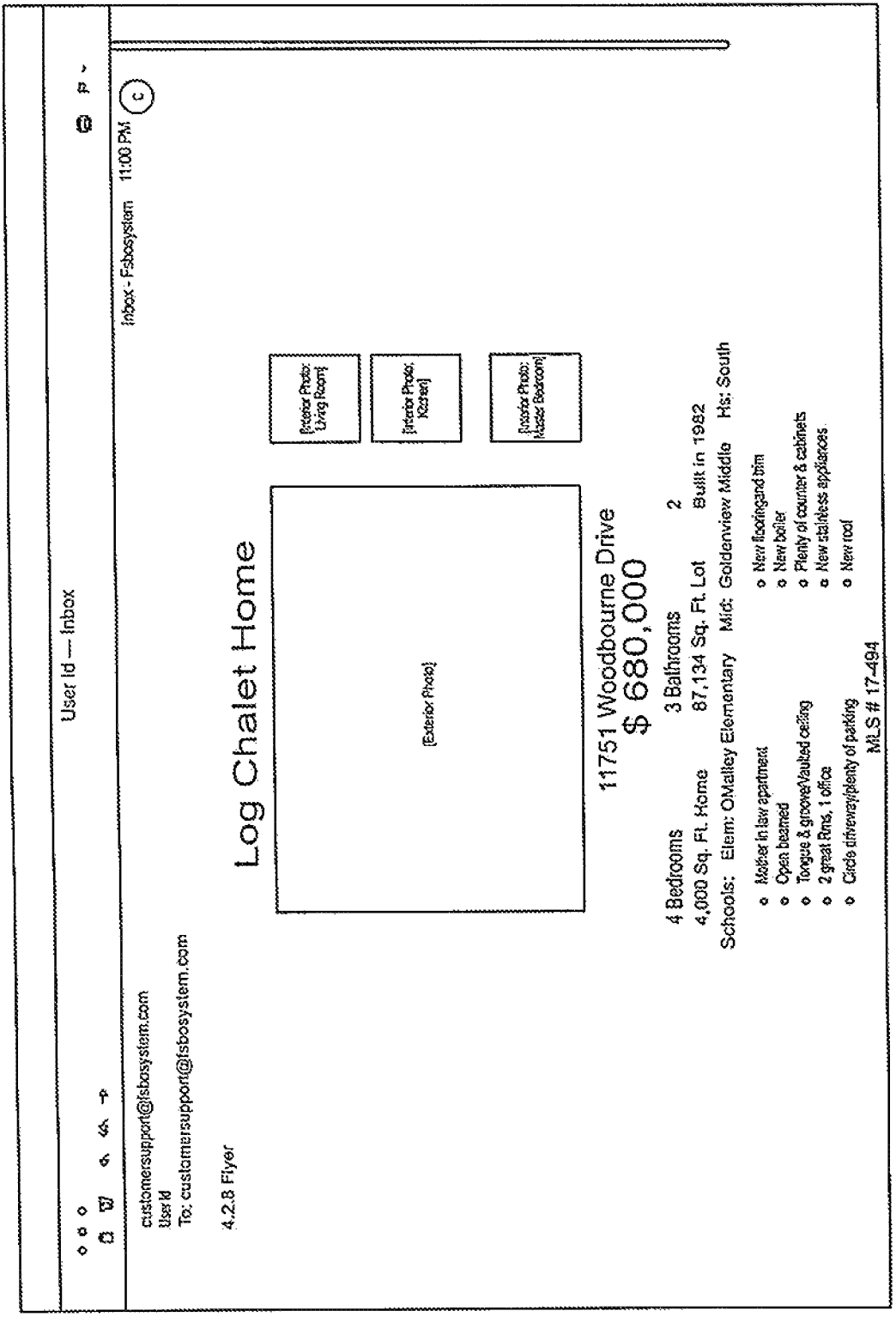
FIG. 25A illustrates an example portion of an email transmitted to a counselor via the system responsive to particular seller information input via the online interactive tutorial, according to an aspect of the present disclosure.

As illustrated in FIG. 25A, in one embodiment, a counselor may automatically receive an email at the counselor device 130 when a seller has uploaded or entered data and information into the online interactive tutorial 162 corresponding to one or more of the steps and/or sub-steps described above. For example, upon receiving data and information at the online interactive tutorial 162 from the seller, related to creating a flyer, the seller may create a flyer (according to the seller's input) that is then transmitted to the counselor via email. As illustrated, the flyer may be provided to the counselor device 130 in the text of the email. Alternatively, a link to an electronic file may be provided to counselor device 130. An example flyer is depicted in FIG. 258.

FIG. 26 illustrates a webpage available to a counselor via counselor device 130. As illustrated, upon selecting Marketing Information for the seller via link 2121 in FIG. 23, the dashboard or GUI 132 may be updated with marketing information regarding the user. The displayed marketing information may include values computed by the computational modules 165 of the server 160 including, for example, the flyer loss, new visitors, return visitors, and any suitable related statistics.

Figure 27:
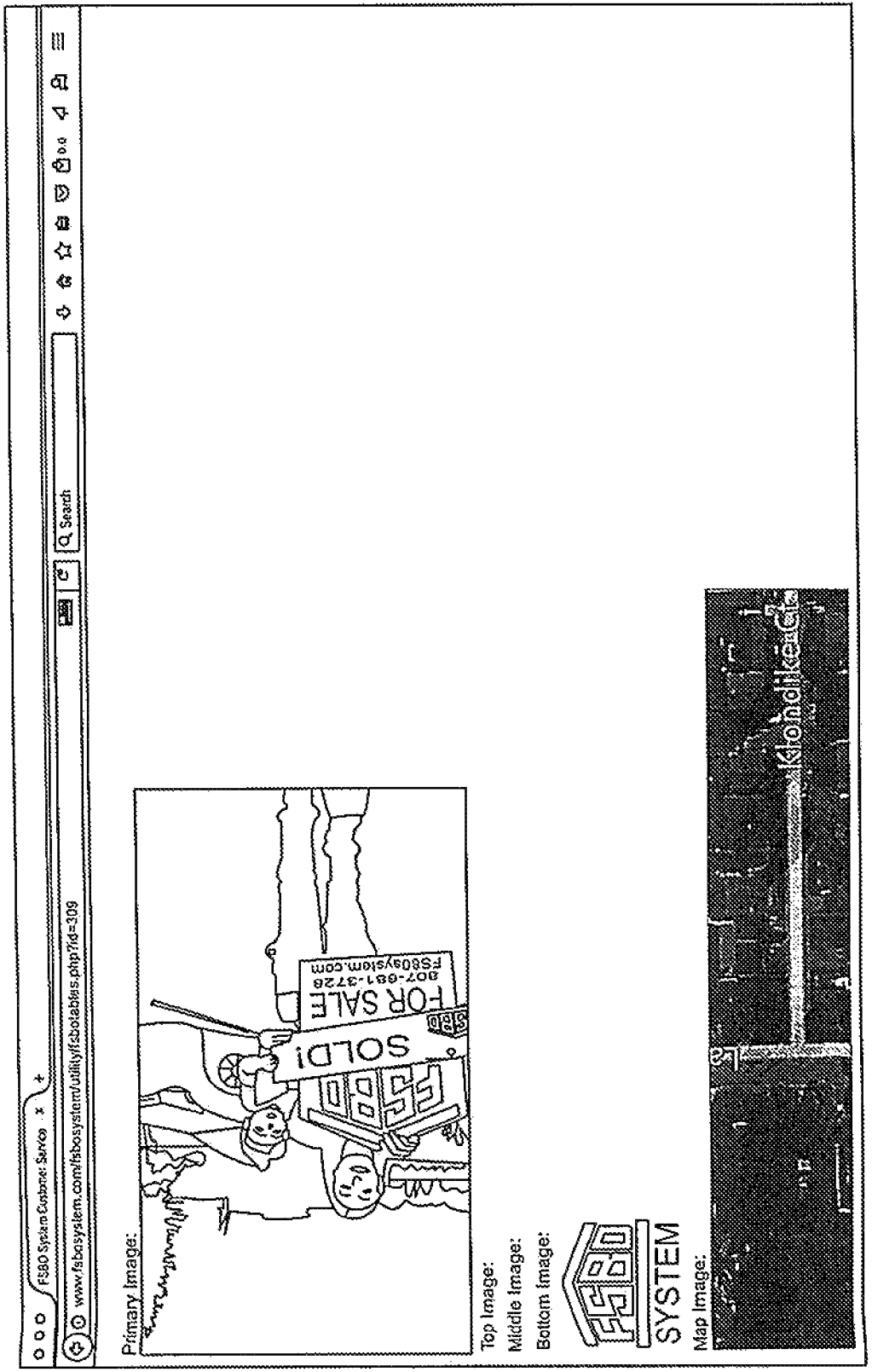
FIG. 27 illustrates an example webpage available to a counselor in accordance with the online interactive tutorial, according to an aspect of the present disclosure.

FIG. 27 also illustrates a webpage available to a counselor via counselor device 130. As discussed above, in one embodiment, the seller may upload one or more images related to the closing and provide feedback regarding their experiences with the online interactive tutorial. The images and feedback uploaded by the seller to the online interactive tutorial 162 via seller device 110 may be transmitted to the server 160 and displayed to the counselor on the counselor dashboard 132.

In one embodiment, a third party service provider separate from the counselor may manage and maintain the seller accounts depicted in FIGS. 21-27.

Systems and methods of the present disclosure may include and/or may be implemented by one or more specialized computers including specialized hardware and/or software components. For purposes of this disclosure, a specialized computer may be a programmable machine capable of performing arithmetic and/or logical operations and specially programmed to perform the functions described herein. In some embodiments, computers may include processors, memories, data storage devices, and/or other commonly known or novel components. These components may be connected physically or through network or wireless links. Computers may also include software which may direct the operations of the aforementioned components. Computers may be referred to with terms that are commonly used by those of ordinary skill in the relevant arts, such as servers, personal computers (PCs), mobile devices, and other terms. It should be understood that those terms used herein are interchangeable, and any special purpose computer capable of performing the described functions may be used.

Figure 28:
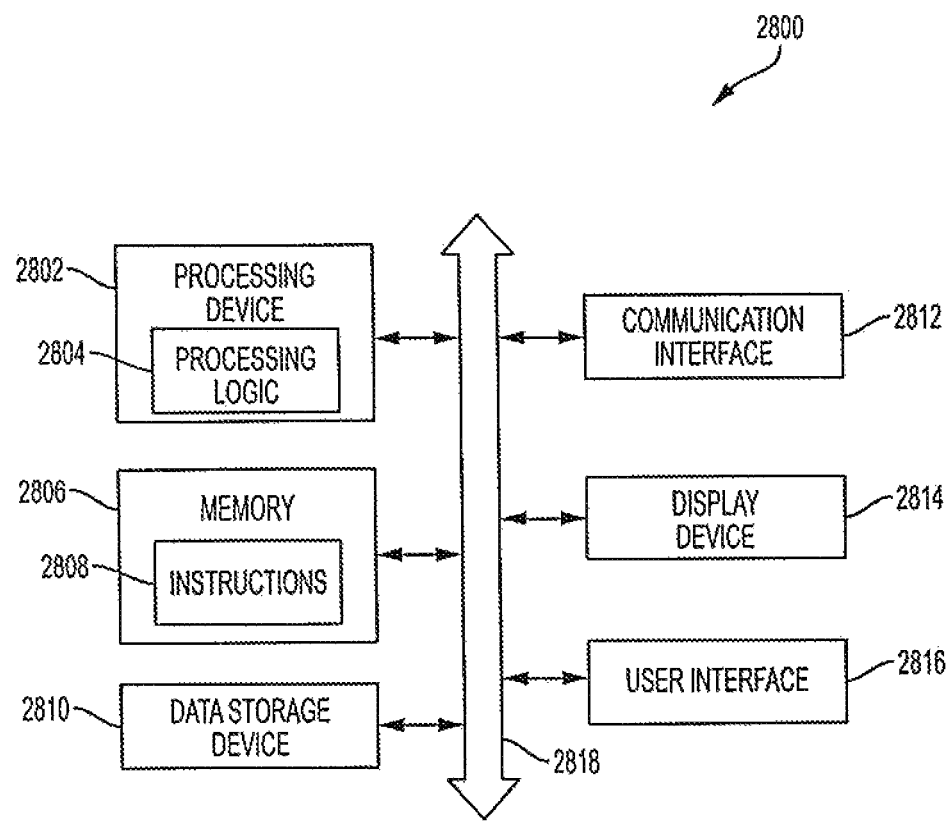
FIG. 28 is a functional block diagram illustrating an example computer system, according to an aspect of the present disclosure.

FIG. 28 illustrates a functional block diagram of a machine in the example form of computer system 2800 within which a set of instructions for causing the machine to perform any one or more of the methodologies, processes or functions discussed herein may be executed. In some examples, the machine may be connected (e.g., networked) to other machines as described above. The machine may operate in the capacity of a server or a client machine in a client-server network environment, or as a peer machine in a peer-to-peer (or distributed) network environment. The machine may be any special-purpose machine capable of executing a set of instructions (sequential or otherwise) that specify actions to be taken by that machine for performing the functions describe herein. Further, while only a single machine is illustrated, the term 11 machine 11 shall also be taken to include any collection of machines that individually or jointly execute a set (or multiple sets) of instructions to perform any one or more of the methodologies discussed herein. In some examples, each of the seller device 110, counselor device 130 and server 160 may be implemented by the example machine shown in FIG. 28 (or a combination of two or more of such machines).

Example computer system 2800 may include processing device 2802, memory 2806, data storage device 2810 and communication interface 2812, which may communicate with each other via data and control bus 2818. In some examples, computer system 2800 may also include display device 2814 and/or user interface 2816.

Processing device 2802 may include, without being limited to, a microprocessor, a central processing unit, an application specific integrated circuit (ASIC), a field programmable gate array (FPGA), a digital signal processor (DSP) and/or a network processor. Processing device 2802 may be configured to execute processing logic 2804 for performing the operations described herein. In general, processing device 2802 may include any suitable special-purpose processing device specially programmed with processing logic 2804 to perform the operations described herein.

Memory 2806 may include, for example, without being limited to, at least one of a read-only memory (ROM), a random access memory (RAM), a flash memory, a dynamic RAM (DRAM) and a static RAM (SRAM), storing computer-readable instructions 2808 executable by processing device 2802. In general, memory 2806 may include any suitable non-transitory computer readable storage medium storing computer-readable instructions 2808 executable by processing device 2802 for performing the operations described herein. Although one memory device 2808 is illustrated in FIG. 28, in some examples, computer system 2800 may include two or more memory devices (e.g., dynamic memory and static memory).

Computer system 2800 may include communication interface device 2812, for direct communication with other computers (including wired and/or wireless communication) and/or for communication with network 140 (see FIG. 1). In some examples, computer system 2800 may include display device 2814 (e.g., a liquid crystal display (LCD), a touch sensitive display, etc.). In some examples, computer system 2800 may include user interface 2816 (e.g., an alphanumeric input device, a cursor control device, etc.).

In some examples, computer system 2800 may include data storage device 2810 storing instructions (e.g., software) for performing any one or more of the functions described herein. Data storage device 2810 may include any suitable non-transitory computer-readable storage medium, including, without being limited to, solid-state memories, optical media and magnetic media.

Definitions

It may be useful to define several terms used in relation the systems and methods described herein. It should be appreciated that the following definitions are used throughout this application. Where the definition of terms may depart from a commonly used meaning of the term, the definitions provided below are used, unless specifically indicated.

The term "Agent" refers to an individual or group of individuals that represent(s) the interests of one or more parties to the real estate transaction. An agent may include a licensed real estate professional and be referred to as a Real Estate Agents, Real Estate Broker, Real Estate Salesperson, Real Estate Associate Broker, and the like. Responsibilities of an agent may include transferring information and communicating between the parties involved in the real estate transaction. An agent may be bound by fiduciary and common law duties related to confidentiality, accounting and the like as is imposed by their licensing organization.

The term "Agent-Driven Process or Model" refers to a traditional real estate transaction having a designated agent for the seller (i.e., the listing agent) and a designated agent for the buyer (i.e., the buyer's agent). In some embodiments, a single agent may be designated as both the listing agent and the buyer's agent.

The term "Buyer focused computational utility" may refer to a computational module that is configured to receive and process feedback from prospective buyers with regards to the seller's marketing process. In one embodiment, the buyer focused computational utility may obtain data for at least one of the following metrics: marketing effectiveness, pricing viability, and likeability. Metrics for marketing effectiveness may be obtained by measuring flyer loss from a brochure box present on the real estate property. Metrics related to pricing viability may be obtained by determining the number of visitors to an open house for the property. Metrics related to the likeability of the house may be measured by determining the number of repeat visitors to the open house. The feedback received by the Buyer Focused Computational Utility may provide data and information needed to make mid-course corrections in the seller's marketing strategy.

The term "Buyer's Agent" refers to an agent (described above) representing the interests of a Buyer to the real estate transaction. Commonly, the Buyer's agent may share at least a portion of the Seller's Agent's commission.

The term "Comparative Market Analysis" (CMA) refers to a compilation of active listings and recent sales of closely comparable homes. The data and information presented in the CMA provides an objective range of asking prices, a seller may use to price their real estate property. In an exemplary embodiment, the interactive system described herein may provide the CMA to the seller, and a counselor affiliated with the interactive system may assist the seller in determining a list price for the real estate property.

The term "Commission" refers to a payment made by one or more of the seller and the buyer to one or more of the agent(s) at the closing of the transaction. Accordingly, the Commission is often contingent upon the transaction closing. In conventional residential real estate transactions, the commission is typically 6%, split evenly between the seller's agent and the buyer's agent. Additionally, in conventional residential real estate transactions the entire commission is provided by the seller.

The term "Commission to Selling Office" (CSO) refers to the portion of the commission (defined above) that is offered to all agents belonging to the MLS. In other words, it is the amount the seller's agent will pay another agent for their services including, for example, bringing a buyer for the house. The Commission to Selling Office is payable out of the seller's agent's commission at closing. Thus, the buyer's agent is paid by the seller's agent, and indirectly by the seller.

The term "Customer Support Utility" (CSU) refers to CSU 164 of system 100 that forms a "back end" of the interactive web•based guide for conducting real estate transactions described herein. The CSU 164 may receive, store and process data related to the seller's real estate transaction including (but not limited to) the metrics of the Buyer Focused Computational Utility 168, Comparative Market Analysis and the like. The data and information received, stored, and processed by the CSU 164 may be transmitted to one or more external computing systems (e.g., counselor device 130) for use by a counselor. As discussed above, the CSU 164 may communicate with GUI 132 of counselor device 130 to provide information to a counselor, such that the counselor may communicate and provide information to a seller. In some examples the CSU may perform calculations, analysis, or output functions.

The term "counselor" refers to a specially•trained, real estate professional who assists the seller in selling their home. In one embodiment, counselors may be licensed by a state, and may be members of the Board of Realtors. In one embodiment, counselors may be different from agents.

The terms "EZ Form Purchase and Sale Agreement" or "Easy Form Purchase and Sale Agreement" may refer to a purchase and sale agreement used by buyers and/or sellers, that is streamlined, and may be provided by an embodiment of the disclosure described herein. In particular, the EZ Form Purchase and Sale Agreement may be used when there is no agent for the buyer.

The systems and methods described herein refer to processing real estate transactions without either a seller's agent or a buyer's agent. Rather, in some embodiments the real estate transaction may occur with assistance from a licensed, specially-trained counselor.

The term "Latent Defect" refers to a defect in a real estate property that is not visible or discernable from simple observation. However, the evidence of the latent defect is often observable. For example, the latent defect of a damaged roof may not be visible, however, water damage to interior drywall may be evidence of a leaking roof.

The term "List Side" refers to the agent(s) and seller(s) who list their real estate property on MLS. The agent for the seller works on the "list side" of the transaction, and earns the "list side" of the commission—the full commission less the CSO.

The term "Listing Agent" refers to the agent who lists the property on the MLS system, and is an agent representing the interests of the seller.

The term "Multiple Listing Service" (MLS) refers to an organization owned and managed by real estate brokerage firms. Originally established almost a hundred years ago, the MLS also refers to the process by which a broker advertised their listings to other brokers, and offered a portion of her commission—the CSO—to other brokers who bring a buyer and close the transaction. Originally, the MLS published a catalogue of listings. With the advent of the Internet and powerful search engine software, the MLS became a home listing website for buyers to use. With the further advent of Internet Data Exchange (IDX) feed software, the national home-listing websites like Realtor.com, Zillow and Trulia, now automatically access and republish the MLS home listings. In this application, a reference to the MLS may include these other home-listing websites.

The term "Realtor®" refers to a real estate licensee who is member of the local Board of Realtors, a trade group, and through that, the state association of Realtors and the National Association of Realtors. Only about half of all licensees are Realtors. In one embodiment, the counselors of the methods and systems described herein are Realtors. Realtors subscribe to a Code of Ethics and receive special training.

The term "Sell Side" refers to the agent and side of the transaction representing the interests of the buyer. The agent on the sell side of the transaction receives the CSO (described above).

The term "Show Condition" refers to the condition of the real estate property when it is displayed to potential buyers. A property in "good" show condition may receive one or more offers for the property. However a property in "poor" show condition may receive few, if any, offers for the property. It may be recommended, that to achieve a "good" show condition, a seller may empty out the house, may make any needed repairs, and may otherwise place the property in show condition before creating an. In system 100, the seller and the counselor, may score the show condition of the property (e.g., from 1-10), before the property goes on the market.

The term "Staging" refers to removing the seller's possessions and furnishings from a house, and then refilling furnishings selected by a decorator called a "stager." Staging is often recommended by agents, but may not be recommended by the system and methods described herein.

While the present disclosure has been discussed in terms of certain embodiments, it should be appreciated that the present disclosure is not so limited. The embodiments are explained herein by way of example, and there are numerous modifications, variations and other embodiments that may be employed that would still be within the scope of the present disclosure.

The invention claimed is:

1. A computer-based method for effecting the sale of a residence, said residence having functional features including one or more bedrooms, living areas, and bathrooms, said residence having aesthetic features including one or more bedroom vistas, living area vistas, and bathroom amenities, comprising:

provoking a computer system with user input modules for data, textual material and photos, and output modules for generating flyers and placards in a respective flyer pre-formatted form and placard pre-formatted form, said computer system further including a plurality of processing modules;

establishing an initial asking price for the residence and inputting the same into said computer system as initial asking price;

preparing the residence for a plurality of open house (OH) marketing events;

obtaining photos of said residence functional features and said residence aesthetic features and inputting the same into said computer system as pic data;

textually documenting said residence functional features with texts and inputting the same into said computer system as d-text;

generating a plurality of first edition flyers using one of said flyer pre-formatted form, said first edition flyers having a subset of said photos and texts thereon from said pic data and d-text;

making available a first group of said plurality of first edition flyers at an out-of-residence (OOR) location and making available a second group of said plurality of first edition flyers at an in-residence location, the OOR first edition flyer group being available outside of said residence, said second group of flyer being available to a plurality of prospective buyers attending said plurality of OH marketing events;

generating a plurality of first edition self-guided tour guide placards with said placard pre-formatted form, wherein a respective placard includes one or more of (i) corresponding text for said functional features of said one or more bedrooms, living areas, and bathrooms from d-text; (ii) corresponding photos of the functional features of said one or more bedrooms, living areas, and bathrooms from pics, and (iii) corresponding photos of the aesthetic features of said one or more bedrooms, living areas, and bathrooms from pics;

posting said first edition placards about said residence prior to each said OH marketing event;

at each OH marketing event, logging into said computer system via said input modules prospective buyer data at least including buyer name and date of event and logging OOR first edition flyer loss over a first period of time which covers at least a 30 day period and a sub-plurality of OH marketing events;

said computer system processing modules including a flyer loss determining processing module which determines whether said OOR first edition flyer loss over said first period of time meets or exceeds a predetermined, seasonally adjusted flyer loss threshold (SA-flyer-loss threshold), said SA-flyer-loss threshold seasonally altered by said computer system based upon the calendar dates of said sub-plurality of OH marketing events;

if said first edition flyer loss over said first period of time does not meet or exceed said SA-flyer-loss threshold, changing one or more attribute-based factors associated with said residence and effectuating one or more corrective acts from of the group of corrective acts including:

(a) obtaining additional photos of said residence functional features or said residence aesthetic features and inputting as add-pic data and generating an OOR second edition plurality of flyers with said computer system, said second edition flyers having a subset of said additional photos thereon from add-pic data and replacing all OOR first edition flyers with said OOR second edition flyers at said OOR location, (b) obtaining additional photos of said residence functional features or said residence aesthetic features and inputting as add-pic data and generating with said computer system a second edition plurality of self-guided tour guide placards with additional photos thereon from said add-pic data, removing said first edition placards and posting said second edition placards about said residence, and (c) with said computer system processing modules, discounting said initial asking price to a first discounted (d-1) asking price and generating an OOR second edition plurality of flyers displaying said d-1 asking price thereon and replacing all OOR first edition flyers with said OOR second edition flyers at said OOR location;

said computer-based method, over a second period of time subsequent to said first period of time, repeating the steps of: at each OH marketing event, logging into said computer system via said input modules prospective buyer data at least including buyer name and date of event and logging OOR second edition flyer loss over a second period of time which covers at least a second 7 day period and a second sub-plurality of OH marketing events;

with said flyer loss processing module, determining whether said OOR second edition flyer loss over said second period of time meets or exceeds either said SA-flyer-loss threshold or the seasonally altered SA-flyer-loss threshold; and repeating said OH marketing events until an acceptable offer from a prospective buyer is obtained.

2. A computer-based method for effecting the sale of a residence as claimed in claim 1 including:

if said flyer loss processing module determines that said OOR second edition flyer loss over said second period of time does not meet or exceed either the then-applied loss threshold which is either said SA-flyer-loss threshold or said seasonally altered SA-flyer-loss threshold, repeating said changing of one or more attribute-based factors associated with said residence and repeating said effectuating one or more corrective acts from of said group of corrective acts until said acceptable offer is obtained.

3. A computer-based method for effecting the sale of a residence as claimed in claim 1 including:

said computer system processing modules including a time line generator processing module associated with an initially estimated time-to-contract data input and a number-of-OH-events data input and a calendared OH event table and a time-to-start-marketing data input;

if said changing of one or more attribute-based factors associated with said residence alters said number-of-OH-events due to a first delay time, said time line generator (a) effectuates a re-scheduling of said calendared OH event table; or (b) generates a first-extended estimated time-to-contract; or (c) effectuates said re-scheduling of said calendared OH event table and generates said first-extended estimated time-to-contract.

4. A computer-based method for effecting the sale of a residence as claimed in claim 1 including:

said computer system processing modules including: a time line generator processing module associated with an initially estimated time-to-contract data input, a number-of-OH-events data input, a calendared OH event table input, a time-to-start-marketing data input, and a monetary factor associated with the sale of said residence; and if said changing of one or more attribute-based factors associated with said residence alters either said number-of-OH-events due to a first delay time or said monetary factor, said time line generator changing said number-of-OH-events to a first revised number-of-OH-events data and re-calendaring said OH event table to a first revised OH event table.

5. A computer-based method for effecting the sale of a residence as claimed in claim 4 including:

said computer system including a renovation plan user input module for renovation data which includes renovation textual material;

said time line generator processing module further associated with a probable renovation data input; and if said changing of one or more attribute-based factors associated with said residence includes said probable renovation, obtaining a residence renovation plan, generating a renovation plan placard with said renovation textual material and said residence renovation plan and a renovation discount, and posting said renovation plan placard adjacent the corresponding residence renovation plan for one or more bedrooms, living areas, and bathrooms.

6. A computer-based method for effecting the sale of a residence as claimed in claim 1 including:

said computer system including (i) a renovation plan user input module for renovation data which includes renovation text data input and a cost to renovate data (ii) an estimated net-to-seller-price value data input;

said computer system processing modules including: a time line generator processing module associated with an initially estimated time-to-contract data input, a number-of-OH-events data input, a calendared OH event table input, a time-to-start-marketing data input, a monetary factor data input associated with the sale of said residence, and a probable renovation data input; and if said changing of one or more attribute-based factors associated with said residence alters either said number-of-OH-events due to a first delay time or said monetary factor, said time line generator changing said number-of-OH-events to a first revised number-of-OH-events data and re-calendaring said OH event table to a first revised OH event table;

if said changing of one or more attribute-based factors associated with said residence includes said probable renovation, obtaining a residence renovation plan with a cost-to-renovate data;

said computer system processing modules including a net-to-seller processing module which determines whether said cost-to-renovate data and an estimated renovation discount results in an estimated negative net-to-seller-price value;

said net-to-seller processing module accepting at least one revised estimated renovation discount and determining whether said cost-to-renovate data and said revised estimated renovation discount results in a revised estimated negative net-to-seller-price value;

in the absence of said estimated negative net-to-seller-price value or said revised estimated negative net-to-seller-price value, said net-to-seller processing module either:

(a) generating a renovation plan placard with said renovation text and said residence renovation plan and an offered renovation discount, said offered renovation discount being less than both said estimated renovation discount or said revised estimated renovation discount, and posting said renovation plan placard adjacent the corresponding one or more bedrooms, living areas, and bathrooms with said offered renovation discount thereon, or (b) with said computer system processing modules, discounting said initial asking price to a renovation discounted (d-r) asking price and generating said OOR third edition plurality of flyers displaying said d-r asking price thereon and replacing all earlier OOR edition flyers with said OOR third edition flyers, or (c) effectuate the renovation of said residence with said residence renovation plan, repeat obtaining additional photos of the renovated residence functional features or said renovated residence aesthetic features as reno pic data and repeat generating an OOR renovated edition plurality of flyers, said OOR renovated edition flyers having a subset of said additional photos thereon from said reno pics and replacing all earlier OOR edition flyers with said OOR renovated edition flyers;

said computer-based method, over a third period of time subsequent to all earlier periods of time, repeating the steps of: at each OH marketing event, logging into said computer system via said input modules prospective buyer data at least including buyer name and date of event and logging either OOR third edition flyer loss or OOR renovated edition flyers over a third period of time which covers at least a subsequent 7 day period and a third sub-plurality of OH marketing events;

with said flyer loss processing module, determining whether either said OOR third edition flyer loss over said third period of time or said OOR renovated edition flyers over said third period of time meets or exceeds either said SA-flyer-loss threshold or the seasonally altered SA-flyer-loss threshold; and repeating said OH marketing events until an acceptable offer from a prospective buyer is obtained.

7. A computer-based method for effecting the sale of a residence as claimed in claim 6 wherein said renovation plan includes a renovation time and the computer-based method including:

said computer system processing modules including a time-based factor error generator which determines whether said renovation time adversely effects one or more of (a) said initially estimated time-to-contract data input, (b) said number-of-OH-events data input, and (c) said calendared OH event table input;

said time-based factor error generator:
(i) determining if said initially estimated time-to-contract is not adversely effected by said renovation time, resetting said calendared OH event table to account for said renovation time and generating a renovation calendared OH event table;
(ii) determining if both said initially estimated time-to-contract and said number-of-OH-events are not adversely effected by said renovation time, resetting said calendared OH event table to account for said renovation time and generating said renovation calendared OH event table and resetting said number-of-OH-events to account for said renovation time and generating a renovation number-of-OH-events; and
(iii) determining if said initially estimated time-to-contract is adversely effected by said renovation time, resetting said initially estimated time-to-contract as a renovation time-to-contract, resetting either or both of said calendared OH event table and said number-of-OH-events, thereby generating respective renovation calendared OH event table and renovation number-of-OH-events; and,
said computer-based method, over a fourth period of time subsequent to any one of: generating said renovation calendared OH event table, generating said renovation number-of-OH-events, repeating over said fourth period of time the steps of: at each OH marketing event, logging into said computer system via said input modules prospective buyer data at least including buyer name and date of event and logging either an OOR fourth edition flyer loss or an OOR second renovated edition flyers over said fourth period of time; and,
with said flyer loss processing module, determining whether either said OOR fourth edition flyer loss over said fourth period of time or said OOR second renovated edition flyer loss over said third period of time meets or exceeds either said SA-flyer-loss threshold or the seasonally altered SA-flyer-loss threshold; and
repeating said OH marketing events until an acceptable offer from a prospective buyer is obtained.

8. A computer-based method for effecting the sale of a residence as claimed in claim 1 including:
obtaining OOR first edition flyer loss count data and said OOR second edition flyer loss count data;
said computer system processing modules including a buyer-visitor-to-flyer processor which (a) determines a prospective total buyer count from said prospective buyer data, and (b) an OOR flyer loss count total accounting for said OOR first edition flyers loss count and said OOR second edition flyer loss count and (c) determines the ratio between: (i) said prospective buyer count to said OOR flyer loss count total and generating a buyer-visitor count to flyer loss ratio as a first V-FL ratio, and (ii) said prospective buyer count during said second time period and said OOR second edition flyer loss count during said second time period and generating a second period buyer-visitor count to flyer loss ratio as a second V-FL ratio; and
said computer system processing modules including a buyer-visitor-to-flyer thresholding processor module determining whether any of said first V-FL ratio or said second V-FL ratio exceeds a predetermined V-FL threshold; and
if said second V-FL ratio does not exceed said predetermined V-FL threshold, effectuating a flyer-loss-corrective act including:
with said computer system processing modules, discounting a then-posted asking price to a flyer-loss discounted (d-fl) asking price and generating an OOR third edition plurality of flyers displaying said d-fl asking price thereon and replacing all OOR second edition flyers with said OOR third edition flyers;
over a third period of time subsequent to said second period of time, repeating the steps of: at each OH marketing event, logging into said computer system via said input modules prospective buyer data at least including buyer name and date of event and logging OOR third edition flyer loss over said third period of time which covers at least a subsequent 7 day period and a third sub-plurality of OH marketing events; and,
repeating said OH marketing events until an acceptable offer from a prospective buyer is obtained.

9. A computer-based method for effecting the sale of a residence as claimed in claim 8 including:
said computer system processing modules including a return prospective buyer processor which (a) determines the number of return prospective buyers from said prospective buyer data and generates a return prospective buyer count (R-buyer count), and (b) determines the ratio of buyer R-buyer count to prospective total buyer count (T-buyer count);
said computer system processing modules including a R-buyer-to-T-buyer-count thresholding processor module determining whether said ratio of R-buyer count to T-buyer count exceeds a predetermined R-buyer-to-T-buyer-count threshold;
if the R-buyer-to-T-buyer-count does not exceed said predetermined R-buyer-to-T-buyer-count threshold, supplementally changing one or more attribute-based factors associated with said residence and effectuating one or more supplemental corrective acts from of the group of supplemental corrective acts including:
(a) preparing said residence by cleaning said residence for a future plurality of open house (OH) marketing events, and (i) obtaining supplemental photos of said residence functional features or said residence aesthetic features and generating an OOR fourth edition plurality of flyers with said computer system, said OOR fourth edition flyers having a subset of said supplemental photos thereon and replacing all earlier OOR edition flyers with said OOR fourth edition flyers;
(b) preparing said residence by painting said residence for a future plurality of open house (OH) marketing events, and (i) obtaining supplemental photos of said residence functional features or said residence aesthetic features and generating an OOR fourth edition plurality of flyers with said computer system, said OOR fourth edition flyers having a subset of said supplemental photos thereon and replacing all earlier OOR edition flyers with said OOR fourth edition flyers, and (ii) obtaining supplemental photos of said residence functional features or said residence aesthetic features and generating with said computer system a supplemental edition plurality of self-guided tour guide placards with said supplemental photos thereon, removing all earlier edition placards and posting said supplemental edition placards about said residence;
(c) discounting a then-posted asking price to a return-buyer discounted (d-rb) asking price and generating an OOR fourth edition plurality of flyers displaying said d-rb asking price thereon and replacing all earlier OOR edition flyers with said OOR fourth edition flyers;

over a fourth period of time subsequent to said third period of time, repeating the steps of: at each OH marketing event, logging into said computer system via said input modules prospective buyer data at least including buyer name and date of event and logging OOR fourth edition flyer loss over said fourth period of time which covers at least another 7 day period and a fourth sub-plurality of OH marketing events; and, repeating said OH marketing events until an acceptable offer from a prospective buyer is obtained.

10. A computer-based method for effecting the sale of a residence, said residence having functional features including one or more bedrooms, living areas, and bathrooms, said residence having aesthetic features including one or more bedroom vistas, living area vistas, and bathroom amenities, comprising:

providing a computer system with user input modules for data, textual material and photos, and output modules for generating flyers and placards in a respective flyer pre-formatted form and placard pre-formatted form, said computer system further including a plurality of processing modules;

establishing an initial asking price for the residence and inputting the same into said computer system as initial asking price;

preparing the residence for a plurality of open house (OH) marketing events;

obtaining photos of said residence functional features and said residence aesthetic features and inputting the same into said computer system as pic data;

textually documenting said residence functional features with texts and inputting the same into said computer system as d-text;

generating a plurality of first edition flyers using one of said flyer pre-formatted form, said first edition flyers having a subset of said photos and texts thereon from said pic data and d-text and said initial asking price;

placing said plurality of first edition flyers at an out-of-residence (OOR) location as OOR first edition flyers;

generating a plurality of first edition self-guided tour guide placards with said placard pre-formatted form, wherein a respective placard includes one or more of (i) corresponding text for said functional features of said one or more bedrooms, living areas, and bathrooms from d-text; (ii) corresponding photos of the functional features of said one or more bedrooms, living areas, and bathrooms from pics, and (iii) corresponding photos of the aesthetic features of said one or more bedrooms, living areas, and bathrooms from pics;

posting said first edition placards about said residence prior to each said OH marketing event;

at each OH marketing event, logging into said computer system via said input modules prospective buyer data at least including buyer name and date of event and logging OOR first edition flyer loss over a first OH time period and a sub-plurality of OH marketing events;

said computer system processing modules including (I) a flyer loss determining processing module, (II) a buyer-visitor-to-flyer processing module, and (III) a return prospective buyer processing module;

said flyer loss determining processing module having a flyer loss thresholding processor module determining whether said OOR first edition flyer loss over said first OH time period meets or exceeds a predetermined, seasonally adjusted flyer loss threshold (SA-flyer-loss threshold), said SA-flyer-loss threshold seasonally altered by said computer system based upon the calendar dates of said sub-plurality of OH marketing events;

said buyer-visitor-to-flyer processing module determines (a) a prospective total buyer count (T-buyer count) from said prospective buyer data, and (b) an OOR flyer loss count and (c) determines the ratio between: said T-buyer count to said OOR flyer loss count and generates a buyer-visitor count to flyer loss ratio as a first V-FL ratio, said buyer-visitor-to-flyer processing module having a buyer-visitor-to-flyer thresholding processing module determining whether said V-FL ratio exceeds a predetermined V-FL threshold;

said return prospective buyer processing module determines (a) the number of return prospective buyers from said prospective buyer data and generates a return prospective buyer count (R-buyer count), and (b) the ratio of buyer R-buyer count to T-buyer count (T-buyer count) as a R-V ratio, and said return prospective buyer processing module includes a R-buyer-to-T-buyer-count thresholding processing module determining whether said ratio of R-buyer count to T-buyer count exceeds a predetermined R-buyer-to-T-buyer-count threshold;

if: (I) said OOR first edition flyer loss over said first OH time period does not meet or exceed said SA-flyer-loss threshold, or (II) said V-FL ratio does not meet or exceed said predetermined V-FL threshold, or (III) said ratio of R-buyer count to T-buyer count does not meet or exceed a predetermined R-buyer-to-T-buyer-count threshold, then: changing one or more attribute-based factors associated with said residence prior to a second OH time period and before initiation of said second OH time period, effectuating one or more corrective acts from of the group of corrective acts including:

(a) obtaining additional photos of said residence functional features or said residence aesthetic features and inputting as add-pic data and generating an OOR replacement edition plurality of flyers with said computer system, said replacement edition flyers having a subset of said additional photos thereon from add-pic data and replacing all OOR first edition flyers with said OOR replacement edition flyers at said OOR location, (b) obtaining additional photos of said residence functional features or said residence aesthetic features and inputting as add-pic data and generating with said computer system a second edition plurality of self-guided tour guide placards with additional photos thereon from said add-pic data, removing said first edition placards and posting said second edition placards about said residence, (c) obtaining supplemental self-guided tour guide placards with said d-text and posting said first edition placards about said residence prior to each said OH marketing event;

(d) preparing said residence by cleaning said residence for said second OH time period;

(e) preparing said residence by one or the other or both repairing and painting said residence for said second OH time period, and (i) obtaining supplemental photos of said residence functional features or said residence aesthetic features and generating an OOR replacement edition flyers with said computer system, said OOR replacement flyers having a subset of said supplemental photos thereon and replacing all earlier OOR flyers with said OOR replacement flyers, and (ii) obtaining supplemental photos of said residence functional features or said residence aesthetic features and generating with said computer system a supplemental edition plurality of self-guided tour guide placards with said supplemental photos thereon, removing all earlier edition placards and posting said supplemental edition placards about said residence;

(f) discounting said initial asking price with a discounted (disc) asking price and generating an OOR replacement edition flyers displaying said disc asking price thereon and replacing all earlier OOR flyers with said OOR replacement edition flyers; and (g) obtaining a renovation plan having renovation textual material and a cost to renovate data, said renovation textual material and said cost to renovate data obtained via a renovation plan user input module, discounting said cost to renovate to obtain a renovation discount associated with said initial asking price, and, generating a renovation plan placard with said renovation textual material and a renovation discount, and posting said renovation plan placard adjacent the corresponding residence renovation plan for one or more bedrooms, living areas, and bathrooms;

said computer-based method, over said second OH time period subsequent to said first OH time period, repeating the steps of: at each OH marketing event, logging into said computer system via said input modules said prospective buyer data and logging OOR replacement edition flyer loss over said second OH time period and a second sub-plurality of OH marketing events;

with said flyer loss thresholding processor module determining whether said OOR replacement edition flyer loss over said OH second time period meets or exceeds said SA-flyer-loss threshold and if NOT, then repeating said one or more corrective acts;

with said buyer-visitor-to-flyer thresholding processing module determining whether said V-FL ratio exceeds said predetermined V-FL threshold if NOT, then repeating said one or more corrective acts;

with said R-buyer-to-T-buyer-count thresholding processing module determining whether said ratio of R-buyer count to T-buyer count exceeds a predetermined R-buyer-to-T-buyer-count threshold if NOT, then repeating said one or more corrective acts; and repeating said OH marketing events until an acceptable offer from a prospective buyer is obtained.

* * * * *